US009449300B2

(12) United States Patent
Kalscheuer

(10) Patent No.: US 9,449,300 B2
(45) Date of Patent: Sep. 20, 2016

(54) PROSPECTIVE CITY GOVERNMENT JOBS POSTING SYSTEM FOR MULTIPLE CITY GOVERNMENT EMPLOYERS WITH INTEGRATED SERVICE FEATURES

(76) Inventor: Cary Kalscheuer, Covina, CA (US)

( * ) Notice: Subject to any disclaimer, the term of this patent is extended or adjusted under 35 U.S.C. 154(b) by 1324 days.

(21) Appl. No.: 12/359,184

(22) Filed: Jan. 23, 2009

(65) Prior Publication Data

US 2010/0191556 A1    Jul. 29, 2010

(51) Int. Cl.
| | |
|---|---|
| G06Q 10/10 | (2012.01) |
| G06Q 10/06 | (2012.01) |
| G06Q 30/08 | (2012.01) |
| G06Q 10/00 | (2012.01) |
| G06Q 30/02 | (2012.01) |
| G06Q 99/00 | (2006.01) |

(52) U.S. Cl.
CPC .......... *G06Q 10/10* (2013.01); *G06Q 10/1053* (2013.01); *G06Q 99/00* (2013.01)

(58) Field of Classification Search
CPC ...................................................... G06Q 10/10
USPC .................................................. 705/1.1–912
See application file for complete search history.

(56) References Cited

U.S. PATENT DOCUMENTS

| | | | |
|---|---|---|---|
| 5,164,897 A | 11/1992 | Clark et al. | |
| 5,197,004 A | 3/1993 | Sobotka et al. | |
| 6,289,340 B1 | 9/2001 | Puram et al. | |
| 6,718,345 B2 | 4/2004 | Hartman et al. | |
| 7,099,872 B2 | 8/2006 | Carpenter et al. | |
| 7,310,626 B2 | 12/2007 | Scarborough et al. | |
| 7,321,858 B2 | 1/2008 | Andino, Jr. et al. | |
| 7,379,929 B2 | 5/2008 | Meteyer et al. | |
| 7,424,438 B2 | 9/2008 | Vianello | |
| 7,505,919 B2 * | 3/2009 | Richardson | 705/7.14 |
| 2001/0042000 A1 * | 11/2001 | Defoor, Jr. | 705/9 |
| 2002/0026452 A1 * | 2/2002 | Baumgarten et al. | 707/104.1 |
| 2002/0091689 A1 * | 7/2002 | Wiens et al. | 707/6 |
| 2003/0009437 A1 * | 1/2003 | Seiler et al. | 707/1 |
| 2004/0015371 A1 * | 1/2004 | Thomas et al. | 705/1 |
| 2004/0186852 A1 | 9/2004 | Rosen | |
| 2005/0080657 A1 | 4/2005 | Crow et al. | |
| 2005/0131778 A1 * | 6/2005 | Bennett et al. | 705/29 |
| 2007/0033064 A1 | 2/2007 | Abrahamsohn | |
| 2008/0015912 A1 | 1/2008 | Rosenthal et al. | |
| 2008/0097781 A1 | 4/2008 | Clarke et al. | |
| 2008/0162274 A1 | 7/2008 | Newman | |
| 2008/0183486 A1 | 7/2008 | Baumgarten et al. | |
| 2008/0201162 A1 | 8/2008 | Hart | |
| 2008/0208907 A1 | 8/2008 | Tolve et al. | |
| 2008/0222167 A1 | 9/2008 | Hinds et al. | |

\* cited by examiner

*Primary Examiner* — Jonathan Ouellette

(57) ABSTRACT

A multiple employer city government jobs posting system includes at least one server connected to a public wide area network that hosts a website accessible over the network. The website includes software that allows multiple city governments to register for use of the website, to post and manage job announcements and prospective job announcements and allows multiple prospective employees to register for use of the website, prepare and save electronic resumes, and submit the electronic resumes to the city governments in response to the prospective job announcements. Electronic job applications are provided and prospective employees can submit online to city governments. The website requires city governments to provide a city profile and links to city government web pages. The system allows prospective employees to search for posted job announcements, prospective job announcements, city hyperlinks and profiles. The system allows city governments to search electronic resumes and to contact prospective employees.

35 Claims, 62 Drawing Sheets

FIG. 5

CREATE CITY PROFILE PROCESS

CITY OF BETA

SELECT LAYOUT OPTION:
- ◎ LANDSCAPE PHOTO
- ◎ PORTRAIT PHOTO
- ● BANNER PHOTO

UPLOAD A PHOTO: FILENAME  [BROWSE]
[UPLOAD]

CITY HALL PHOTO   DELETE

ENTER HUMAN RESOURCES INFORMATION:

| DEPARTMENT NAME | |
| STREET ADDRESS | |
| CITY | |
| STATE | |
| ZIP CODE | |
| TELEPHONE | |
| JOBS HOTLINE | |
| OFFICE HOURS | |

[NEXT>]

```
ADD NAMES OF CITY DEPARTMENTS — 74

[ HUMAN RESOURCES ]   ( ADD / SAVE )

☑ ADMINISTRATION
      ☑ COMMUNITY DEVELOPMENT
      ☑ FIRE
      ☑ LIBRARY                    EDIT | DELETE
      ☑ PARKS AND RECREATION
      ☑ POLICE
      ☑ PUBLIC WORKS
      ☑ UTILITIES                      82

ENTER DEMOGRAPHIC INFORMATION:

WAS YOUR CITY:              ◉ INCORPORATED
                               ◉ CHARTERED

YEAR YOUR CITY WAS FOUNDED   [            ]
   YEAR 2000 POPULATION         [            ]
   CURRENT POPULATION           [            ]
   NUMBER OF SQUARE MILES       [            ]
   FULL TIME EQUIVALENT EMPLOYEES [          ]

TYPE PROMOTIONAL ARTICLE ABOUT YOUR CITY:

┌─────────────────────────────────────────┐
   │                                         │
   │ [PROMOTIONAL ARTICLE TYPED HERE WITH    │
   │  RICH TEXT EDITOR]                      │
   │                                         │
   └─────────────────────────────────────────┘

( NEXT> )
```

ADD FOLLOWING STANDARD NAME HYPERLINKS:
1. CITY HOMEPAGE — 94    [CUT AND PASTE URL HERE]
2. HUMAN RESOURCE DEPT PAGE — 98    [CUT AND PASTE URL HERE]
3. JOB ANNOUNCEMENTS PAGE — 102    [CUT AND PASTE URL HERE]
4. JOB DESCRIPTIONS PAGE — 106    [CUT AND PASTE URL HERE]
5. BARGAINING GROUP AGREEMENTS PAGE    [CUT AND PASTE URL HERE]
6. COMPENSATION PAGE — 110    [CUT AND PASTE URL HERE]
7. ORGANIZATION CHARTS PAGE    [CUT AND PASTE URL HERE]

ADD PROSPECTIVE JOB ANNOUNCEMENT

174 — [ENTER JOB TITLE 2 HERE]
166 — [SELECT JOB CATEGORY] ⌄
162 — [SELECT JOB TYPE] ⌄
74 — [SELECT JOB DEPARTMENT] ⌄

ADD JOB

EDIT | DELETE

1. FIREFIGHTER
   PUBLIC SAFETY/FIRE
   SERVICE
   FIRE DEPARTMENT

Activate City Profile
  ◉ Yes
  ◉ No

POST PROFILE

EDIT FOLLOWING STANDARD NAMED HYPERLINKS:

1. CITY HOMEPAGE  [EDIT URL HERE]
2. HUMAN RESOURCE DEPT PAGE  [EDIT URL HERE]
3. JOB ANNOUNCEMENTS PAGE  [EDIT URL HERE]
4. JOB DESCRIPTIONS PAGE  [EDIT URL HERE]
5. BARGAINING GROUP AGREEMENTS PAGE  [EDIT URL HERE]
6. COMPENSATION PAGE  [EDIT URL HERE]
7. ORGANIZATION CHARTS PAGE  [EDIT URL HERE]

CHECK BELOW TO SHARE HYPERLINKS WITH DIFFERENT USERS

| | PROSPECTIVE EMPLOYEES | OTHER CITIES |
|---|---|---|
| 1. CITY HOMEPAGE | ☑ | ☑ |
| 2. HUMAN RESOURCE DEPT PAGE | ☑ | ☑ |
| 3. JOB ANNOUNCEMENTS PAGE | ☑ | ☑ |
| 4. JOB DESCRIPTIONS PAGE | ☑ | ☑ |
| 5. BARGAINING GROUP AGREEMENTS PAGE | ☑ | ☑ |
| 6. COMPENSATION PAGE | ☑ | ☑ |
| 7. ORGANIZATION CHARTS PAGE | ☑ | ☑ |

[CANCEL]  [SAVE]

CHECK ALL JOB CATEGORIES OF INTEREST:

- ☐ ADMINISTRATION
- ☐ LIBRARY
- ☑ CITY ATTORNEY
- ☐ COMMUNITY SERVICES
- ☑ LEGISLATIVE
- ☐ RECREATION
- ☑ INTERGOVERNMENTAL
- ☐ PARKS
- ☑ FINANCE
- ☐ PUBLIC WORKS
- ☐ HUMAN RESOURCES
- ☐ PUBLIC WORKS
- ☐ RISK MANAGEMENT
- ☐ STREETS MAINTENANCE
- ☑ LEGAL
- ☐ ANIMAL CONTROL
- ☐ CODE ENFORCEMENT
- ☐ ENVIRONMENTAL
- ☐ PLAN CHECKING
- ☐ PUBLIC ARTS
- ☐ BUILDING
- ☐ HOUSING

- ☑ DEVELOPMENT SERVICES
- ☐ HEALTH SERVICES
- ☐ REDEVELOPMENT
- ☐ AIRPORT
- ☐ ECONOMIC DEVELOPMENT
- ☐ HARBORS / MARINAS
- ☐ PLANNING
- ☐ TRANSIT / TRANSPORTATION
- ☐ CITY CLERK'S OFFICE
- ☐ SOLID WASTE
- ☐ INFORMATION TECHNOLOGY
- ☐ VEHICLE MAINTENANCE
- ☐ FACILITIES MAINTENANCE
- ☐ TELECOMMUNICATIONS
- ☐ UTILITIES-ELECTRIC
- ☐ PUBLIC SAFETY-FIRE
- ☐ UTILITIES-WASTE WATER
- ☐ PUBLIC SAFETY-PARAMEDIC
- ☐ UTILITIES-WATER
- ☐ PUBLIC SAFETY-POLICE
- ☐ TELECOM SERVICES
- ☐ COMMUNITY DEVELOPMENT
- ☑ OTHER

SELECT FROM FOLLOWING JOB TYPES: — 166

- ☑ CITY MANAGER
- ☑ PROFESSIONAL
- ☑ ASSISTANT CITY MANAGER
- ☑ TECHNICAL
- ☑ DIRECTOR/CHIEF
- ☑ SERVICE

- ☑ ASSISTANT DIRECTOR/CAPTAIN
- ☑ CLERICAL
- ☑ MANAGER/LIEUTENANT
- ☑ INTERNSHIP
- ☑ SUPERVISORY/SERGEANT
- ☑ ANY

SELECT FOLLOWING POSITIONS:

- ☑ FULL TIME
- ☑ PART TIME
- ☑ SEASONAL
- ☑ TEMPORARY

[ NEXT> ]

FIG. 11A

PROSPECTIVE JOBS MANAGEMENT

| ACTIVE | STOPPED | SUBMITTALS | ADD JOBS |

ADD PROSPECTIVE JOB ANNOUNCEMENT — 38, 170

MANAGER
[SELECT JOB CATEGORY] ▼ — 162
[SELECT JOB TYPE] ▼
166
[SELECT JOB DEPARTMENT] ▼ — 74

ADD JOB

1. FIREFIGHTER          EDIT | DELETE
   PUBLIC SAFETY/FIRE
   SERVICE
   FIRE DEPARTMENT

2. POLICE OFFICER       EDIT | DELETE
   PUBLIC SAFETY/POLICE
   SERVICE
   POLICE DEPARTMENT

FIG. 11B

PROSPECTIVE JOBS MANAGEMENT — 218

[ACTIVE] [STOPPED] [SUBMITTALS] [ADD JOBS]

POST  STOP  DELETE  VIEW / EDIT  PRINT  [FILTER BY DEPT ▼]
        219

| JOB TITLE | DEPT | DATE ADDED | STOPS | DAYS ACTIVE | VIEWS | SUBMITTALS |
|---|---|---|---|---|---|---|
| ☐ CLERK | ADMIN | MM/DD/YYYY | 1 | 120 | 34 | 20 |
| ☐ MANAGER | PARKS | MM/DD/YYYY | 1 | 300 | 65 | 56 |
| ☑ ANALYST | ZOO | MM/DD/YYYY | 1 | 190 | 56 | 20 |

PROSPECTIVE JOBS MANAGEMENT

[ACTIVE] [STOPPED] [SUBMITTALS] [ADD JOBS]

POST  START  DELETE  VIEW / EDIT  PRINT  [FILTER BY DEPT ▼]
        218

| JOB TITLE | DEPT | DATE ADDED | STOPS | DAYS ACTIVE | VIEWS | SUBMITTALS |
|---|---|---|---|---|---|---|
| ☐ CLERK | ADMIN | MM/DD/YYYY | 1 | 120 | 34 | 20 |
| ☐ MANAGER | PARKS | MM/DD/YYYY | 1 | 300 | 65 | 56 |
| ☑ ANALYST | ZOO | MM/DD/YYYY | 1 | 190 | 56 | 20 |

| PROSPECTIVE JOBS MANAGEMENT | | | |
|---|---|---|---|
| ACTIVE | STOPPED | SUBMITTALS | ADD JOBS |

SELECT JOB TITLE TO VIEW SUBMITTED INTEREST —— 221
IN PROSPECTIVE JOB
------ANALYST------ ▽   POST JOB
38   170
298   46

| PROSPECTIVE EMPLOYEE | RESIDENCE | SUBMITTAL DATE | YRS EXP. | ED. | LIC. | RESUME |
|---|---|---|---|---|---|---|
| JOHN SMITH | COVINA, CA | MM/DD/YYYY | 8 | BA | NO | SAVE |
| JANE DOE | PASADENA, CA | MM/DD/YYYY | 6 | BA | NO | SAVED |
| CHRIS BUI | ARCADIA, CA | MM/DD/YYYY | 9 | BA | NO | SAVE |

```
┌─────────────────────────────────────────────────────┐
│          ┌─────────────────────────────┐            │  ← 46
│          │   [ELECTRONIC RESUME TITLE] │            │
│          │   LAST UPDATED: MM/DD/YYYY  │            │
│          └─────────────────────────────┘            │
│  [FIRST NAME LAST NAME]        RESIDENCE CITY, STATE│
└─────────────────────────────────────────────────────┘
```

278 — INTERESTS

- JOB CATEGORIES: PUBLIC SAFETY/POLICE — 162
- JOB TYPES: DIRECTOR/CHIEF — 166
- LOCATIONS: LOS ANGELES COUNTY — 294
- MINIMUM STARTING PAY: $##,####.## PER MONTH

OBJECTIVE — 270

TO OBTAIN POLICE CHIEF JOB IN CITY OF AT LEAST 50,000 IN POPULATION IN LOS ANGELES COUNTY.

KEY QUALIFICATIONS — 282

- YEARS WORKING FOR CITIES: 15 YEARS
- YEARS IN CAREER PATH: 10 YEARS
- HIGHEST EDUCATION: MASTERS
- CERTIFICATES/LICENSES: NONE
- WORKING FOR CITY NOW: YES
- CURRENT JOB TYPE: MANAGER/CAPTAIN
- CURRENT JOB CATEGORY: PUBLIC SAFETY/POLICE

WORK HISTORY — 286

1. POLICE CAPTAIN
   APR-2001 TO PRESENT
   CITY OF SOMEWHERE
   SOMEWHERE, CA

PERFORMED DUTIES OF A POLICE CAPTAIN FOR CITY POLICE DEPARTMENT.

SUPPLEMENTAL — 290

- SEARCH AND RESCUE CERTIFICATION

FIG. 12A

```
                                           ┌─ 210
                                    ┌──────────────────┐  30
                                    │   CITY OF BETA   │
                              174 ──┤ POSITION CLASSIFICATION │
                                    │  SYSTEM JOB TITLES │
                              170 ──┤     ANALYST      │
                                    │     MANAGER      │
                                    │    SECRETARY     │
                                    └──────────────────┘
```

NEW JOB POSTING:

ENTER NEW JOB TITLE BELOW OR SELECT PREVIOIUSLY ENTERED PROSPECTIVE JOB ANNOUNCEMENT.

NEW JOB TITLE — 170 — 34  (FIG. 12B)

⦿ [MANAGER]

PROSPECTIVE JOB ANNOUNCEMENT

⦿ [ANALYST | COMMUNITY DEVELOPMENT DEPT ▽]  (FIG. 12C)

38 — 174 — *FORMAT JOB TITLE | DEPARTMENT NAME*

SELECT FOLLOWING JOB CATEGORY:

─ 162

[[SELECT JOB CATEGORY] ▽]

SELECT JOB TYPE:

─ 166

[[SELECT JOB TYPE] ▽]

( NEXT> )

SELECT POSITION TYPE:

☑ FULL TIME
☐ PART TIME
☐ SEASONAL
☐ TEMPORARY
☐ ANY  ╱─178

SET SALARY OR WAGE RANGE FOR JOB ANNOUNCEMENT, OR SELECT DEPENDS ON QUALIFICATIONS

⦿ [MONTHLY ▼]  LOW: [$3,000.00]  TO  HIGH: [$4,000.00]

◎ DEPENDS ON QUALIFICATIONS

ENTER JOB DUTIES, REQUIREMENTS AND DESCRIPTION OF APPLICATION PROCESS

JOB DUTIES: ╱─190

REQUIREMENTS: ╱─194

APPLICATION PROCESS: ╱─198

WORD COUNT: 100

[NEXT>]

FIG. 12D

```
┌─────────────────────────────────────────────────────────────┐
│ UPLOAD JOB ANNOUNCEMENT DOCUMENT:                           │
│                                    ─202                     │
│       202  [ENTER FILE TITLE]                               │
│                                                             │
│            [FILENAME.PDF]   [BROWSE]                        │
│                                                             │
│       202        [UPLOAD]                                   │
│            1. JOB DESCRIPTION     DELETE                    │
│                 FILENAME1.PDF                               │
│       202                                                   │
│            2. JOB APPLICATION     DELETE                    │
│                 FILENAME2.PDF                               │
│       206                                                   │
│  TEST OR EDIT HYPERLINKS THAT WILL APPEAR NEXT TO YOUR JOB  │
│  ANNOUNCEMENT:     ─78                                      │
│         HOME PAGE    [HTTP://WWW....GOV]   [TEST]           │
│  HUMAN RESOURCES DEPT [HTTP://WWW....GOV]  [TEST]           │
│    JOB ANNOUNCEMENTS  [HTTP://WWW....GOV]  [TEST]           │
│                                                             │
│  SET RUN DATES AND APPLICATION DEADLINE FOR JOB             │
│  ANNOUNCEMENT:                                              │
│       ─182                                                  │
│  START DATE OF JOB POSTING [MM/DD/YYYY] [HOUR] [MINUTES] [AM▼]│
│  END DATE OF JOB POSTING   [MM/DD/YYYY] [HOUR] [MINUTES] [AM▼]│
│  APPLICATION DEADLINE      [MM/DD/YYYY] [HOUR] [MINUTES] [AM▼]│
│    182        ─186                                          │
│                                      216, 217               │
│  ACCEPT ELECTRONIC JOB APPLICATIONS?                        │
│       ● YES   ◎ NO                                          │
│                                                             │
│  SELECT STANDARD STATE JOB APPLICATION FORM TO USE:         │
│       [CALIFORNIA-1      ▼]                                 │
│             ─230                          ─187              │
│                                      [NEXT]                 │
└─────────────────────────────────────────────────────────────┘
                                                         ─210
```

FIG. 12E 216

```
YOU HAVE ELECTED TO ACCEPT ELECTRONIC JOB APPLICATIONS
FOR THIS JOB POSTING. WOULD YOU LIKE TO ADD SUPPLEMENTAL
QUESTIONS TO THE STANDARD JOB APPLICATION FOR CITIES IN
YOUR STATE?                                                    219
            ⦿ YES    ⊚ NO

IF YES, ENTER FIRST SUPPLEMENTAL JOB APPLICATION QUESTION
AND CLICK ADD. THEN ENTER ADDITIONAL QUESTIONS UNTIL
FINISHED. EDIT QUESTIONS IF NECESSARY. QUESTIONS WILL BE
NUMBERED AND APPEAR IN ORDER ENTERED.

┌─────────────────────────────────────────────────────┐
│ IN PAST YEAR, HOW MANY TIMES HAVE YOU CALLED        │
│ IN SICK WHEN YOU WERE NOT SICK?                     │
└─────────────────────────────────────────────────────┘

[ CLEAR ]  [ ADD ]      219

ENTERED SUPPLEMENTAL QUESTIONS FOR JOB APPLICATION:

1. IN PAST YEAR, HOW MANY TIMES HAVE YOU BEEN
     LATE TO WORK?
                    DELETE | EDIT

2. IN PAST YEAR, HOW MANY TIMES HAVE YOU CALLED
     IN SICK WHEN YOU WERE NOT SICK?
                    DELETE | EDIT

ALLOW JOB APPLICANTS TO UPLOAD DOCUMENT AS PART OF
APPLICATION PROCESS:

221 ── ⦿ YES   ⊚ NO

SELECT LIMIT OF HOW MANY DOCUMENTS APPLICANTS MAY SUBMIT:
         [ -3- ▼ ]

[ POST JOB ]
```

FIG. 12F 210, 187

CITY OF BETA ACTIVE JOB ANNOUNCEMENTS

| SCHEDULED | ACTIVE JOBS | ENDED JOBS | ARCHIVED JOBS |

FILTER TO VIEW APPLICANTS. [SELECT JOB TITLE ▽]  JOB LIST

VIEW / EDIT   DELETE   ARCHIVE

| JOB TITLE | VIEWS | SAVES | APPLICANTS | END |
|---|---|---|---|---|
| ☑ MANAGER | 299 | 34 | 3 | MM/DD/YYYY |
| ☑ ANALYST | 987 | 89 | 77 | MM/DD/YYYY |
| ☑ CLERK | 977 | 97 | 65 | MM/DD/YYYY |

JOB APPLICANTS LIST VIEW  170

| SCHEDULED | ACTIVE JOBS | ENDED JOBS | ARCHIVED JOBS |

FILTER TO VIEW APPLICANTS. [MANAGER ▽]  JOB LIST

| PROSPECTIVE EMPLOYEE | RESIDENCE | SUBMITTAL DATE | 46 | RESUME 46 |
|---|---|---|---|---|
| JOHN SMITH | COVINA, CA | MM/DD/YYYY | VIEW | SAVE |
| JANE DOE | PASADENA, CA | MM/DD/YYYY | VIEW | SAVED |
| CHRIS BUI | ARCADIA, CA | MM/DD/YYYY | VIEW | SAVE |

| JOB APPLICATION  VIEW RESUME — 46 | CLOSE |
|---|---|
| JOB TITLE: MANAGER | SUBMITTAL DATE: 10/12/2009 |

APPLICANT:
- APPLICANT NAME: JOHN SMITH — 42
- ADDRESS: 100 N. MAIN STREET, CITYNAME, CA 91700
- TELEPHONE: (000) 000-0000
- WORK PHONE: (000) 000-0000
- EMAIL: JOHNS@EMAIL.COM
- DRIVER'S LICENSE: NUMBER: N000000  STATE: CA  CLASS: 3
- 18 YEARS OLD: YES

EDUCATION:

[ENTERED EDUCATION INFO. SEE FIGURE: 16Q]

WORK HISTORY:

[WORK HISTORY HERE – SEE FIGURE 16P]

EVER TERMINATED FROM PRIOR POSITIONS?

YES  [EXPLANATION HERE]

EVER CONVICTED OF CRIME OTHER THAN TRAFFIC VIOLATION?

YES  [EXPLANATION HERE]

EQUAL EMPLOYMENT OPPORTUNITY INFORMATION

[INDICATED ETHNICITY HERE]

[INDICATED GENDER HERE]

[INDICATED DISABILITIES HERE]

ADVERTISING EVALUATION:

MEDIA 1

SUPPLEMENTAL QUESTIONS: — 219

1. IN PAST YEAR, HOW MANY TIMES HAVE YOU BEEN LATE TO WORK?

[ANSWER: THREE TIMES]

UPLOADED DOCUMENTS:

1. SUPPLEMENTAL QUESTIONAIRE
   FILEUPLOAD-1.PDF

FIG. 12I

PROSPECTIVE JOB ANNOUNCEMENTS MANAGEMENT
[PROSPECTIVE EMPLOYEE MODULE - JOHN SMITH]

| JOB ANNOUNCEMENTS | SAVED | SUBMITTED | EXPIRED |
|---|---|---|---|

SHOW JOB    DELETE    MOVE TO SAVED JOBS

| JOB TITLE | SALARY | CITY | CLOSES | SAVE |
|---|---|---|---|---|
| ☐ MANAGER | $4000 TO $5000/MONTH | ALPHA | MM/DD/YYYY | SAVE |
| ☐ ANALYST | $3000 TO $4000/MONTH | BETA | MM/DD/YYYY | SAVED |
| ☑ CLERK | $2000 TO $3000/MONTH | DELTA | MM/DD/YYYY | SAVE |

FIG. 13A

```
CREATE ELECTRONIC RESUME FOR JOHN SMITH — 42
  ENTER RESUME TITLE: [TITLE HERE]

ENTER JOB SEARCH OBJECTIVE: — 270

[OBJECTIVE HERE]
  274

SELECT DESIRED STARTING PAY:

⦿ ENTER MINIMUM STARTING PAY

OR          $##,###.##   MONTHLY ▽

⦿ OPEN TO COMPETITIVE MARKET RATES

— 166, 278
SELECT FROM FOLLOWING JOB TYPES:

☑ CITY MANAGER           ☑ ASSISTANT DIRECTOR/
    ☑ PROFESSIONAL           ☑ CAPTIAN
    ☑ ASSISTANT CITY MANAGER ☑ CLERICAL
    ☑ TECHNICAL              ☑ MANAGER/LIEUTENANT
    ☑ DIRECTOR/CHIEF         ☑ INTERNSHIP
    ☑ SERVICE                ☑ SUPERVISORY/SERGEANT
                             ☑ ANY

SELECT FOLLOWING POSITIONS:
    ☑ FULL TIME         ☑ SEASONAL
    ☑ PART TIME         ☑ TEMPORARY

[ NEXT> ]
```

CHECK ALL JOB CATEGORIES OF INTEREST:

- ☐ ADMINISTRATION
- ☐ LIBRARY
- ☐ CITY ATTORNEY
- ☐ COMMUNITY SERVICES
- ☐ LEGISLATIVE
- ☐ RECREATION
- ☐ INTERGOVERNMENTAL
- ☐ PARKS
- ☐ FINANCE
- ☐ LAND USE MANAGEMENT
- ☐ HUMAN RESOURCES
- ☑ PUBLIC WORKS
- ☐ RISK MANAGEMENT
- ☐ STREETS MAINTENANCE
- ☐ LEGAL
- ☐ ANIMAL CONTROL
- ☐ CODE ENFORCEMENT
- ☑ ENVIRONMENTAL
- ☐ PLAN CHECKING
- ☐ PUBLIC ARTS
- ☐ BUILDING
- ☐ HOUSING

- ☐ DEVELOPMENT SERVICES
- ☐ HEALTH SERVICES
- ☐ REDEVELOPMENT
- ☐ AIRPORT
- ☐ ECONOMIC DEVELOPMENT
- ☐ HARBORS / MARINAS
- ☐ PLANNING
- ☐ TRANSIT / TRANSPORTATION
- ☐ CITY CLERK'S OFFICE
- ☑ SOLID WASTE
- ☐ INFORMATION TECHNOLOGY
- ☐ VEHICLE MAINTENANCE
- ☐ FACILITIES MAINTENANCE
- ☐ TELECOMMUNICATIONS
- ☑ UTILITIES-ELECTRIC
- ☐ PUBLIC SAFETY-FIRE
- ☑ UTILITIES-WASTE WATER
- ☐ PUBLIC SAFETY-PARAMEDIC
- ☑ UTILITIES-WATER
- ☐ PUBLIC SAFETY-POLICE
- ☐ TELECOM SERVICES
- ☐ COMMUNITY DEVELOPMENT
- ☑ OTHER

[ NEXT> ]

KEY QUALIFICATIONS — 282

CURRENTLY WORKING FOR CITY OR TOWN GOVERNMENT?

◉ YES

◉ NO

TOTAL YEARS OR MONTHS WORKING FOR CITY OR TOWN GOVERNMENT:

[ ## ]  [ MONTHS ⌄ ]

SELECT HIGHEST LEVEL OF EDUCATION ACHIEVED:

[ MASTERS DEGREE ⌄ ]

SELECT JOB RELEVANT LICENSE OR CERTIFICATES:

[ SEE SUPPLEMENTAL ⌄ ]

IF EMPLOYED BY CITY, SELECT CURRENT JOB CATEGORY:

[ UTILITIES/ELECTRIC ⌄ ]

IF EMPLOYED BY CITY, SELECT CURRENT JOB TYPE:

[ SERVICE ⌄ ]

( NEXT> )

WORK EXPERIENCE — 286

☑ I WOULD LIKE TO SKIP THIS STEP

| | | |
|---|---|---|
| ENTER JOB TITLE: | [JOB TITLE OF FIRST JOB] | |
| | MONTH | YEAR |
| START DATE: | MONTH ▼ | #### |
| END DATE: | MONTH ▼ | #### |
| EMPLOYER NAME: | [JOB TITLE OF FIRST JOB] | |
| CITY OR TOWN: | [JOB TITLE OF FIRST JOB] | |
| STATE/PROVINCE: | STATE-1 ▼ | |

DESCRIBE JOB DUTIES:

[JOB DUTIES OF ABOVE JOB]

( SAVE AND ADD JOB )

1. CITY MANAGER      EDIT | DELETE
CITY OF SOMEWHERE
JAN-2000 TO OCT-2009
SOMEWHERE, CA

PERFORMED VARIOUS JOB DUTIES.

( NEXT> )

BLOCK UP TO 5 CITIES FROM VIEWING YOUR RESUME. SELECT STATE, THEN COUNTY, THEN CITY.

1. [CALIFORNIA ⌄] [LOS ANGELES COUNTY ⌄] [PASADENA ⌄]
2. [CALIFORNIA ⌄] [LOS ANGELES COUNTY ⌄] [ARCADIA ⌄]
3. [CALIFORNIA ⌄] [LOS ANGELES COUNTY ⌄] [COVINA ⌄]
4. [CALIFORNIA ⌄] [LOS ANGELES COUNTY ⌄] [CERRITOS ⌄]
5. [CALIFORNIA ⌄] [LOS ANGELES COUNTY ⌄] [DUARTE ⌄]

FIG. 13K

USE REAL NAME OR USERNAME ON RESUME

● REAL NAME    ◎ USERNAME

ACTIVATE ELECTRONIC RESUME (MAKE AVAILABLE TO CITY GOVTS)?

● YES    ◎ NO

[NEXT>]

EDIT VIEW   EMPLOYER VIEW

[ELECTRONIC RESUME TITLE]
LAST UPDATED: MM/DD/YYYY

[FIRST NAME LAST NAME]                                    RESIDENCE CITY, STATE

INTERESTS — 278

| | |
|---|---|
| JOB CATEGORIES: | PUBLIC SAFETY/POLICE — 162 |
| JOB TYPES: | DIRECTOR/CHIEF — 166 |
| 294 — LOCATIONS: | LOS ANGELES COUNTY   274 |
| MINIMUM STARTING PAY: | $##,####.## PER MONTH |

OBJECTIVE — 270

TO OBTAIN POLICE CHIEF JOB IN CITY OF AT LEAST 50,000 IN POPULATION IN LOS ANGELES COUNTY.

KEY QUALIFICATIONS — 282

| | |
|---|---|
| YEARS WORKING FOR CITIES: | 15 YEARS |
| YEARS IN CAREER PATH: | 10 YEARS |
| HIGHEST EDUCATION: | MASTERS |
| CERTIFICATES/LICENSES: | NONE |
| WORKING FOR CITY NOW: | YES |
| CURRENT JOB TYPE: | MANAGER/CAPTAIN |
| CURRENT JOB CATEGORY: | PUBLIC SAFETY/POLICE |

WORK HISTORY — 286

1. POLICE CAPTAIN
   APR-2001 TO PRESENT
   CITY OF SOMEWHERE
   SOMEWHERE, CA

PERFORMED DUTIES OF A POLICE CAPTAIN FOR CITY POLICE DEPARTMENT.

SUPPLEMENTAL — 286

- SEARCH AND RESCUE CERTIFICATION

CHECK ALL JOB CATEGORIES OF INTEREST TO RESUME SEARCH:

- ☐ ADMINISTRATION
- ☐ LIBRARY
- ☐ CITY ATTORNEY
- ☐ COMMUNITY SERVICES
- ☐ LEGISLATIVE
- ☐ RECREATION
- ☐ INTERGOVERNMENTAL
- ☐ PARKS
- ☐ FINANCE
- ☐ PUBLIC WORKS
- ☐ HUMAN RESOURCES
- ☑ LAND USE
- ☐ RISK MANAGEMENT
- ☑ STREETS MAINTENANCE
- ☐ LEGAL
- ☐ ANIMAL CONTROL
- ☑ CODE ENFORCEMENT
- ☑ ENVIRONMENTAL
- ☑ PLAN CHECKING
- ☐ PUBLIC ARTS
- ☑ BUILDING
- ☑ HOUSING

- ☑ DEVELOPMENT SERVICES
- ☐ HEALTH SERVICES
- ☑ REDEVELOPMENT
- ☐ AIRPORT
- ☑ ECONOMIC DEVELOPMENT
- ☐ HARBORS / MARINAS
- ☑ PLANNING
- ☐ TRANSIT / TRANSPORTATION
- ☐ CITY CLERK'S OFFICE
- ☐ SOLID WASTE
- ☐ INFORMATION TECHNOLOGY
- ☐ VEHICLE MAINTENANCE
- ☐ FACILITIES MAINTENANCE
- ☐ TELECOMMUNICATIONS
- ☐ UTILITIES-ELECTRIC
- ☐ PUBLIC SAFETY-FIRE
- ☐ UTILITIES-WASTE WATER
- ☐ PUBLIC SAFETY-PARAMEDIC
- ☐ UTILITIES-WATER
- ☐ PUBLIC SAFETY-POLICE
- ☐ TELECOM SERVICES
- ☐ COMMUNITY DEVELOPMENT
- ☐ OTHER

[ NEXT> ]

SELECT FOLLOWING JOB TYPES — 166, 278

- ☐ CITY MANAGER
- ☑ PROFESSIONAL
- ☐ ASSISTANT CITY MANAGER
- ☐ TECHNICAL
- ☐ DIRECTOR/CHIEF
- ☐ SERVICE
- ☑ ASSISTANT DIRECTOR/CAPTAIN
- ☑ CLERICAL
- ☑ MANAGER/LIEUTENANT
- ☑ INTERNSHIP
- ☑ SUPERVISORY/SERGEANT
- ☑ ANY

YEARS EXPERIENCE [ 5 ] — 318, 282

SELECT MINIMUM EDUCATION LEVEL — 322, 282

[ MASTERS DEGREE ▼ ]

SELECT PREFERRED LICENSE OR CERTIFICATE — 326, 282

[ PE ▼ ]
[ CPA ▼ ]

274

SELECT MINIMUM STARTING PAY PREFERENCE

- ◎ ANY STARTING PAY PREFERENCE
- ◎ MINIMUM STARTING PAY OF [ $##,###.## ] [ PER MONTH ▼ ]
- ● OPEN TO COMPETITIVE MARKET RATES

[ NEXT> ]

| ELECTRONIC RESUME SEARCH RESULTS | | | | | |
|---|---|---|---|---|---|
| JOB CATEGORY ▾ | EDUCATION ▾ | | LICENSE ▾ | | |
| RESIDENCE | JOB CATEGORIES | YRS EXP | EDUCATION | LICENSE | SAVE |
| COVINA | PUBLIC WORKS | 15 | MASTERS | PE | SAVE |
| ARCADIA | FINANCE | 8 | BACHELORS | CPA | SAVED |
| DUARTE | UTILITIES/WATER | 12 | BACHELORS | NO | SAVE |

| SAVED RESUMES | SENT COMMENTS | REPLIES |
|---|---|---|

302   310   306   SELECT FOLDER ▾   ADD / EDIT

DELETE | SEND COMMENT | ADD FOLDER    MOVE TO FOLDER ▾

| NAME | RESIDENCE | JOB CATEGORIES | YRS EXP | EDUCATION | LICENSE |
|---|---|---|---|---|---|
| ☐ JOHN S. | ANAHEIM | LIBRARY | 10 | MASTERS | YES |
| ☐ JANE D. | BELL | AIRPORT | 5 | ASSOCIATES | NO |
| ☑ ALEX A. | CARSON | CITY ATTORNEY | 4 | BACHELORS | YES |

| SAVED RESUMES | SENT COMMENTS | REPLIES |

COMPOSE COMMENT —310

TO: ALEX ANDERSON —— 42

[MESSAGE TO PROSPECTIVE EMPLOYEE] —310

[SEND] [CANCEL]

| SAVED RESUMES | SENT COMMENTS | REPLIES |

306— SELECT FOLDER ▽  ADD / EDIT

DELETE  RESEND COMMENT  ADD FOLDER  MOVE TO FOLDER ▽

| NAME | RESIDENCE | MESSAGE | DATE/TIME |
|---|---|---|---|
| ☑ ALEX A. | CARSON | WELCOME TO THE.... | MM/DD/YYYY, 8:30 AM |

| SAVED RESUMES | SENT COMMENTS | REPLIES |

SENT COMMENT VIEW

TO: ALEX ANDERSON ——42

[MESSAGE TO PROSPECTIVE EMPLOYEE] —310

[RESEND] [CANCEL]

FIG. 15D

| SAVED RESUMES | SENT COMMENTS | REPLIES |

SELECT FOLDER ▼ EDIT

RESUME  DELETE  REPLY  ADD FOLDER    MOVE TO FOLDER ▼

| NAME | RESIDENCE | MESSAGE | DATE/TIME |
|------|-----------|---------|-----------|
| ☑ ALEX A. | CARSON | THANK YOU FOR.... | MM/DD/YYYY, 8:30 AM |

| SAVED RESUMES | SENT COMMENTS | REPLIES |

REPLY VIEW

FROM: ALEX ANDERSON — 42

[MESSAGE FROM PROSPECTIVE EMPLOYEE]

314

[REPLY]  [CANCEL]

FIG. 15F

| SAVED RESUMES | INBOX | SENT |

INBOX MESSAGE LIST OF PROSPECTIVE EMPLOYEE —— 42

<u>DELETE</u>   <u>REPLY</u>

| FROM | MESSAGE | DATE/TIME |

☑ <u>CITY OF DELTA</u>   <u>YOUR RESUME LOOKS GOOD....</u>   MM/DD/YYYY, 8:30 AM 30   310   (FIG. 15G)

FIG. 15G

| SAVED RESUMES | INBOX | SENT |

MESSAGE VIEW

FROM: CITY OF DELTA —— 30

[MESSAGE FROM CITY EMPLOYER – YOUR RESUME LOOKS GOOD....]

310   [ DELETE ]  [ CLOSE ]  [ REPLY ]

| SAVED RESUMES | INBOX | SENT |

REPLY MESSAGE

TO: CITY OF DELTA —— 30

[REPLY MESSAGE TO CITY]   (FIG. 15I)

314   [ CLOSE ]  [ SEND ]

FIG. 15I

| SAVED RESUMES | INBOX | SENT |
|---|---|---|

SENT MESSAGE LIST

<u>DELETE</u>

| TO | MESSAGE | DATE/TIME |
|---|---|---|
| ☑ <u>CITY OF DELTA</u> | <u>YOUR RESUME LOOKS GOOD....</u> | MM/DD/YYYY, 8:30 AM |

| SAVED RESUMES | INBOX | SENT |
|---|---|---|

MESSAGE VIEW

TO: CITY OF DELTA

[MESSAGE TO CITY EMPLOYER]

314

[ DELETE ] [ CLOSE ]

FIG. 16A 150

```
JOB ANNOUNCEMENTS SEARCH 150

SELECT SEARCH TYPE:

● MULTIPLE STATES 230
  ◎ BY STATE AND COUNTY 122
  ◎ BY MILES AWAY FROM ZIP CODE 130
```

FIG. 16B 230

```
SELECT STATE. HOLD DOWN CONTROL KEY AND CLICK TO SELECT
MULTIPLE STATES.

ALABAMA
  ALASKA
  ARIZONA            [NEXT>]
  ARKANSAS
  CALIFORNIA
```

```
SELECT STATE AND COUNTIES, THEN CITIES. HOLD DOWN
CONTROL KEY AND CLICK TO SELECT MULTIPLE COUNTIES/CITIES.

[CALIFORNIA ▽]      ----------SELECT ALL----------
                      ALAMEDA COUNTY | ALAMEDA
  ALAMEDA             ALAMEDA COUNTY | ALBANY
  ALPINE              ALAMEDA COUNTY | BERKELEY
  AMADOR              ALAMEDA COUNTY | DUBLIN
  BUTTE
  CALAVERAS           [NEXT>]  126
```

```
ENTER ZIP CODE AND SELECT MILES AWAY RADIUS

[5-DIGIT ZIP CODE]   [MILES AWAY ▽]   [NEXT>]
```

CHECK ALL JOB CATEGORIES OF INTEREST: —162

- ☑ ADMINISTRATION
- ☐ LIBRARY
- ☑ CITY ATTORNEY
- ☑ COMMUNITY SERVICES
- ☑ LEGISLATIVE
- ☐ RECREATION
- ☑ INTERGOVERNMENTAL
- ☐ PARKS
- ☑ FINANCE
- ☐ PUBLIC WORKS
- ☑ HUMAN RESOURCES
- ☐ PUBLIC WORKS
- ☑ RISK MANAGEMENT
- ☐ STREETS MAINTENANCE
- ☑ LEGAL
- ☐ ANIMAL CONTROL
- ☐ CODE ENFORCEMENT
- ☐ ENVIRONMENTAL
- ☑ PLAN CHECKING
- ☐ PUBLIC ARTS
- ☑ BUILDING
- ☐ HOUSING

- ☐ DEVELOPMENT SERVICES
- ☐ HEALTH SERVICES
- ☐ REDEVELOPMENT
- ☐ AIRPORT
- ☐ ECONOMIC DEVELOPMENT
- ☐ HARBORS / MARINAS
- ☐ PLANNING
- ☐ TRANSIT / TRANSPORTATION
- ☐ CITY CLERK'S OFFICE
- ☐ SOLID WASTE
- ☐ INFORMATION TECHNOLOGY
- ☐ VEHICLE MAINTENANCE
- ☐ FACILITIES MAINTENANCE
- ☐ TELECOMMUNICATIONS
- ☐ UTILITIES-ELECTRIC
- ☐ PUBLIC SAFETY-FIRE
- ☐ UTILITIES-WASTE WATER
- ☐ PUBLIC SAFETY-PARAMEDIC
- ☐ UTILITIES-WATER
- ☐ PUBLIC SAFETY-POLICE
- ☐ TELECOM SERVICES
- ☐ COMMUNITY DEVELOPMENT
- ☐ OTHER

[ NEXT> ]

SELECT FROM FOLLOWING JOB TYPES: —166

☑ CITY MANAGER  ☑ ASSISTANT DIRECTOR/CAPTAIN
☑ PROFESSIONAL  ☑ CLERICAL
☑ ASSISTANT CITY MANAGER  ☑ MANAGER/LIEUTENANT
☑ TECHNICAL  ☑ INTERNSHIP
☑ DIRECTOR/CHIEF  ☑ SUPERVISORY/SERGEANT
☑ SERVICE  ☑ ANY

SELECT FOLLOWING POSITIONS:

☑ FULL TIME  ☑ SEASONAL
☑ PART TIME  ☑ TEMPORARY

SELECT MINIMUM SALARY OR WAGE FOR JOBS SEARCH —178

⦿ [MONTHLY ▽] LOW: [$3,000.00]  TO  HIGH: [$4,000.00]

⦿ OPEN TO COMPETITIVE MARKET RATES

⦿ ANY AMOUNT OK  [NEXT>]

ENTER KEYWORDS OF JOB TITLE TO NARROW SEARCH ——— 234

| MANAGER, ANALYST, DIRECTOR |

⦿ MATCH ANY KEYWORDS    ◎ MATCH ALL KEYWORDS

ENTER NAME OF JOBS SEARCH BELOW AND SAVE

| MGR JOBS IN LA COUNTY |

◎ REFRESH UPON LOGIN    ⦿ JUST SAVE SEARCH

[ SAVE SEARCH ]

JOB ANNOUNCMENT SEARCH RESULTS [LIST VIEW] ——— 238 ——246

SEARCH RESULTS/SAVED SEARCH TITLE: MGR JOBS IN LA COUNTY

SAVE JOB    EMAIL    PRINT    APPLY

| Job Title | SALARY | CITY NAME | STATE | CLOSES |
|---|---|---|---|---|
| ☑ ANALYST | $##,###.### TO $##,###.## | DUARTE | CA | MM/DD/YYYY |
| ☑ DIRECTOR | $##,###.### TO $##,###.## | IRWINDALE | CA | MM/DD/YYYY |
| ☑ MANAGER | $##,###.### TO $##,###.## | COVINA | CA | MM/DD/YYYY |

(FIG. 16I)

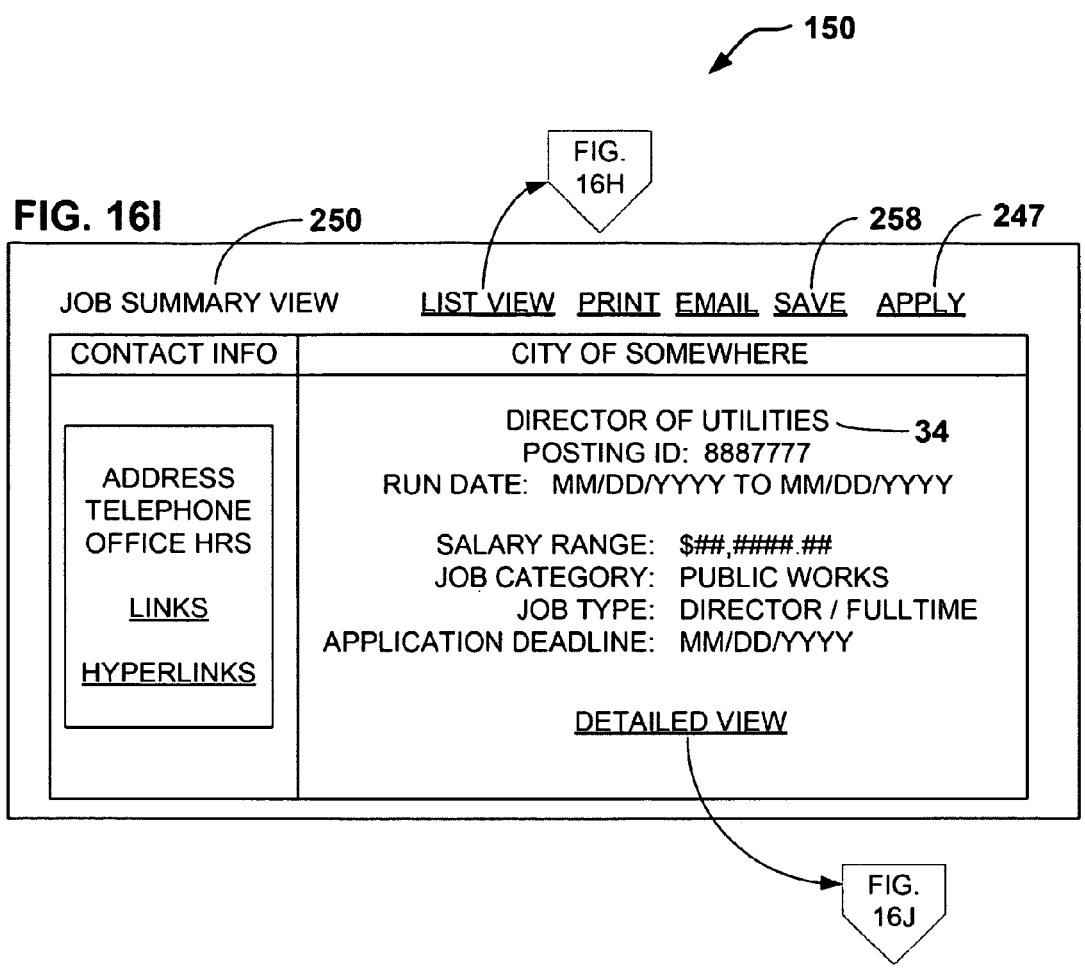

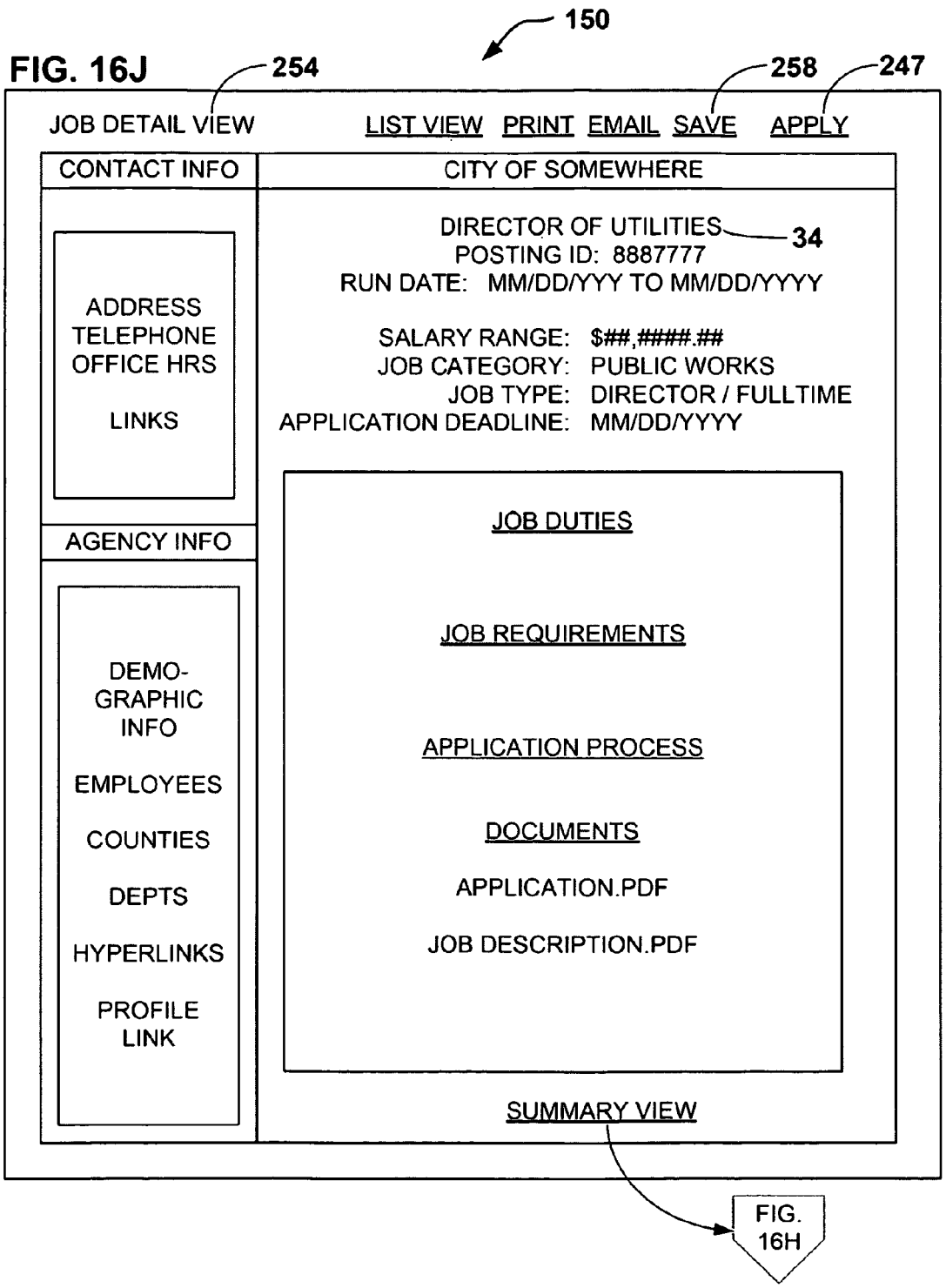

| NEW JOBS | SAVED JOB SEARCHES | SAVED CITY LINKS | SAVED JOBS |
|---|---|---|---|

SETTINGS (→ FIG. 16M)

SAVED JOBS SEARCHES BY NAME

151 — REFRESH   153 — SHOW RESULTS   EDIT   DELETE

| SRCH NAME | CREATED | JOB CATEGORIES | STATES | COUNTIES | CITIES | JOBS |
|---|---|---|---|---|---|---|
| ☑ SEARCH 1* | 10/11/2008 | FINANCE | 1 | 2 | 98 | 34 |
| ☑ SEARCH 2 | 11/12/2009 | ZOO | 1 | 3 | 120 | 20 |
| ☑ SEARCH 3 | 12/23/2009 | RECREATION | 2 | 107 | 890 | 76 |

*INDICATES SEARCH TO REFRESH UPON LOGIN (→ FIG. 16L)

FIG. 16L

| NEW JOBS | SAVED JOB SEARCHES | SAVED CITY LINKS | SAVED JOBS |
|---|---|---|---|

SETTINGS (→ FIG. 16M)

SEARCH RESULTS/SAVED SEARCH TITLE: SEARCH 3

157 — SAVE JOB   159 — EMAIL   161 — PRINT   247 — APPLY 238, 246

| JOB TITLE | SALARY | CITY NAME | STATE | CLOSES |
|---|---|---|---|---|
| ☑ ANALYST | $##,###.### TO $##,###.## | DUARTE | CA | MM/DD/YYYY |
| ☑ DIRECTOR | $##,###.### TO $##,###.## | IRWINDALE | CA | MM/DD/YYYY |
| ☑ MANAGER | $##,###.### TO $##,###.## | COVINA | CA | MM/DD/YYYY |

| NEW JOBS | SAVED JOB SEARCHES | SAVED CITY LINKS | SAVED JOBS |

SETTINGS

SETTINGS OF SAVED JOB SEARCHES

1. SELECT SEARCH TO EXECUTE UPON LOGIN:

[ SEARCH 1 ▼ ] ——150    FIG. 16O

2. WHEN REFRESHING YOUR SAVED SEARCH, DISPLAY JOBS POSTED IN LAST:
   - ◎ 2 DAYS
   - ◎ 7 DAYS
   - ◎ 30 DAYS
   - ● 45 DAYS

3. SET NUMBER OF JOBS TO DISPLAY PER PAGE:

[ 100 ▼ ]

[ CANCEL ]   [ SAVE ]

FIG. 16N

| NEW JOBS | SAVED JOB SEARCHES | SAVED CITY LINKS | SAVED JOBS |

DELETE    EMAIL    PRINT    APPLY    — 258

| Job Title | SALARY | CITY NAME | STATE | CLOSES |
|---|---|---|---|---|
| ☑ ANALYST | $##,###.### TO $##,###.## | DUARTE | CA | MM/DD/YYYY |
| ☑ DIRECTOR | $##,###.### TO $##,###.## | IRWINDALE | CA | MM/DD/YYYY |
| ☑ MANAGER | $##,###.### TO $##,###.## | COVINA | CA | MM/DD/YYYY |

| NEW JOBS | SAVED JOB SEARCHES | SAVED CITY LINKS | SAVED JOBS |
|---|---|---|---|

SAVED SEARCH TITLE: SEARCH 1     SETTINGS

SAVE JOB   EMAIL   PRINT   APPLY 238    *REFRESHING, PLEASE WAIT...*

| Job Title | SALARY | CITY NAME | STATE | CLOSES |
|---|---|---|---|---|
| ☐ ANALYST | $##,###.### TO $##,###.## | DUARTE | CA | MM/DD/YYYY |
| ☑ DIRECTOR | $##,###.### TO $##,###.## | IRWINDALE | CA | MM/DD/YYYY |
| ☐ MANAGER | $##,###.### TO $##,###.## | COVINA | CA | MM/DD/YYYY |

| NEW JOBS | SAVED JOB SEARCHES | SAVED CITY LINKS | SAVED JOBS |
|---|---|---|---|

SETTINGS

SETTINGS FOR JOBS SEARCH UPON LOGIN

1. SELECT SEARCH TO EXECUTE UPON LOGIN:

[NAMED SAVED SEARCH 1 ▼] —150

2. SHOW RESULTS UPON LOGIN FOR JOBS POSTED IN THE LAST:
   - ◉ 2 DAYS
   - ◉ 7 DAYS
   - ◉ 30 DAYS
   - ● 45 DAYS

—242

3. EMAIL JOB ANNOUNCEMENTS TO REGISTERED EMAIL ADDRESS WHEN THEY ARE POSTED?
   - ● YES    ◉ NO

4. SET NUMBER OF JOBS TO DISPLAY PER PAGE:

[100 ▼]

[CANCEL] [SAVE] → FIG. 16O

```
┌─────────────────────────────────────────────────────────────┐
│              EMPLOYMENT APPLICATION                          │
│              CITY OF BETA, CALIFORNIA                        │
│              POSITION BEING APPLIED FOR:                     │
│              MANAGEMENT ANALYST                              │
│                                                              │
│ ENTER FOLLOWING INFORMATION:                                 │
│                                                              │
│ NAME:          [FIRST NAME]  [M.I.]  [LAST NAME]             │
│ ADDRESS:       [ST. NO.]  [STREET NAME]                      │
│ UNIT NUMBER:   [UNIT]                                        │
│ CITY:          [CITY NAME]  STATE: [VA ▼]                    │
│ ZIP CODE:      [80000]                                       │
│ TELEPHONE:     [000-000-0000]                                │
│ WORK PHONE:    [000-000-0000]                                │
│ EMAIL ADDRESS: [JOHNSMITH@EMAIL.COM]                         │
│ DRIVER'S LICENSE: [NUMBER]  STATE: [VA ▼]  [CLASS]           │
│                                                              │
│ HAVE YOU EVER BEEN CONVICTED FOR VIOLATING THE LAW EXCLUDING │
│ MINOR TRAFFIC VIOLATIONS?                                    │
│         ◎ YES      ● NO                                      │
│                                                              │
│ HAVE YOU EVER BEEN TERMINATED FROM A POSITION OR ASKED TO    │
│ RESIGN?                                                      │
│         ◎ YES      ● NO                                      │
│                                                              │
│ ARE YOU OVER 18 YEARS OF AGE?                                │
│         ◎ YES      ● NO                                      │
│                                              ┌─────┐         │
│                                              │ FIG.│         │
│                                              │ 16R │         │
│                      [CANCEL]  [NEXT]        └─────┘         │
└─────────────────────────────────────────────────────────────┘
```

FIG. 16R 230

EDUCATION:

HIGHEST GRADE COMPLETED:

8  9  10  11  12    AA/AS  BA/BS  MASTERS  DOCTORATE
◎  ◎  ◎   ◎   ●    ◎      ◎      ◎        ◎

GRADUATE FROM HIGH SCHOOL OR GED?

◎ YES   ● NO

HIGH SCHOOL ATTENDED: [NAME OF HS]  [LOCATION]

ENTER COLLEGES ATTENDED, INCLUDING ANY TECHNICAL OR MILITARY SCHOOLS:

| SCHOOL NAME | ADDRESS | DEGREE | MAJOR |
| SCHOOL NAME | ADDRESS | DEGREE | MAJOR |

ENTER ANY CERTIFICATES, LICENSES, REGISTRATIONS OR OTHER SPECIALIZED TRAINING:

REGISTERED PROFESSIONAL ENGINEER

IF APPLICABLE, EXPLAIN WHY YOU WERE TERMINATED FROM PRIOR POSITION:

EXPLANATION HERE

IF APPLICABLE, LIST OFFENSES, DATES, AND LOCATION WHERE OFFENSE OCCURRED:

EXPLANATION HERE

[CANCEL]  [NEXT] → FIG. 16S

INDICATE ETHNICITY:

⦿ WHITE  ⦿ BLACK  ⦿ HISPANIC  ⦿ ASIAN  ⦿ OTHER

INDICATE GENDER:

⦿ MALE  ⦿ FEMALE

INDICATE DISABILITIES:

☑ HEARING  ☑ SIGHT  ☑ SPEECH  ☑ OTHER  ☑ NONE

---

INDICATE WHERE YOU FIRST HEARD ABOUT THIS JOB:

⦿ MEDIA 1  ⦿ MEDIA 2  ⦿ MEDIA 3  ⦿ MEDIA 4

---

SUPPLEMENTAL QUESTIONS:

1. IN PAST YEAR, HOW MANY TIMES HAVE YOU BEEN LATE TO WORK?

2. IN PAST YEAR, HOW MANY TIMES HAVE YOU CALLED IN SICK WHEN YOU WERE NOT SICK?

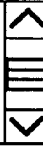

[ CANCEL ]  [ NEXT ] → FIG. 16U

UPLOAD UP TO 3 DOCUMENTS WITH YOUR JOB APPLICATION:

[ENTER FILE TITLE]

FILENAME.PDF    BROWSE

UPLOAD

1. JOB DESCRIPTION    DELETE
   FILENAME1.PDF

2. JOB APPLICATION    DELETE
   FILENAME2.PDF

CANCEL   SUBMIT — 231

FIG. 17A ← 154

PROSPECTIVE JOB ANNOUNCEMENT SEARCH ← 154

SELECT SEARCH TYPE:
- ⦿ BY STATE AND COUNTY — 122
- ⦿ BY MILES AWAY FROM ZIP CODE — 130
- ⦿ BY CITY LOOK UP — 126

FIG. 17B — 122

SELECT STATE AND COUNTIES, THEN CITIES. HOLD DOWN CONTROL KEY AND CLICK TO SELECT MULTIPLE COUNTIES/CITIES.

| CALIFORNIA ▼ |

ALAMEDA COUNTY
ALPINE COUNTY
AMADOR COUNTY
BUTTE COUNTY
CALAVERAS COUNTY

----------SELECT ALL----------
ALAMEDA COUNTY | ALAMEDA
ALAMEDA COUNTY | ALBANY
ALAMEDA COUNTY | BERKLEY
ALAMEDA COUNTY | DUBLIN

[ NEXT> ]

ENTER ZIP CODE AND SELECT MILES AWAY RADIUS

[5-DIGIT ZIP CODE]  [MILES AWAY] ▼   [ NEXT> ]

ENTER CITY NAME AND SELECT STATE

[CITY NAME]   [SELECT STATE ▼]

SELECT MATCHING CITY NAME AND CLICK NEXT

ALAMEDA, CITY OF

126

[ NEXT> ]

CHECK ALL JOB CATEGORIES OF INTEREST:

- ☑ ADMINISTRATION
- ☐ LIBRARY
- ☐ CITY ATTORNEY
- ☐ COMMUNITY SERVICES
- ☐ LEGISLATIVE
- ☐ RECREATION
- ☐ INTERGOVERNMENTAL
- ☐ PARKS
- ☐ FINANCE
- ☐ PUBLIC WORKS
- ☐ HUMAN RESOURCES
- ☐ PUBLIC WORKS
- ☐ RISK MANAGEMENT
- ☐ STREETS MAINTENANCE
- ☐ LEGAL
- ☐ ANIMAL CONTROL
- ☐ CODE ENFORCEMENT
- ☐ ENVIRONMENTAL
- ☐ PLAN CHECKING
- ☐ PUBLIC ARTS
- ☐ BUILDING
- ☐ HOUSING

- ☐ DEVELOPMENT SERVICES
- ☐ HEALTH SERVICES
- ☐ REDEVELOPMENT
- ☐ AIRPORT
- ☐ ECONOMIC DEVELOPMENT
- ☐ HARBORS / MARINAS
- ☐ PLANNING
- ☐ TRANSIT / TRANSPORTATION
- ☐ CITY CLERK'S OFFICE
- ☐ SOLID WASTE
- ☐ INFORMATION TECHNOLOGY
- ☐ VEHICLE MAINTENANCE
- ☐ FACILITIES MAINTENANCE
- ☐ TELECOMMUNICATIONS
- ☐ UTILITIES-ELECTRIC
- ☐ PUBLIC SAFETY-FIRE
- ☐ UTILITIES-WASTE WATER
- ☐ PUBLIC SAFETY-PARAMEDIC
- ☐ UTILITIES-WATER
- ☐ PUBLIC SAFETY-POLICE
- ☐ TELECOM SERVICES
- ☐ COMMUNITY DEVELOPMENT
- ☐ OTHER

[ NEXT> ]

SELECT FROM FOLLOWING JOB TYPES: — 166

☑ CITY MANAGER     ☐ ASSISTANT DIRECTOR/CAPTAIN
☐ PROFESSIONAL     ☐ CLERICAL
☐ ASSISTANT CITY MANAGER     ☐ MANAGER/LIEUTENANT
☐ TECHNICAL     ☐ INTERNSHIP
☐ DIRECTOR/CHIEF     ☐ SUPERVISORY/SERGEANT
☐ SERVICE     ☐ ANY

SELECT FOLLOWING POSITIONS:

☑ FULL TIME     ☐ SEASONAL
☐ PART TIME     ☐ TEMPORARY

[ NEXT> ]

PROSPECTIVE JOB ANNOUNCEMENTS SEARCH RESULTS — 154, 262, 266

| SAVE | JOB CATEGORY ▽ | JOB TYPE ▽ | | | 264 |
|---|---|---|---|---|---|
| Job Title | DEPT NAME | CITY NAME | COUNTY | STATE | STATUS |
| ANALYST | LIBRARY | ANAHEIM | ORANGE | CA | SAVED |
| DIRECTOR | FINANCE | BUENA PARK | ORANGE | CA | SAVE |
| MANAGER | ENGINEERING | DUARTE | LOS ANGELES | CA | SUBMITTED |

FORM VIEW OF PROSPECTIVE JOB ANNOUNCEMENT — 38  LIST VIEW  (FIG. 17G)

CONTACT INFO

ADDRESS
TELEPHONE
OFFICE HRS

HYPERLINKS — 78

PROFILE LINK — 66

PROSPECTIVE JOB ANNOUNCEMENT
BY CITY OF ANAHEIM

JOB TITLE: ANALYST — 38
DEPARTMENT: LIBRARY — 74
JOB CATEGORY: LIBRARY — 162
JOB TYPE: PROFESSIONAL / FULLTIME
DATE POSTED: MM/DD/YYYY
— 166

[ SAVE ] — 217   [ SUBMIT ] — 221

FIG. 17I

SAVED PROSPECTIVE JOB ANNOUNCEMENTS — 266

DELETE   SUBMIT

| Job Title | DEPT NAME | CITY NAME | STATE | SAVED | SUBMIT |
|---|---|---|---|---|---|
| ☑ ANALYST | LIBRARY | ANAHEIM | CA | MM/DD/YYYY | SUBMIT |
| ☑ DIRECTOR | FINANCE | BREA | CA | MM/DD/YYYY | SUBMIT |
| ☑ MANAGER | ENGINEERING | DUARTE | CA | MM/DD/YYYY | SUBMIT |

SUBMITTED PROSPECTIVE JOB ANNOUNCEMENTS — 266

DELETE   MOVE TO SAVED

| Job Title | DEPT NAME | CITY NAME | STATE | EXPIRES |
|---|---|---|---|---|
| ☑ ANALYST | LIBRARY | ANAHEIM | CA | MM/DD/YYYY |
| ☑ DIRECTOR | FINANCE | BUENA PARK | CA | MM/DD/YYYY |
| ☑ MANAGER | ENGINEERING | DUARTE | CA | MM/DD/YYYY |

JOB ANNOUNCEMENTS FROM SUBMITTED INTEREST IN PROSPECTIVE JOBS

SHOW JOB   DELETE   MOVE TO SAVED JOBS   APPLY

| JOB TITLE | SALARY RANGE | CITY NAME | STATE | CLOSES | SAVE |
|---|---|---|---|---|---|
| ☑ ANALYST | $### TO $### | ANAHEIM | CA | MM/DD/YYYY | SAVE |
| ☑ DIRECTOR | $### TO $### | ANAHEIM | CA | MM/DD/YYYY | SAVE |
| ☑ MANAGER | $### TO $### | ANAHEIM | CA | MM/DD/YYYY | SAVE |

CITY LINKS SEARCH —— 330

SELECT SEARCH TYPE:
- ⦿ BY STATE AND COUNTY —— 122
- ⦿ BY MILES AWAY FROM ZIP CODE —— 130
- ⦿ BY CITY LOOK UP —— 126

FIG. 18B —— 122

SELECT STATE AND COUNTIES, THEN CITIES. HOLD DOWN CONTROL KEY AND CLICK TO SELECT MULTIPLE COUNTIES/CITIES.

| CALIFORNIA ▽ | ——————SELECT ALL—————— |
|---|---|
| ALAMEDA COUNTY | ALAMEDA COUNTY \| ALAMEDA |
| ALPINE COUNTY | ALAMEDA COUNTY \| ALBANY |
| AMADOR COUNTY | ALAMEDA COUNTY \| BERKLEY |
| BUTTE COUNTY | ALAMEDA COUNTY \| DUBLIN |
| CALAVERAS COUNTY | |

[ NEXT> ]

ENTER ZIP CODE AND SELECT MILES AWAY RADIUS

[5-DIGIT ZIP CODE] [MILES AWAY]▽ [ NEXT> ]

ENTER CITY NAME AND SELECT STATE

[CITY NAME] [SELECT STATE ▽]

SELECT MATCHING CITY NAME AND CLICK NEXT

ALAMEDA, CITY OF

[ NEXT> ]

→ FIG. 18E

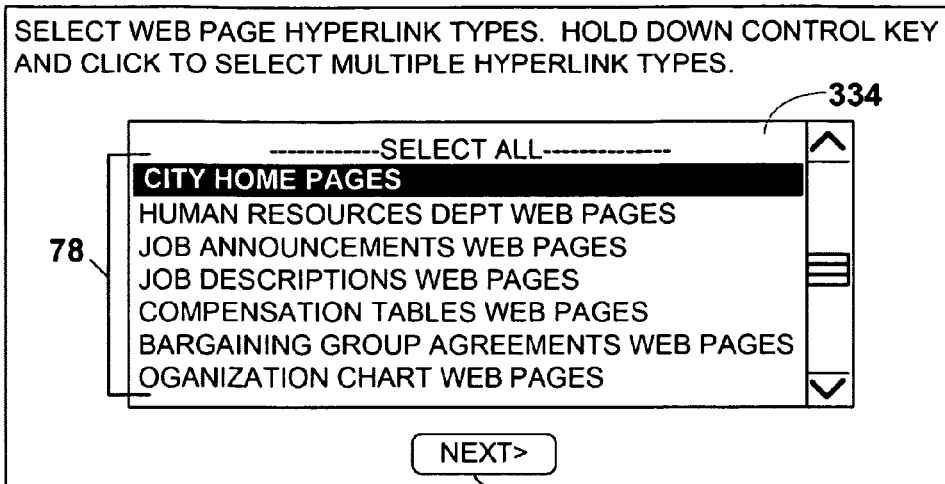

FIG. 18H

SAVED CITY LINKS [CITY EMPLOYER MODULE]

| YOUR LINKS | SAVED LINKS | SENT | INBOX |

— 346

DELETE  SEND MESSAGE  [SELECT LINK TYPE ▼]     78

| CITY NAME | STATE | COUNTY | LINK TYPE | PROFILE |
|---|---|---|---|---|
| ☐ ALHAMBRA | CA | LOS ANGELES | HOME PAGE | BASIC |
| ☐ ARCADIA | CA | LOS ANGELES | HOME PAGE | AGENCY |
| ☑ BALDWIN PARK | CA | LOS ANGELES | HOME PAGE | SAVED |

FIG. 18I

SENT MESSAGES TO OTHER CITIES [CITY EMPLOYER MODULE]

| YOUR LINKS | SAVED LINKS | SENT | INBOX |

346 —  [SELECT FOLDER ▼]  ADD / EDIT

DELETE  RESEND MESSAGE  ADD FOLDER   [MOVE TO FOLDER ▼]

| TO | MESSAGE | DATE/TIME | |
|---|---|---|---|
| ☐ ALHAMBRA | HELLO, I'M DOING RESEAC.... | MM/DD/YYYY | 10:40 AM |
| ☐ ARCADIA | HI, DO YOU HAVE JOB DES.... | MM/DD/YYYY | 10:50 AM |

RECEIVED MESSAGES FROM OTHER CITIES [CITY EMPLOYER MODULE]

| YOUR LINKS | SAVED LINKS | SENT | INBOX |

346 —  [SELECT FOLDER ▼]  ADD / EDIT

DELETE  REPLY  ADD FOLDER    [MOVE TO FOLDER ▼]

| FROM | MESSAGE | DATE/TIME | |
|---|---|---|---|
| ☐ ALHAMBRA | HELLO, I'M DOING RESEAR.... | MM/DD/YYYY | 10:40 AM |
| ☐ ARCADIA | HI, DO YOU HAVE JOB DES.... | MM/DD/YYYY | 10:50 AM |

CITY PROFILES SEARCH —67

SELECT SEARCH TYPE: —122

○ BY STATE AND COUNTY
○ BY MILES AWAY FROM ZIP CODE —130
○ BY CITY LOOK UP
—126

FIG. 19B —122

SELECT STATE AND COUNTIES, THEN CITIES. HOLD DOWN CONTROL KEY AND CLICK TO SELECT MULTIPLE COUNTIES/CITIES.

| CALIFORNIA ▼ | ----------SELECT ALL---------- |
|---|---|
| ALAMEDA COUNTY | ALAMEDA COUNTY | ALAMEDA |
| ALPINE COUNTY | ALAMEDA COUNTY | ALBANY |
| AMADOR COUNTY | ALAMEDA COUNTY | BERKLEY |
| BUTTE COUNTY | ALAMEDA COUNTY | DUBLIN |
| CALAVERAS COUNTY | |

[NEXT>]

ENTER ZIP CODE AND SELECT MILES AWAY RADIUS

[5-DIGIT ZIP CODE] [MILES AWAY]▼ [NEXT>]
—130

ENTER CITY NAME AND SELECT STATE

[ALAMEDA] [CALIFORNIA ▼]
—126

SELECT MATCHING CITY NAME AND CLICK NEXT

ALAMEDA, CITY OF       [NEXT>]

CITY PROFILES SEARCH RESULTS —133

SAVE ——131    [PROFILE TYPE ▼]

| CITY NAME | STATE | COUNTY | POP | PROSPECTIVE JOBS | CURRENT JOBS | SAVE |
|---|---|---|---|---|---|---|
| ☐ ALAMEDA | CA | ALAMEDA | 80,000 | 40 | 4 | SAVED |
| ☐ ALBANY | CA | ALAMEDA | 20,000 | 10 | 4 | SAVE |
| ☑ BERKELEY | CA | ALAMEDA | 70,000 | 30 | 4 | SAVE |

SAVED CITY PROFILES [PROSPECTIVE EMPLOYEES MODULE] —134, —138

[ SAVED PROFILES ] [ JOB POSTINGS ] [ PROSPECTIVE JOBS ] [ CITY LINKS ]

DELETE    142    [PROFILE TYPE ▼]    —146

| CITY NAME | STATE | COUNTY | POP | PROSPECTIVE JOBS | CURRENT JOBS | DELETE |
|---|---|---|---|---|---|---|
| ☐ ALAMEDA | CA | ALAMEDA | 80,000 | 40 | 4 | DELETE |
| ☐ ALBANY | CA | ALAMEDA | 20,000 | 10 | 4 | DELETE |
| ☑ BERKELEY | CA | ALAMEDA | 70,000 | 30 | 4 | DELETE |

| SAVED CITY PROFILES [PROSPECTIVE EMPLOYEES MODULE] | | | | |
|---|---|---|---|---|
| SAVED PROFILES | JOB POSTINGS | PROSPECTIVE JOBS | | CITY LINKS |

142 ← SELECT CITY NAME ▼

SAVE JOB  EMAIL  PRINT  — 30

| Job Title | SALARY | CITY NAME | STATE | CLOSES |
|---|---|---|---|---|
| ☑ ANALYST | $##,###.### TO $##,###.## | DUARTE | CA | MM/DD/YYYY |
| ☑ DIRECTOR | $##,###.### TO $##,###.## | IRWINDALE | CA | MM/DD/YYYY |
| ☑ MANAGER | $##,###.### TO $##,###.## | COVINA | CA | MM/DD/YYYY |

FIG. 19H

| SAVED CITY PROFILES [PROSPECTIVE EMPLOYEES MODULE] —138 | | | | |
|---|---|---|---|---|
| SAVED PROFILES | JOB POSTINGS | PROSPECTIVE JOBS | | CITY LINKS |

SELECT CITY NAME ▼

SAVE JOB  EMAIL  PRINT  — 30

| Job Title | DEPARTMENT | CITY NAME | STATE | STATUS |
|---|---|---|---|---|
| ☑ ANALYST | LIBRARY | DUARTE | CA | SUBMITTED |
| ☑ DIRECTOR | PUBLIC WORKS | IRWINDALE | CA | SUBMIT |
| ☑ MANAGER | WATER UTILITY | COVINA | CA | SAVED |

FIG. 19I

| SAVED CITY PROFILES [PROSPECTIVE EMPLOYEES MODULE] | | | —146 |
|---|---|---|---|
| SAVED PROFILES | JOB POSTINGS | PROSPECTIVE JOBS | CITY LINKS |

SELECT CITY NAME ▼    SELECT LINK TYPE ▼

SAVE   — 30    — 78

| CITY HYPERLINK | CITY NAME | STATE |
|---|---|---|
| ☑ JOB ANNOUNCEMENTS | DUARTE | CA |
| ☑ HOME PAGE | IRWINDALE | CA |
| ☑ HUMAN RESOURCES | COVINA | CA |

PROSPECTIVE CITY GOVERNMENT JOBS POSTING SYSTEM FOR MULTIPLE CITY GOVERNMENT EMPLOYERS WITH INTEGRATED SERVICE FEATURES

FIELD OF INVENTION

This invention relates to the field of jobs placement in a municipal government employment setting. More specifically, the invention relates to an electronic database system that allows applicants to search for presently available jobs and prospective jobs that are not yet available but ones that will eventually be advertised as job openings posted by municipal government entities.

BACKGROUND OF THE INVENTION

Many city government jobs provide long term career opportunities that can be very rewarding to employees. Prospective employees best qualified for city government jobs, however, are usually persons with experience working for municipal entities since few high-level city government jobs have private sector equivalents. However, finding city government jobs can be a cumbersome and time consuming task, even for experienced city government employees. First, city governments must comply with civil service hiring laws which typically require that competitive and transparent procedures be used to fill vacant positions. This reduces the importance of electronic resumes and puts more emphasis on the need for prospective employees to submit a quality job application, score high on written tests, and do well during oral interviews. Participating in such processes takes preparation and time, and usually forces prospective employees to be very selective about which positions they apply for.

Second, because of restrictive purchasing policies, limited advertising budgets, and competing priorities for public funds, city governments do not widely advertise to fill vacant positions. This makes it unlikely that city government career job seekers will find very many entry level and mid-level municipal government job postings online over high-profile websites like Monster.com and CareerBuilder.com. Most city governments will typically post job openings on their own websites, but tend not to use the large multi-industry job posting websites. Finding job openings on each city's website presents prospective employees with other challenges, like finding the job announcements web page amongst many other city government web pages promoting the latest city recreation event or environmental program. And even if a city government has made an effort to more prominently display their job announcements web page to job seekers, prospective employees must first find the home page of the city government where they want to look for jobs, which can often be time consuming in itself.

From the perspective of the city government human resources professional, posting a job announcement is only one task among many in maintaining a vibrant and qualified workforce. One of the central responsibilities of a municipal government's human resources department is the administration of the position classification system, which is made up of job titles, each of which has its own job specification which is a written description of what job functions are performed by the corresponding job title and what qualifications are required of a person to execute the duties of the position. These position specifications are also referred to as job descriptions and position class specifications. Each job description is assigned typically to a bargaining group that has entered into an agreement with the municipal government. These bargaining group agreements govern salary, benefits and general conditions of employment and are also referred to as Memorandum of Understandings or MOUs. Each MOU is negotiated and renewed periodically within budgetary policies and available resources.

A challenge posed by the position classification system is the diversity of the municipal government workforce. The positions included in city government organizations range from highly technical positions like an Electrical Engineer, Geographic Information Systems Analyst, Police Telecommunications Specialist, and Water Treatment Plant Operator, to management positions like Police Captain, Public Works Director, and Economic Development Director, to service positions like Customer Service Representative, Firefighter, Street Worker, and Meter Reader. Each job category has its own set of experience and education requirements, licenses and certifications which indicates certain qualifications and competencies in the respective field. Knowing what these are and incorporating them into job specifications is very challenging but necessary to maintaining high standards for employees and new recruits.

The position classification system combined with bargaining group agreements serves a vital role to a city government being able to compete for highly qualified labor and to retain quality staff. Since most mid-level and executive positions in municipal government do not have private sector equivalents, city government human resource professionals often conduct salary and benefit surveys to ensure that their city governments wages, salaries and benefits are competitive with those of surrounding city governments. Surveys to conduct job classification studies are also commonplace to ensure job requirements meet industry and safety standards and serve the functional needs of city departments. Therefore, having access to other city government bargaining group agreements, salary and wage information, and position class specifications, is indispensable for each city government to maintain a competitive position classification system.

When it comes time to conduct recruitments, city governments typically post vacant positions on their own websites as noted previously and in city government trade journals and industry publications. These media usually have limited exposure, but target the right audience—government employees. However, given the lengthy recruitment process (application submittal and review; supplemental questionnaire submittal and review; written testing and evaluations; and multiple oral interviews) the city departments that request recruitments to fill vacant positions are often disappointed with the results and even more disappointed in how long the recruitment process takes to fill vacant positions. Dealing with unhappy city government departments then becomes another challenge faced by city government human resources professionals.

Given the challenges confronted by both city government career job seekers and by city government human resources professionals, it is difficult to design and configure a system that meets the needs of all interested parties. Prospective employees and city government human resources professionals both need faster access to resources and pertinent information to achieve their respective goals more efficiently. In the case of prospective employees, having faster access to a greater number of job announcements is of paramount importance. Being able to find specialty jobs that represent a progression in a job seeker's city government career track is critically important to the prospective employees chance of success. Since most city government job openings are not posted to high-profile online websites, this means that prospective employees potentially need faster access to individual city government job announcement web pages. To make it worthwhile for a city government to post a job on a job postings website, they need some assurance that those who view their job postings will have relevant city government experience. Such assurance may be enhanced if prospective employees could express interest in potential job announcements before they became active job postings, provided the city government could view the prospective employees resume. This would enable human resources professionals to inform other city government departments about the quality of potential applicants that might respond to a job announcement for a particular position before the job posting is made public. Prospective employees would need a fast way to find such prospective job announcements and express interest to the city government that posted the prospective job announcement. Such proactive exchanges of information could make posting job announcements much more effective at reaching a qualified applicant pool and permit prospective employees to apply for more jobs more quickly, thus improving the likelihood of finding career advancement opportunities in municipal government that are instrumental for long-term personal growth and fulfillment.

Various systems have been developed to assist governmental entities and potential job applicants to identify and contact each other, however, few of them seem to encompass the features needed by local governments and city government career job seekers.

U.S. Patent Application No. 2008/0201162, published for Hart, is directed to an E-interview system and method. This system includes means to create, present, and search "E-Interview" information. E-Interview information may comprise one or more of the following: a resume, a cover letter, a personality profile and interests, a perfect or ideal job description exercise, a character and values profile, a values statement, career goals, pre-answered job questions, other profiles or information selected by the applicant, employment questionnaires related to job function and values philosophy, goal-setting and job search tools, and video presentations. The information may be presented in a single website, as opposed to multiple websites or sources. A website containing multiple E-Interviews may be accessible by potential employers. The site may include a variety of tools to assist the employer in creating job profiles, evaluating candidates, building a talent pool, and the like, and tools to assist a job-seeker to create and present the E-Interview information.

U.S. Patent Application No. 2007/0033064, published for Abrahamson illustrates a method of and system for capturing data. This system includes Applicant Tracking System (ATS) software that is provided to multiple constituents (e.g., contributors, companies, recruiters) with reduced fees or without any fees as an incentive for them to contribute resumes. The ATS software may provide functionalities such as resume reviewing, resume searching, resume ranking according to pre-established criteria, interview scheduling, referral gathering, collection of interviewer feedback, reporting, etc. In addition, the ATS software may automatically generate letters acknowledging receipt of the candidates' applications, generate emails to turn down applicants once a position is filled, and store the resumes as permanent records for the company's own use in the future. Furthermore, the ATS software stores in the online aggregated resume database the resumes of applicants that are no longer in consideration for a position. Note that the ATS software may be used by multiple constituents or distributed to multiple constituents such that the ATS software collects resumes and other data from a network of constituents/contributors.

U.S. Patent Application No. 2008/0208907, published for Tolve et al. is directed to employment recruiting. This system includes recruiting systems having a job definitions database (the definitions having subject-level job criteria and offerings), a workforce-profile database of individual profiles (the profiles having subject-level individual qualifications and individual preferences), an information manager, and a communications port for access to the system. The information manager interacts with the job definitions database, the workforce-profile database and the communications port to permit bi-directional subject-level matching between the job definitions database and the workforce-profile database and to permit information and queries to pass through the communications port. The disclosure also includes methods of matching individuals with job definitions that use systems and apparatus of the type described above. The methods include comparing job criteria of the job definitions database with qualifications of the workforce-profile database, and identifying individuals qualified for a job definition in response to detecting a match between predetermined ones of the criteria and the qualifications.

U.S. Patent Application No. 2005/0080657, published for Crowe et al. is directed to matching job candidate information. This system includes means to collect a pool of applicant resumes. Based on the resumes, some of applicants are chosen for interviews; based on the interviews, offers are extended to a select few. Resumes can be collected in a variety of ways. With recent advances in computer technology, it is commonplace to collect resumes over the Internet via email or the World Wide Web. The Internet allows an applicant from anywhere in the world to send a resume in electronic form. Thus, the recruiter now has an incredibly large pool from which to choose applicants.

U.S. Patent Application No. 2004/0186852, published for Rosen discloses an Internet based system of employment referencing and employment history verification for the creation of a human capital database. This system includes an Employer Resume Collection Service. This system will allow an employer to collect resumes or job applications from applicants. The system is basically a simple document management system in which the employer manages two types of documents: one is a single request document, most likely a job application form, and all others are response documents uploaded by applicants.

U.S. Patent Application No. 2008/0162274, published for Newman is directed to a computerized tool providing learning distribution. This system includes a platform, at least one input device, and a central processing unit in communication with the platform and the at least one input device. The central processing unit is configured to identify an individual's role and position within an organization and at least one competency required by the role and position. The central processing unit is also configured to determine the individual's proficiency level in the competency and select at least one learning unit from a plurality of available learning units based on the identified proficiency level. The central processing unit is further configured to provide the at least one selected learning unit to the individual for completion.

In one aspect, database may include organization job role information, which may include information about all possible job roles within the organization. For example, each job role may fall within a certain department, which may fall within a certain division, which may fall within an overall enterprise. Each job role may include specific required competencies, which may be divided into, for example, technical (hard) competencies and soft competencies. The competencies may define certain skill sets necessary to perform the job role successfully. Each job role may also have a proficiency level goal or target proficiency level for each of the competencies. The proficiency level goal may define a level of skill required for the competency to ensure the employee may perform satisfactorily and meet the demands of the job role. Additionally, a job role may require the employee to possess or obtain one or more certifications. All such data may be contained within job role information.

The database may also include information about each employee within the user population. For example, employee information may include position information containing the enterprise, division, department, and job role in which each employee is situated. Further, individual position information may include the employee's current competencies and respective proficiency levels, as well as any certifications possessed. Employee information may also include transcript information about each employee in the user population.

U.S. Patent Application No. 2008/0097781, published for Clarke et al. is directed to an employment sourcing system. This system stores information from employment seeking candidates, evaluates each candidate's job-related qualifications based on criteria set by the employer, quickly eliminates unqualified candidates, and tracks the source that referred the candidate. A candidate enters the web site of the operator of the system from a client's homepage. Each new transfer from a client homepage accrues an identifying "token." Preferably, these tokens are used to charge the client for each candidate entering the system that fully completes the registration process.

After entering the system, a screen listing available job opportunities is displayed to the candidate, which may be include information regarding the client, type of position or location of position. If the candidate is interested in applying for a position, he or she is directed to the registration manager screen. A previously registered candidate may update his or her resume or further pursue a job search. If the candidate is not registered, the candidate will be asked to fill out the resume template. The completed resume template is kept in the system database. If there is a reason to contact the candidate, such as an available position that the candidate may be qualified for, based on information provided in the resume template screen, such as skills, experience, job preferences, etc., the candidate will be notified, preferably by email.

It is an objective of the present invention to provide city governments with an industry-specific online jobs posting system. It is a further objective of the present invention to provide city governments with a job posting website that makes it easy to register as a city government user. It is yet a further objective of the present invention to provide a jobs posting system that permits multiple city governments to post readily searchable information about the city government jobs presently available, and jobs that may become available at a future date by using criteria like city government job categories and job types.

It is a further objective of the invention to provide a means for city governments to prepare and post city profiles describing the city and work environment. It is yet a further objective to allow city governments to add hyperlinks to the system which are searchable by hyperlink type, such as "job announcement" web page and "job description" web page. It is still a further objective of the present invention to permit prospective employees and city governments to search for and save city hyperlinks so that hyperlinks may be re-executed to quickly access new job postings and other information that may have been updated on a variety of city government websites and web pages. It is a further objective to permit city governments to exchange information and communicate with one another over the system through electronic messages.

It is yet a further objective to provide a jobs posting system that permits prospective employees to create online resumes, search for posted job announcements and prospective job announcements and to indicate interest and send electronic resumes to city governments which post prospective job announcements. It is a further objective to provide a system that allows city governments to search for and save electronic resumes and to send and receive messages to and from the resume holders.

It is another objective of the invention to permit prospective employees to search for and save city profiles based upon a variety of criteria. It is another objective to permit prospective employees to filter saved city profile information into job announcements by city name, prospective job announcements by city name, and hyperlinks by individual city name. Finally, it is an objective of the invention to provide a system for generating online job application forms and associating such forms with job announcements and making them available to prospective employees for use in applying for job openings advertised on invention.

While some of the objectives of the present invention are disclosed in the prior art, none of the inventions found include all of the requirements identified.

SUMMARY OF THE INVENTION

The present invention addresses all of the deficiencies of prior art jobs posting systems designed for use by city governments and satisfies all of the objectives described above.

BRIEF DESCRIPTION

This invention is a jobs posting website designed for use by city governments that allows cities to post prospective job announcements and to receive inquiries and electronic resumes submitted by prospective employees in response to posted prospective job announcements. The invention includes various other integrated processes and features including:

For City Governments:
Create/Post City Profile.
Job Posting/Management Process
Prospective Job Posting/Management Process
Accept Job Applications/Management Process
Hyperlink Posting/Management Process
City Government Hyperlink Searches/Save/Messaging Process
City Government City Profile Searches/Save/Messaging Process
Electronic Resume Search/Save/Messaging Process For Prospective Employees:
Create/Post Electronic Resume/Messaging Process
Create/Save/Execute/Edit Job Searches
Prepare and Submit Job Applications
Create/Execute Prospective Job Searches/Save Jobs and Submit Interest/Resume
City Government Hyperlink Searches/Save/Manage
City Government Profile Searches/Save/Manage Each posting process or search result for respective user type may be managed from various panels on prospective employees or city government's homepages of invention.

User Modules

Invention consists of four modules, each intended for respective user type reflected by module name: Public Module, City Government Module, Prospective Employee Module, and Administrative Module.

Technologies

Graphical User Interfaces (GUI or web pages) are made up of graphic files such as GIF, JPEG, PNG and ICO file formats, and are coded with tableless cascade style sheets (CSS), JavaScript® (JS), and hypertext mark-up language (HTML). Backend database technology used is MySQL and middleware coding is PHP. Invention uses other third party products by permission via licensing agreements for pop-up calendars, rich text editors, zip code searches, and photo scrolling features. Each feature is generally compliant with World Wide Web Consortium (W3C) standards and intended to function on following browsers: Microsoft Internet Explorer, Firefox, Mozillia, and Netscape.

Getting Started

Employers, for example "City Governments" hereinafter "city governments, city, cities, agency, or agencies", register and post a profile of their city or agency, and are then allowed to post job announcements and search for electronic resumes of prospective employees. As an option, cities may accept job applications in response to posted job announcements. Cities may also search for hyperlinks posted by administrative users or other city governments on this website to conduct human resources management research and communicate via site messaging with other cities. Job announcements, job applications and prospective job announcements as well as saved electronic resumes and hyperlinks are managed from the City Government homepage of the present invention.

Prospective employees register first as trial users and then continue use of the invention through a paid subscription or by using coupon numbers set by website administrators. The invention features allow prospective employees to search for job announcements, city hyperlinks, prospective job announcements, and city profiles, all of which the prospective employee may save to the prospective employees homepage on the invention, where saved information can be managed. Prospective employee may communicate interest to the posting city government in response to a posted prospective job announcement and receive e-mail notification when the prospective job announcement of interest becomes an active job announcement. The invention allows prospective employees to receive messages in response to their posted electronic resume and to send replies to city governments sending such messages. Prospective employees may also fill out and submit job applications in response to job announcements posted by city governments.

Process Descriptions

City Government Registration Process

As city governments are known entities or employers, basic information has been collected and is preloaded into database of invention, e.g., city name, street address, Zip code, county and state. Registration process requires city governments to look up their city name within a particular U.S. State. Once city name is entered by user and search is initiated, one of two conditions are presented to user as part of search result: (1) City name is found and listed as matching the entered city name and is shown as having primary location within particular county within selected State; or (2) no city name is found. If city name is found, user is to select city name and click next button and one of three conditions are presented to user: (1) No one is registered from that city name, and so user is presented with form to enter name and contact information as first step to become new registered user; (2) a message displays saying that city name is already registered and invention shows registered user name and contact information; and (3) if registration has been submitted but is not yet approved, user is notified that registration is pending.

If city government is not registered to use invention, city government attempting to register may fill out contact information and proceed to next step in registration process which requires entry of main city hall address, telephone number, and URL of city's home page if available. The invention then allows registering user to enter a passcode as an option. The passcode may be provided by the invention administrators to the city government by e-mail or direct mail. The passcode is an alphanumeric code that is randomly generated and preloaded to into database for each city government. If entered by a city government user during registration, passcode matches preloaded city name, county name, and state name, to validate the city government user. If valid, the invention automatically approves user applicant as full registered user of invention for the respective city name. If a passcode does not match the criteria for approval, the user is notified and cannot use the passcode to register. Registration without a passcode causes the registration application to be forwarded to an application pending queue in the Administrative Module where applicant-provided information is displayed to administrative users of the invention side-by-side with other preloaded information on the city government. Approval is then done by an administrative user calling the city name and verifying the applicant is an employee of the subject city government and is authorized to register for use of invention.

Once the city government registration is approved, the system blocks out others from trying to register under same city government name in the same State. If others do try to register they are provided with the registered city government users name, and with option to report that the wrong person is registered. Once filled out, the form is submitted to the site administrative user's special Contact Us e-mail box. If warranted, the information may be used to reassign the account to a different city government user from the named city government. If a new city government that is not in the system database tries to register, the system provides an option for the user to report a missing city. The invention permits missing city reports to be forwarded to the special Contact Us e-mail box accessible by the site administrative users where information can be used to add the new city to database.

Because of the preloaded city government information, web services may be mass marketed to city governments by direct mail and e-mail campaigns that provide city government users with a passcode matched to the city name, county name and state name so that applicants can register and be automatically approved to use system without involvement by website administrators.

City Government Create Profile Process

Once registered, a city government must create an online web profile using profile layout options available on the invention. The invention allows city governments that have a "valid" city profile available to prospective employees to upload a set number of free job announcements at any time. The invention requires the following elements to be entered for the city government to have a "valid" city profile on invention:

Photo symbolizing City
Human Resources Contact Information
　Department Name
　Street Address
　Telephone Number
　Jobs Hotline, if available
　Office Hours
Basic Demographic Information
　Year City was Incorporated or Chartered
　Year 2000 population
　Current Year population
　Number of square miles
　Number of fulltime staff
List of City Departments
Promotional article about City
Prospective Job Announcement
Hyperlinks or URLs to the registering City Government's
　Website, up to following:
　Homepage
　Human Resources
　Job Announcements
　Salary Tables
　Bargaining Group Agreements
　Organization Chart
　Job Descriptions The invention validates each profile by verifying that required information is input into specified fields. Completing a valid city profile on the invention, including photo, demographic information, human resources dept information, list of city departments, articles about the city, prospective job announcements, and city hyperlinks, permits the city to post a number of free job announcements on the invention as set by administrative user of the invention and to search for and save electronic resumes posted by prospective employees on the invention.

City Links or Hyperlinks

The invention create profile process allows the city government to add a number of URLs to its profile information. Additional web pages appear on submenu to the city government home page on invention which permit each city government user to add/edit and test hyperlinks and to restrict user access to each hyperlink type. For example, some hyperlinks, such as those to bargaining group agreement web pages, may be restricted by city government to only other city government users. This hyperlink management process is a two step process: (1) Add/edit/test the named hyperlinks; and (2) Share the named hyperlinks with prospective employees and/or city governments.

The named hyperlinks or city links are searchable on the invention by both prospective employees and city governments through different search options, each of which is a step process. Three different search options for city hyperlinks include: (1) State and County search; (2) Miles Away search based on mile radius away from user entered 5-digit Zip Code; and (3) City Look-up search. The search steps of the invention for hyperlinks allow the user to refine or narrow search results to just one type of hyperlink, e.g., "job announcement" web pages. The search results for city links display in a table list view by city/county/state; or by miles away from 5-digit Zip code input by use pending on which search option the user selects. When clicked on, each hyperlink opens in a separate window of a browser thus allowing the user to go back to the search results table view to open additional city links. From the search results table, hyperlinks may be saved by prospective employees and city government users to separate panels off of a submenu from the registered users homepage on the invention. Once saved, city links may be reused to re-check for job announcements at a particular city's website, for example, or to conduct salary surveys.

The invention allows a city government to view its shared city links and test them, to view total counts of how many times each link was accessed from the invention and to view in a table list all hyperlinks saved by a city government from its own searches. The City Employer module of the invention includes a messaging feature which allows city governments to initiate messages to other cities and reply to messages received.

Prospective Job Announcements

A "prospective job announcement" is a "job title" posted on the invention that will be eventually advertised as a job announcement on the invention by the city government posting the prospective job announcement. To add a prospective job announcement to a city government profile, the invention requires the city government user to assign the prospective job announcement to a department of the city and to assign a city government standardized job category, and a city government standardized job type. Each of these associations helps define the prospective job announcement to the prospective employee and helps the prospective employee assess his or her interest in the job. To get to prospective job announcements from the city profile, the prospective employee must click on the profile link to, for example, prospective job announcements (2), where '2' represents number of prospective job announcements available from the city. Once clicked, the link on the city's profile displays the prospective job announcements for respective city in table list view. Each prospective job announcement in the table view links to a form or card view of prospective job announcement showing each association for the prospective job announcement, e.g. department, job category, job type, and when the prospective job announcement was posted. From this card view, the prospective employee may either save the prospective job announcement or submit his or her interest in it, and when interest is submitted, the prospective employees electronic resume is made available to the city government which posted the prospective job.

The invention includes a separate process for cities to add/edit/delete prospective job announcements, separate from the create profile process. The add jobs panel which allows city governments to post job titles as prospective job announcements permits the user to enter three job titles at a time and assign each job title to a department of the city,. a city government standardized job category, and a city government standardized job type. Once added, the job titles list in alphabetical order by job title below the form where they are entered. The prospective job announcement panel available to city governments allows the city employer to see in table list view all job titles entered as prospective job announcements, and see how many "view" the prospective job announcement received and how many prospective employees submitted their interest in the prospective job announcement. This panel allows the city government to stop taking interest in the prospective job announcement. When stopped the prospective job announcement moves to a stopped panel. From the stopped panel, the prospective job announcement may be reactivated or re-started. Stopped prospective job announcements retain all interest submitted but do not allow any additional interest to be submitted in the prospective job announcement. Once a prospective employee does submit interest in the prospective job announcement, the prospective employees username or real name is made available to the city government along with a link to his or her electronic resume under a 'submittal' panel.

The invention allows the city government to select a prospective job announcement job title from the submittals panel to filter all names of those submitting an electronic resume or interest so only those names are displayed for the selected prospective job announcement job title. The names of prospective employees display in table list view along with key qualifications and a link to the prospective employees electronic resume. The city government may view and then save the electronic resume to the city government's saved resumes submenu which also permits the city government to send messages to the prospective employee.

The prospective job announcement feature is intended to allow city governments to reduce placement time by gathering in a systematic way a list of qualified candidates in advance of making or posting a job announcement on the invention and by e-mail. Invention allows city governments to add prospective job announcements and manage them from the city governments homepage of the invention as described above.

The invention includes three search options for prospective employees to use in searching for prospective job announcements: (1) by State and County, (2) Miles Away from 5-digit zip code, and (3) a City Look-up. The invention allows user to narrow each search for prospective job announcement by selecting city government standardized job categories and city government standardized job types. Search results display on the invention in table list views. Prospective employees may link to form or card views of the prospective job announcements from the table list view. The table and form views of the prospective job announcements allow the prospective employee to save the prospective job announcements to the prospective employees homepage on the invention, and to submit the prospective employees interest in the prospective job announcement. Once saved or submitted, the save button changes to "Saved" or "Submitted" showing status of prospective employees action on the prospective job announcement. The prospective employee may only submit his or her interest in the prospective job announcement if the prospective employee has posted an electronic resume on the invention. The reason for this, as noted above, is that once the prospective employee submits the prospective job announcement to the city government, the city government may view the submitter's electronic resume, from a managed prospective job announcements panel.

Once the job announcement is made that matches the prospective job announcement, the invention causes prospective employees to be notified of the job announcement in a table list view on prospective employees homepage of the invention. The prospective employee may then view information related to the job and save the job announcement.

Job Announcement Process

Job announcements are accomplished on invention by using a step process. The first step involves entering the job title or selecting a job title that has been entered as a prospective job announcement. If the entered job title duplicates one that is already scheduled, active, ended, or is archived, invention alerts user of this and directs user to consider reposting the ended job, for example. If user enters prospective job announcement as a new job title without selecting the prospective job announcement, the user will be directed to select the prospective job announcement or delete the prospective job announcement before making the job posting. The second step involves inputting monthly or hourly salary information or checking off a "Depends on Qualifications" option. On this step the city government must also assign the job announcement a city government standardized job category, such as "City Managers Office" or "Public Safety-Police", and select a city government standardized job type such as "Police Captain."

In the next step, the city government user is required to add job announcement information details using a third party property rich text editor plugin. In subsequent steps, the invention includes options for the city government user to upload graphic file documents, such as job flyer or job application, and then add or edit city profile hyperlinks to the job announcement. Hyperlinks that were entered by the city government as part of the create profile process are made as presented to city government during job posting steps so that the city government user can test them and update if necessary and make them part of the job announcement. Finally, the city government user enters the job announcement run dates and the application deadline. All dates are selected by pop up calendar provided by third party software that is coded in JavaScript®. If the run dates are set in advance of the job announcement, then the job posting process moves to a scheduled panel which lists in table view all job postings that are scheduled to be announced and when they will become available to prospective employees. If the run dates are set for immediate posting, the job posting goes to an active panel where the city government may track how many views the job posting receives. Once the job announcement is posted, a prompt is triggered if the job announcement is not a prospective job announcement, to encourage the city government to establish the job title as a prospective job announcement.

After a job announcement has finished its run period and is no longer available to prospective employees, the job announcement moves to an ended panel. From the ended panel, the job announcement may be reposted by the city government using same job posting step process that was used to create the job announcement. If the job announcement is not re-posted by the city government within 30 days after its run date has ended, or saved to a job posting archive panel within 30 days after its run date has ended, the job announcement auto deletes from system. The number of job announcements in the scheduled, active, ended and archived job panels, count toward the city government's total job postings on the invention. If the total count of job announcements in these panels reaches a limit set by the invention administrators, the next attempt by the city government to post a job triggers a need for the city government to start a paid subscription, or use another promotional alternative to increase the number of free job announcements. One promotional alternative included in the invention allows the city government to upload the CityGovtJobs.com logo on the City Government's Human Resources Department website. Once the city government does this and reports through the invention's subscription process where the CityGovtJobs.com logo appears in terms of a URL, the City Government's free job posting limit is increased by the number of free allowable job postings as set by administrators of the invention.

The above job posting step process allows city government users to post job announcements using form fill fields to make the job announcement posting, and to upload documents which would contain additional information about the job announcement. Each job announcement posting uses one of over fifty city government standardized job categories and city government standardized job types. The system allows user to edit each job announcement posting at any time, re-post ended job announcements, save job announcements to an archive and post saved job announcements from the archived job announcements table. If a job announcement is an prospective job announcement, the posting results in the prospective employees who submitted their interest or electronic resume being notified over the invention and by e-mail if settings are selected to make e-mail notification to the prospective employee.

Invention job posting process includes an option to allow city government users to accept online job applications from prospective employees. If a city government user selects this option, an additional set of steps is provided to city government user which allows the city to add supplemental questions to a standard job application which is state-specific. The standard job application fields are set up by administrative users of website and correlated to cities within specific states. Statewide applications generally consist of prospective employees name, address, drivers license, education, work experience, and answers to questions which verify certain information, such as (a) age of applicant, (b) whether applicant has violated certain laws, (c) whether applicant has ever been terminated or forced to resign from any position, (d) whether any of applicants relatives work for agency posting job announcement, and (e) whether applicant requires any accommodations due to a disability. Additional voluntary information is gathered by the application form to help cities assess the effectiveness of their Equal Employment opportunity policies and recruitment advertising. Such additional information includes gender, racial/ethnic background, types of disabilities, and media where prospective employee may have first learned of the job opening.

Prospective Employee—Jobs Searches

The invention allows prospective employees to create and save named searches using similar information input by city governments, namely city government job categories and city government job types. However, the invention allows prospective employees to check multiple job categories and multiple job types, and select various geographic areas including multiple states or specified counties within one state and to set minimum compensation levels. Once saved, the saved search appears in a saved searches panel of the prospective. employee's homepage of the invention. The first saved and named jobs search becomes the prospective employee's "new jobs now" search by default. The new jobs now search displays in a separate panel all active job announcements in a table list view matching search criteria upon login. The new jobs now search includes a settings feature which allows user to have job announcements emailed to the prospective employees personal e-mail address, and set frequency of such job announcements to be e-mailed to the prospective employee. If the prospective employee creates subsequent job searches, they become named job searches and when saved move to the saved jobs searches panel. From this panel, the prospective employee may refresh the search results after login and view them in a separate window in table list view.

The prospective employee may also change which search serves as the new jobs now search. The search results display in table list view and links allow the prospective employee to view each job announcement in a summary form view and detail form view format. Each job form view includes information from city profile in a column adjacent the job announcement with a link to a full view of the city profile from the invention. Each view allows prospective employee to save the job announcement to a saved jobs panel for future consideration and reference, and if the city accepts job applications, the prospective employee may click on a link to begin the process of filling out a job application and submitting it to the city which posted the job announcement. From all views of the job announcement, the prospective employee may also e-mail or printout the job announcement. All named saved searches may be edited back thru the same step process used to create the search. The new jobs now search, saved jobs searches, saved city links, and saved jobs are all located on different tabs from same submenu of the invention making potentially large number of job listings available to prospective employees.

Prospective Employee Electronic Resumes

The invention allows prospective employees to create and post an electronic resume on the invention to present prospective employees qualifications to city governments. Prospective employees may create multiple electronic resumes but only have one actively available to city governments at any one time. The invention requires prospective employee to use a step process to create electronic resumes consisting of following steps: (1) Title and Objective (and minimum pay), (2) Job Types, (3) Job Categories, (4) Key Qualifications, (5) Work History, (6) Supplemental, (7) Locations of Interest, and (8) Activation.

Prospective employees may select multiple city government standardized job types and city government standardized job categories of interest, and all job types and categories are the same as those used to post and search for jobs. The Key Qualifications are specific to the interest of city governments and include the following information: (1) whether the prospective employee is currently working for a city government (Yes or No); (2) total years or months prospective employee has worked for city governments; (3) total years or months prospective employee has worked in their vocation; (4) level of education accomplished; (5) job-relevant preloaded licenses or certificates, e.g., P.E., CPA; (6) what job category prospective employee currently works in if they are a city government employee; and (7) what job type the prospective employee currently holds if they are a city government employee.

The invention allows prospective employees to add work history to their electronic resume, make supplemental comments, and to select multiple states or single state and counties within the selected state as locations of interest. Because the city governments are preloaded into the invention, the prospective employees may block city governments from accessing their electronic resumes. This is accomplished in the last step of the create electronic resume process by the prospective employee selecting state, then county, and then city within that county. Prospective employees may allow either username or real name to be used on the electronic resume. Once created, the prospective employee may activate an electronic resume making it available to city governments. No document uploads are allowed by this electronic resume process, and all electronic resume formats are the same, making it easy for city governments to review the qualifications of prospective employees.

Once the electronic resume is saved, it is moved to a saved electronic resume(s) panel. Because the locations of interest are the same as those used to post job announcements and to search for job announcements, and the city government standardized job types and city government standardized job categories are the same as those used to post and search for job announcements, the electronic resume doubles as a saved named job search. From the saved electronic resumes panel, the prospective employee may display matching jobs in table list view and then open each matching job in summary and detail view similar to how the saved job searches panel works.

The electronic resume panel includes a message inbox and sent box where prospective employees may receive messages from city governments about their electronic resume. Prospective employees are not allowed to initiate messages to city governments, however, the invention allows for them to send replies.

Electronic Resume Searches

City governments may use one of three search options to find prospective employee electronic resumes: (1) Multiple State search, (2) State and County search, and (3) Miles Away search. Each search option includes the following steps: job categories, job types, years experience, educational level, licenses/certificates, and starting pay. The search results are displayed in table list view with the city name where prospective employee lives displayed under "residence". Job categories of interest to the prospective employee are also shown along with years of experience, education and license (Yes or No), and table allows city governments to open and view or save the electronic resume of the prospective employee. In viewing the electronic resume of the prospective employee, the city government can quickly assess key qualifications of the prospective employee by looking at information entered in the prospective employees electronic resume. Once saved, the electronic resume is moved to a saved resumes panel as a submenu on the city government's home page of the invention. On this saved resumes panel, the city government may add folders and move the electronic resumes into folders, delete electronic resumes and initiate messages to prospective employees. The invention posts the sent comments to a sent messages panel which allows for folders to be added and messages to be moved into folders or deleted. Replies received from prospective employees are received in a replies panel, which allows for the city government to view, reply and save messages into folders and delete messages.

Prospective Employees Search for City Profiles

The invention provides prospective employees with three options to search for profiles posted by city governments or website administrators: (1) State and County search; (2) Miles Away searching as measured from 5-digit zip code entered by prospective employee; and (3) City Look-up search. The search results of these options render city governments in a table list view. From the table list, a prospective employee may click on the city governments name to open profile of respective city. If the city is a registered user and has a valid profile available to prospective employee, then one of three different profile formats render to user depending on the dimensions of the photo used to create the profile. If the city government is not registered or has not created a profile, then one of four abbreviated "basic profile" will be displayed to the prospective employee, again depending on the dimensions of the photo uploaded or if no photo has been uploaded. Each basic profile includes city name, address, telephone number, office hours, and, if available, city hyperlinks to the city government's homepage, human resources department web page, and job announcements web page. If a city government has a valid profile that it has posted on its own, then information described under the create profile process will be displayed, plus links will be provided to all the city job announcements and prospective job announcements posted on the invention. These links allow prospective employees to open the job announcements and prospective job announcements posted by the selected city and view all of them in table list view, and then open job announcement summary and detail views, and prospective job announcements may be displayed in form view.

The searches for city profiles are useful for prospective employees, because the content on the city profiles includes: (1) city links, (2) job announcements, and (3) prospective job announcements, thus providing the prospective employee with various options to find all job opportunities for a single city in one place. By saving multiple city profiles, the prospective employee can quickly access their favorite city governments and use multiple means to check on opportunities available at selected cities.

An appreciation of the other aims and objectives of the present invention and an understanding of it may be achieved by referring to the accompanying drawings and the detailed description of a preferred embodiment.

DESCRIPTION OF THE DRAWINGS

FIG. 5 is a schematic view of the first screen of the city profile creation process of the FIG. 1 embodiment illustrating how a city government uploads photos and enters human resource department information;

FIG. 6 is a schematic view of the second screen of the city profile creation process illustrating department names, demographic data and promotional article input;

FIG. 7 is a schematic view of the third screen of city profile creation process illustrating hyperlink and prospective job entry forms and profile activation setting;

FIG. 8 is a schematic view of a screen illustrating the form used by city governments to edit profile hyperlinks and share them with other cities and prospective employees;

FIG. 10 is a schematic view of a screen illustrating how users select job categories and job types when posting and searching for job announcements and electronic resumes while using website;

FIG. 11A is a schematic view of a screen illustrating how city government users add, edit and delete prospective job announcements to the website;

FIG. 11B is a schematic view of a screen used by city governments illustrating active prospective job announcements in table list which are set to receive interest from prospective employees;

FIG. 11C is a schematic view of a screen used by city governments illustrating prospective job announcements in table list which are set to not receive any further interest from prospective employees;

FIG. 11D is a schematic view of a screen illustrating a table format used by city governments to track interest submitted by prospective employees in prospective job announcements, in which the table filters prospective employees and links to prospective employees electronic resumes, by job title of prospective job announcement and permits city government to save electronic resumes;

FIG. 11E is a schematic view of a screen illustrating the city government employer's view of an electronic resume posted by a prospective employee;

FIG. 12A is a schematic view of a screen illustrating the first step of the process to post a job announcement in which the city government user either enters a new job title or selects a job title of a prospective job announcement previously entered into system using the form in FIG. 11A;

FIG. 12B is a schematic view of a screen illustrating the next step in posting a job announcement not previously entered into the system as a prospective job announcement in which the city government selects the job categories and job types appropriate to a new job announcement;

FIG. 12C is a schematic view of a screen illustrating the next step in the job posting process in which the city government user selects further job type information, salary range, and describes the job duties, requirements, and the application process;

FIG. 12E is a schematic view of a screen illustrating the next step in the job posting process which allows the city government user that has elected to accept job applications to add supplemental questions to the job application and to receive document uploads from prospective employees;

FIG. 12F is a schematic view of a screen used by city governments illustrating in table format active job postings available to prospective employees where tracking information is presented to city government user on how many prospective employees have viewed and saved the job announcement, and how many prospective employees have submitted job applications in response to the active job announcement;

FIG. 12G is a schematic view of a screen illustrating in table format job applications submitted in response to active job announcement where prospective employee names serve as links to job application forms submitted and links are provided to open a prospective employees electronic resume;

FIG. 12H is a schematic view of a screen illustrating a form view of a job application submitted by a prospective employee and the form includes the prospective employees personal information, education, work history and responses to supplemental questions included in the job application;

FIG. 12I is a schematic view of a screen illustrating how prospective employees are alerted to prospective job announcements which have been converted by city governments into active job announcements;

FIG. 13A is a schematic view of a first screen in the process illustrating how a prospective employee creates an electronic resume by entering a resume name, career objective, desired salary and selects job types of interest;

FIG. 13B is a schematic view of a second screen in the process to create an electronic resume which illustrates the selection of job categories of interest;

FIG. 13C is a schematic view of a third screen in the process to create an electronic resume which illustrates entry of key qualifications to work for cities including years experience, education, licenses, and current city job categories and types held;

FIG. 13D is a schematic view of a fourth screen in the process to create an electronic resume which illustrates how the prospective employee enters and edits work history or job history information;

FIG. 13J is a schematic view of a next screen in the process to create an electronic resume which illustrates how the prospective employee selects cities to block from viewing the electronic resume posted on the website;

FIG. 13K is a schematic view of a next screen in the process to create an electronic resume which illustrates how the prospective employee chooses to either display a real name or a user name on the electronic resume and set the resume to be available publicly to city governments through the website;

FIG. 13L is a schematic view of a next screen in the process to create an electronic resume which illustrates a city government employer view of an electronic resume layout with all the information displayed that was entered in FIGS. 13A-K where the view permits the prospective employee to navigate back through the "create electronic resume" process to edit certain entered information if necessary;

FIG. 14E is a schematic view of a next screen in the process to search for electronic resumes following either of FIGS. 14B, 14C or 14D which illustrates how city the government user selects job categories as part of the search criteria;

FIG. 14F is a schematic view of a next screen in the process to search for electronic resumes following FIG. 14E which illustrates how the city government user selects job types, minimum education, certificates, minimum desired compensation as part of the search criteria;

FIG. 14G is a schematic view of a screen illustrating electronic resume search results which permits the city government user to filter results, view and save electronic resumes;

FIG. 14H is a schematic view of a screen illustrating, in table list form, electronic resumes saved by the city government where the table permits the user to initiate messages to prospective employees, organize saved electronic resumes into user-named file folders, and view and delete saved electronic resumes;

FIG. 15A is a schematic view of a screen illustrating a compose message panel used by the city government user to compose and send electronic message to the prospective employee whose electronic resume the city government saved;

FIG. 15B is a schematic view of a screen used by the city government illustrating, in table format, a list of messages sent by city governments to prospective employees;

FIG. 15C is a schematic view of a screen used by the city government illustrating a message view of a comment sent by the city government user to the prospective employee;

FIG. 15D is a schematic view of a screen used by the city government illustrating, in table format, a list of messages or "replies" received by city governments from prospective employees;

FIG. 15E is a schematic view of a screen used by the city government illustrating a view of a comment received by the city government from the prospective employee;

FIG. 15F is a schematic view of a screen used by prospective employees illustrating, in table format, a list of messages received from city governments;

FIG. 15G is a schematic view of a screen used by the prospective employee illustrating a message view of a message received by the prospective employee from the city government;

FIG. 15H is a schematic view of a screen used by the prospective employee illustrating a compose message panel used by the prospective employee to send reply a message to the city government;

FIG. 15I is a schematic view of a screen used by the prospective employee illustrating, in table format, a list of reply messages sent by the prospective employee to city governments;

FIG. 15J is a schematic view of a screen used by the prospective employee illustrating a view of a message sent by the prospective employee to the city government;

FIG. 16A is a schematic view of the first screen in the process to search for job announcements which illustrates how the prospective employee starts the search process by selecting a geographic search option, either over multiple states, counties within a selected state, or within a miles radius of entered Zip code;

FIG. 16B is a schematic view of a next screen in the process following FIG. 16A which illustrates that the prospective employee selects states by name for where to search for job announcements;

FIG. 16C is a schematic view of a next screen in the process following FIG. 16A which illustrates how the prospective employee selects a state and then counties within the selected state for where to search for job announcements;

FIG. 16D is a schematic view of a next screen in the process following FIG. 16A which illustrates how the prospective employee enters 5-digit Zip code and sets a miles radius of where to search for job announcements;

FIG. 16E is a schematic view of the next screen in the job announcement search process following either of FIGS. 16B, 16C or 16D, which illustrates how the user selects job categories as part of the search criteria;

FIG. 16F is a schematic view of the next screen in the job announcement search process following FIG. 16E which illustrates how the user selects job types and compensation as part of the search criteria;

FIG. 16G is a schematic view of the next screen in the job announcement search process following FIG. 16F illustrating how key words are entered and set to match job titles being searched for and the screen includes settings for how the saved search is to execute upon user login to the website;

FIG. 16H is a schematic view of a screen illustrating the job announcement search results in table format where the user is provided with options to view, save, email the job announcement and an option to apply for job;

FIG. 16I is a schematic view of a screen illustrating a summary form view of the job announcement that provides the user with options to save, email, print, and apply for the posted job, and to link to city government web pages of the city government that posted the job announcement and to link to other job announcements and prospective job announcements posted on the website by the city government;

FIG. 16J is a schematic view of a screen illustrating a detail form view of the job announcement that provides the user with all options included in FIG. 16I, plus more detailed information about the job announcement including description of job duties, requirements, application process and documents that are associated with the job announcement;

FIG. 16K is a schematic view of a screen illustrating a table list view of saved job searches by name where the user is provided with options to refresh and display search results and to navigate back to steps used to create the job search so that saved search can be edited and resaved;

FIG. 16L is a schematic view of a screen illustrating a table list view of a saved job search that has been refreshed and opened to display search results including job announcements matching saved search criteria where links are provided to display the job announcement in summary and detail views (FIGS. 16I and 16J);

FIG. 16M is a schematic view of a screen illustrating a control panel used by prospective employees to designate which saved jobs search is to refresh and display upon login, and to set which job announcements are to display based on the posting date of the job announcement, and how many job announcements are to display per page;

FIG. 16N is a schematic view of a screen illustrating table where job announcements are saved to by prospective employee wherein such table provides functions to display, print, email and apply for saved job announcements;

FIG. 16O is a schematic view of a screen illustrating the first web page the prospective employee sees after logging in to the website after the prospective employee has created and saved a job announcement search which has been set to refresh and display search results upon login;

FIG. 16P is a schematic view of a screen illustrating another control panel used by the prospective employee to designate which saved jobs search is to refresh and display upon login, and to set the selected search to display job announcements based on posting date of job announcement as well as how many job announcements are to list per page;

FIG. 16Q is a schematic view of a first screen in the process to prepare a job application which illustrates how the prospective employee enters contact and identity information and answers questions required by the city government to be considered as an applicant for the posted job announcement;

FIG. 16R is a schematic view of a second screen in the process to prepare the job application which illustrates how the prospective employee enters education history, licenses and certificates, and provides other information required by state-specific job application selected by the city government;

FIG. 16T is a schematic view of a fourth screen in the process to prepare and submit the job application which illustrates how the prospective employee enters equal employment opportunity information, provides information about where prospective employee heard about job announcement, and provides answers to job application supplemental questions;

FIG. 16U is a schematic view of a fifth screen in the process to prepare the job application which illustrates how the prospective employee uploads any documents required by the city government as part of the application process;

FIG. 17A is a schematic view of a first screen in the process to search for prospective job announcements which illustrates how the prospective employee starts the process by selecting a geographic search option, either within counties of a selected state, within a miles radius from Zip code, or by looking up an individual city government;

FIG. 17B is a schematic view of a next screen in the process following FIG. 17A which illustrates how the prospective employee selects a state and then counties within the selected state for where to search for prospective job announcements;

FIG. 17C is a schematic view of a next screen in the process following FIG. 17A which illustrates how the prospective employee enters a 5-digit Zip code and sets a miles radius for where to search for prospective job announcements;

FIG. 17D is a schematic view of a next screen in the process following FIG. 17A which illustrates how the prospective employee first enters a city name and selects a state to find the city for where to search for prospective job announcements;

FIG. 17E is a schematic view of a next screen in the prospective job announcement search process following either of FIGS. 17B, 17C or 17D, illustrating how the prospective employee selects job categories as part of the search criteria;

FIG. 17F is a schematic view of a next screen in the prospective job announcement search process following FIG. 17E illustrating how the prospective employee selects job types as part of the search criteria;

FIG. 17G is a schematic view of a final screen in the prospective job announcement search process illustrating a search results table where prospective job announcements are listed by job title and filtered by job category and job type, and the table provides the prospective employee with an option to view and save the prospective job announcements;

FIG. 17H is a schematic view of a screen illustrating a form view of the prospective job announcement showing job title, job category, job type and city department of the prospective job announcement, including city profile information and functions to allow prospective employee to either save or submit interest in the prospective job announcement;

FIG. 17I is schematic view of a screen illustrating a table of saved prospective job announcements the prospective employee saved using FIG. 17G and 17H where the table lists the saved prospective job announcements by job title and provides the prospective employee with the ability to submit interest in prospective job announcement to the city government;

FIG. 17J is schematic view of a screen illustrating a table of prospective job announcements for which the prospective employee has submitted interest to the city government posting the prospective job announcements and where the table provides the prospective employee with the ability to unsubmit interest in a prospective job announcement by either deleting the job or by moving prospective job announcement to a table of saved prospective job announcements as shown in FIG. 16I and 16J;

FIG. 17K is schematic view of a screen illustrating a table of job announcements received by the prospective employee when the prospective job announcement is converted by the city government to an active job announcement and the table permits the prospective employee to view and save the job announcement, and link to job application form for posted job announcement;

FIG. 18A is a schematic view of a first screen in the process to search for hyperlinks to city government web pages which illustrates how the prospective employee and the city government start the process by selecting a geographic search option, either within counties of a selected state, within a miles radius from Zip code, or by looking up individual city government by name;

FIG. 18B is a schematic view of a next screen in the process following FIG. 18A which illustrates how the prospective employee and the city government select a state and then counties within the selected state to search for city government hyperlinks of city governments located in the selected counties;

FIG. 18C is a schematic view of a next screen in the process following FIG. 18A which illustrates how the prospective employee and the city government enter a 5-digit Zip code and set a miles radius of where to search for city government hyperlinks;

FIG. 18D is a schematic view of a next screen in the process following FIG. 18A which illustrates how the prospective employee first enters a city name and selects state to find the hyperlinks of a particular city government;

FIG. 18E is a schematic view of a next screen in the process to search for city government hyperlinks following either of Figures B, C or D, which illustrates how prospective employees and city governments select hyperlink types to narrow search results;

FIG. 18F is a schematic view of a final screen in the process to search for city government hyperlinks which illustrates the search results table that contains a list of hyperlinks to city government web pages that match the search parameters and which permits the user to open and save the hyperlinks to a separate saved hyperlinks table;

FIG. 18G is a schematic view of a screen used by prospective employees who have saved hyperlinks which illustrates how such hyperlinks appear when saved to table 5 where the hyperlinks are available to users for repeat use to check for job announcements and other information on city websites;

FIG. 18H is a schematic view of a screen used by city governments that have saved hyperlinks which illustrates how such hyperlinks appear when saved to a table where such hyperlinks are available to users for repeat use to check other city government websites for salary, job descriptions and other information, and from the same table a city government user can initiate messages to other city governments whose hyperlinks the first city government has saved;

FIG. 18I is a schematic view of a screen illustrating a table list of messages sent by one city government to another city government;

FIG. 18J is a schematic view of screen illustrating table list of messages received by one city government from another city government;

FIG. 19A is a schematic view of a first screen in the process to search for city profiles which illustrates how the prospective employee starts a search process by selecting a geographic search option, either profiles of city governments within counties of a selected state, within a miles radius from Zip code, or by looking up individual city government by name;

FIG. 19B is a schematic view of a next screen in the process following FIG. 19A which illustrates how the prospective employee selects a state and then counties within the selected state to search for city government profiles of city governments located in selected counties;

FIG. 19C is a schematic view of a next screen in the process following FIG. 19A which illustrates how the prospective employee enters a 5-digit Zip code and sets a miles radius to find city government profiles within the designated radius of the entered Zip code;

FIG. 19D is a schematic view of a next screen in the process following FIG. 19A which illustrates how the prospective employee first enters a city name and selects a state to find the city government profile of a particular city government;

FIG. 19E is a schematic view of a screen illustrating the results of a search for city government profiles which includes a table list of city profile links by city name as well as a function to save city profiles and links to prospective job announcements and active job announcements posted by the city government on the website;

FIG. 19F is a schematic view of a screen illustrating a table listing of city profiles saved in FIG. 19E which provides the prospective employee with the ability to link to prospective job announcements and active job announcements posted on the website by the city government whose profile the prospective employee has saved;

FIG. 19G is a schematic view of a screen illustrating a table listing of active job announcements filtered by the name of the city government whose profile has been saved by that prospective employee;

FIG. 19H is a schematic view of a screen illustrating a table listing of prospective job announcements filtered by the name of the city government whose profile has been saved by the prospective employee;

FIG. 19I is a schematic view of a screen illustrating a table listing of hyperlinks to web pages filtered by the name of the city government whose profile has been saved by the prospective employee and the table provides an option to the user to further filter hyperlinks by type of web page.

DETAILED DESCRIPTION OF THE PREFERRED EMBODIMENT (1) FIGS. 1-3 illustrate a multiple employer city government jobs posting system 10 that can be formed from the following components. At least one server 14 is provided. The server 14 is connected to a public wide area network 18 and hosts a website 22 accessible over the network 18. The website 22 includes software 26 that allows multiple city governments 30 to register for use of the website 22, to post and manage job announcements 34 and prospective job announcements 38 on the website 22. The software 26 allows multiple prospective employees 42 to register for use of the website 22, prepare and save electronic resumes 46, and submit the electronic resumes 46 to the city governments 30 in response to the prospective job announcements 38.

Figure 1:
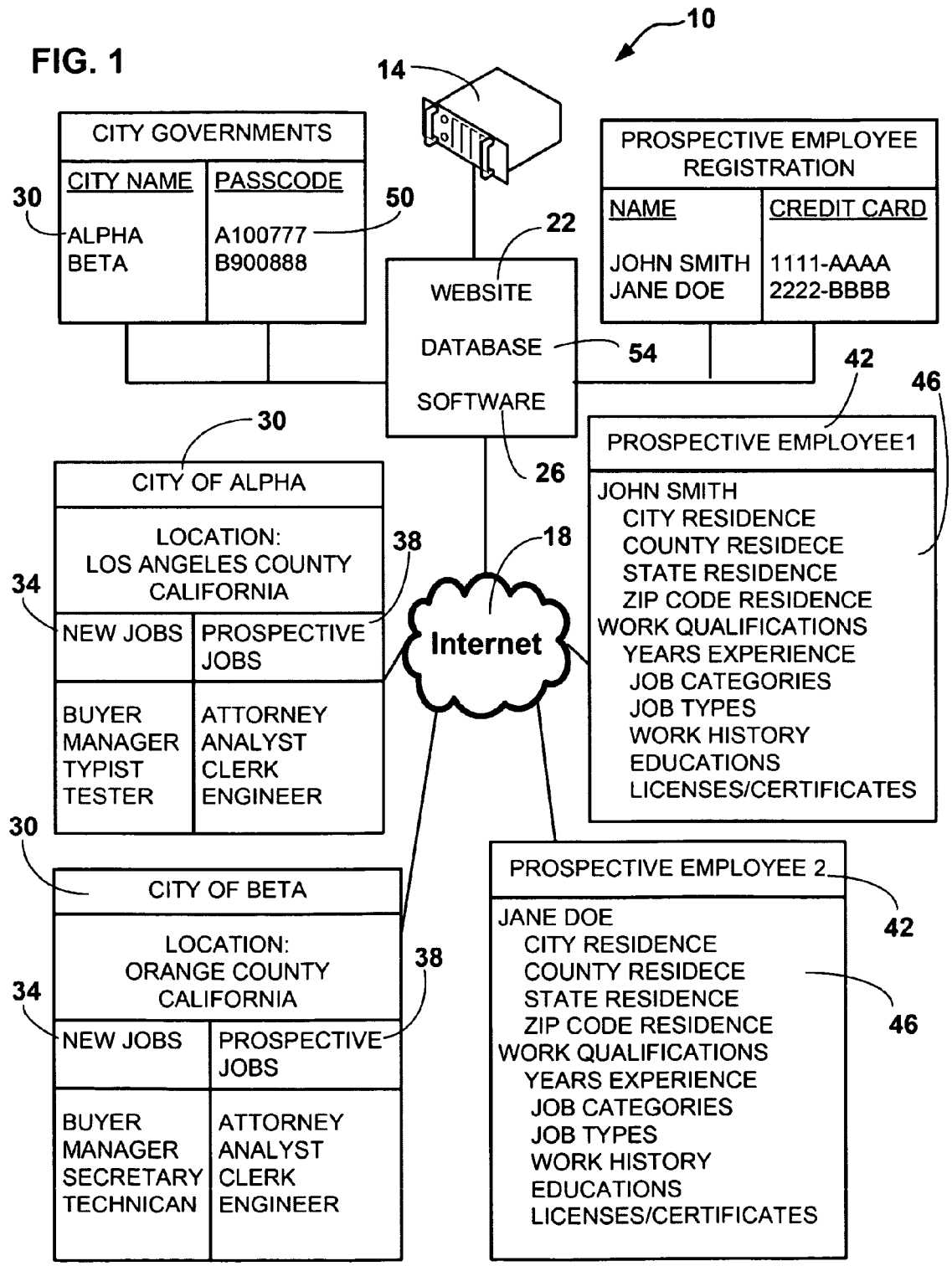
FIG. 1 is a schematic view of the preferred embodiment of the multiple employer city government jobs posting system illustrating the website and database available over a wide area network, city government and prospective employee modules, city postings of job announcements and prospective job announcements and prospective employee resumes.
Figure 2:
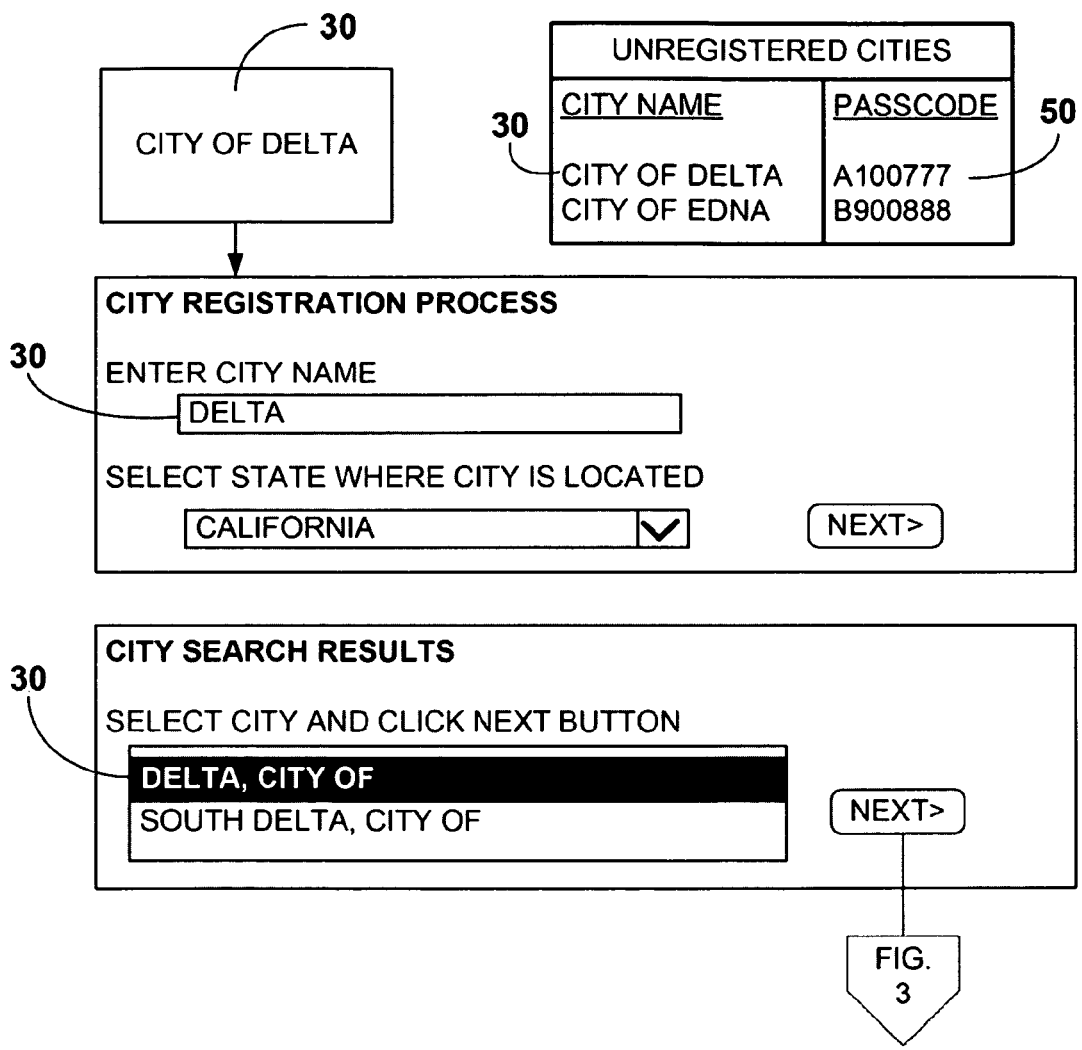
FIG. 2 is a schematic view of the name search portion of the city government registration process of the FIG. 1 embodiment.
Figure 3:
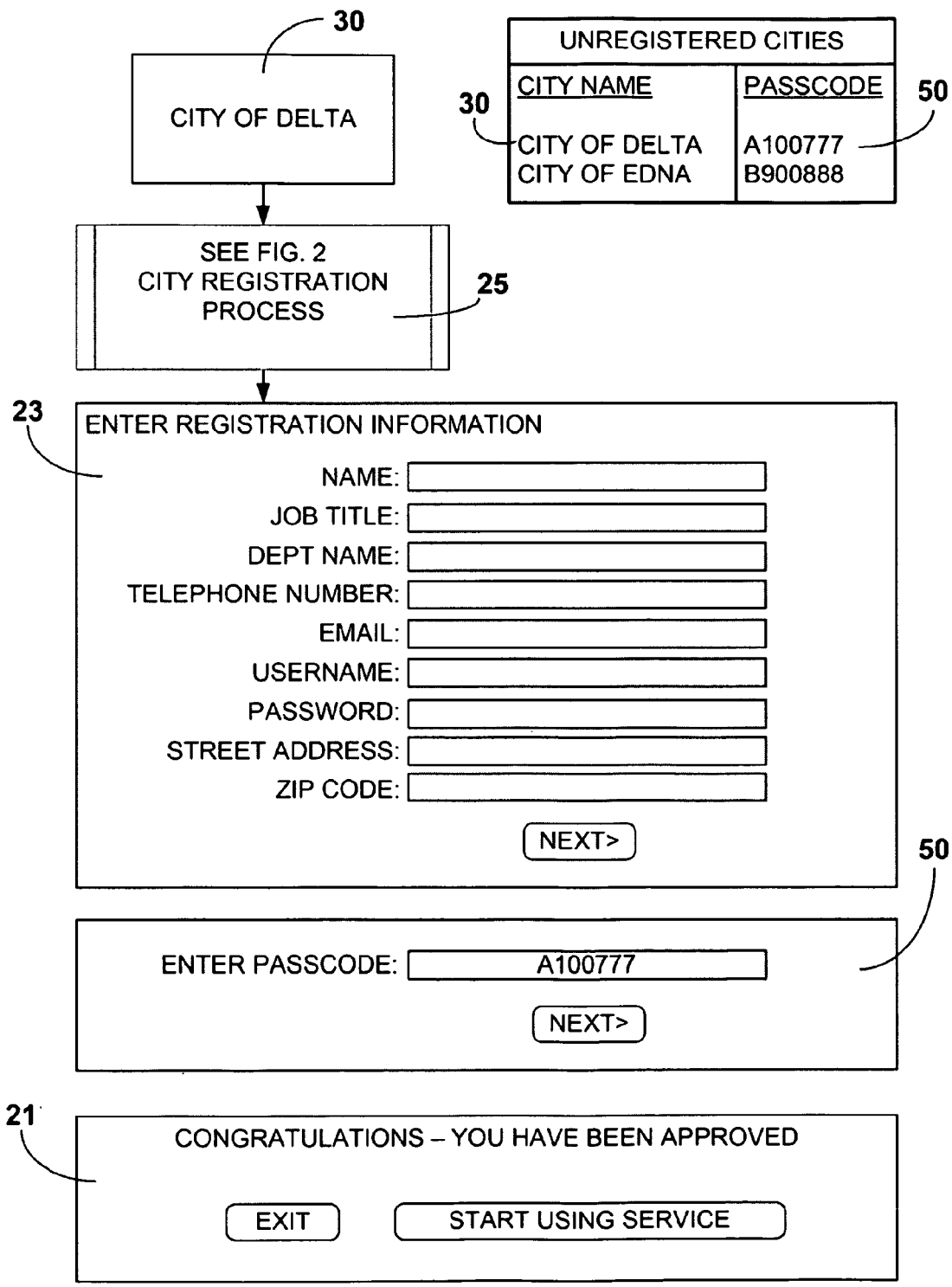
FIG. 3 is a schematic view of the city registration and passcode forms used by the city government to register for service as well as an approval message rendered after a valid passcode is entered.

(2) In a variant of the invention, the system 10 includes a preloaded passcode 50 for at least one city government 30. The passcode 50 is stored in a database 54 associated with the website 22, is distributed to the city government 30 and permits the city government 30 to register 23 and be automatically approved 21 for use of the website 22 upon finding a name 30 of the city government 30 and entering registration information 23 and valid passcode 50 into the website 22.

Figure 4:
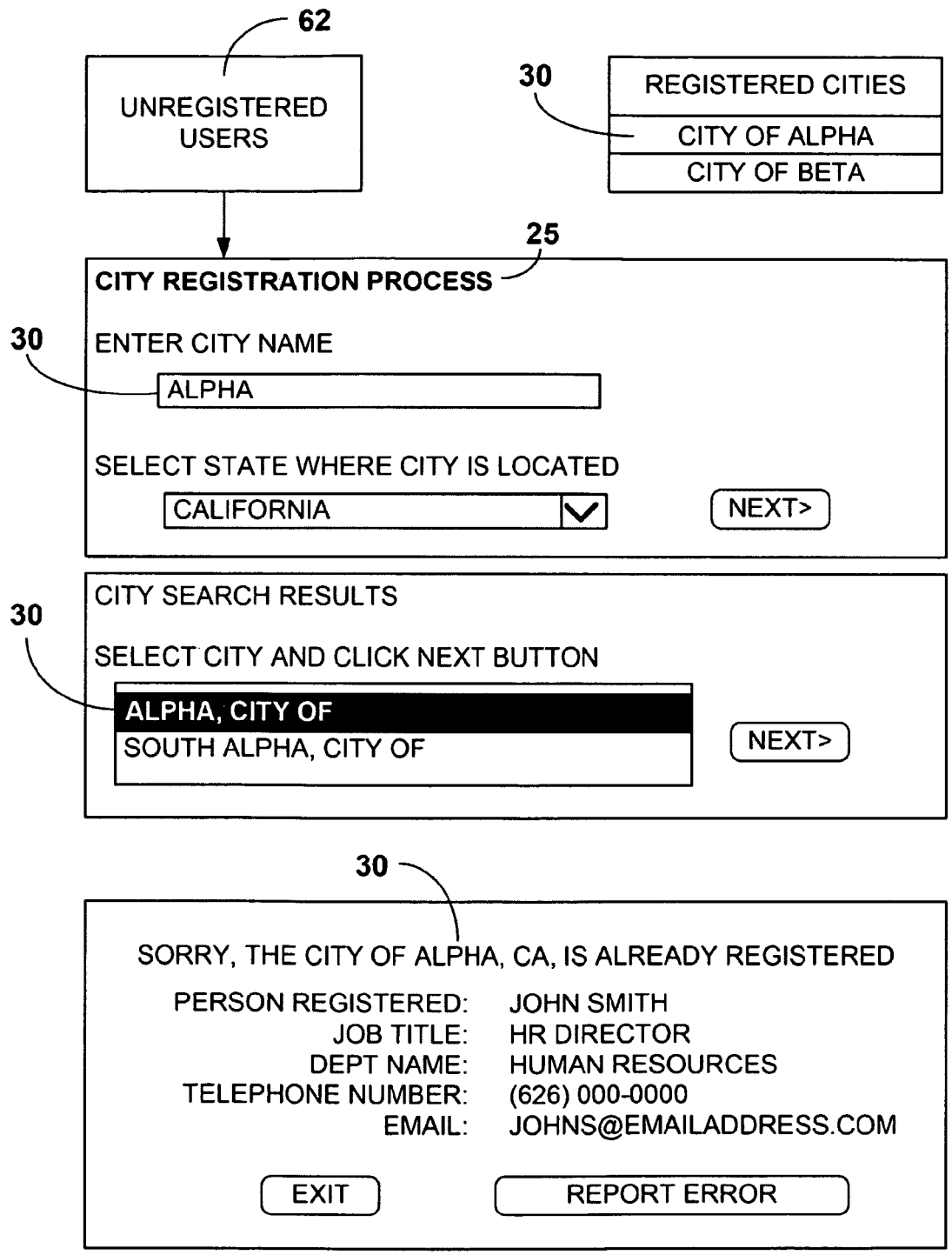
FIG. 4 is a schematic view of the city registration process blocking a non-registered user who attempts to register using a previously registered city name.
Figure 9:
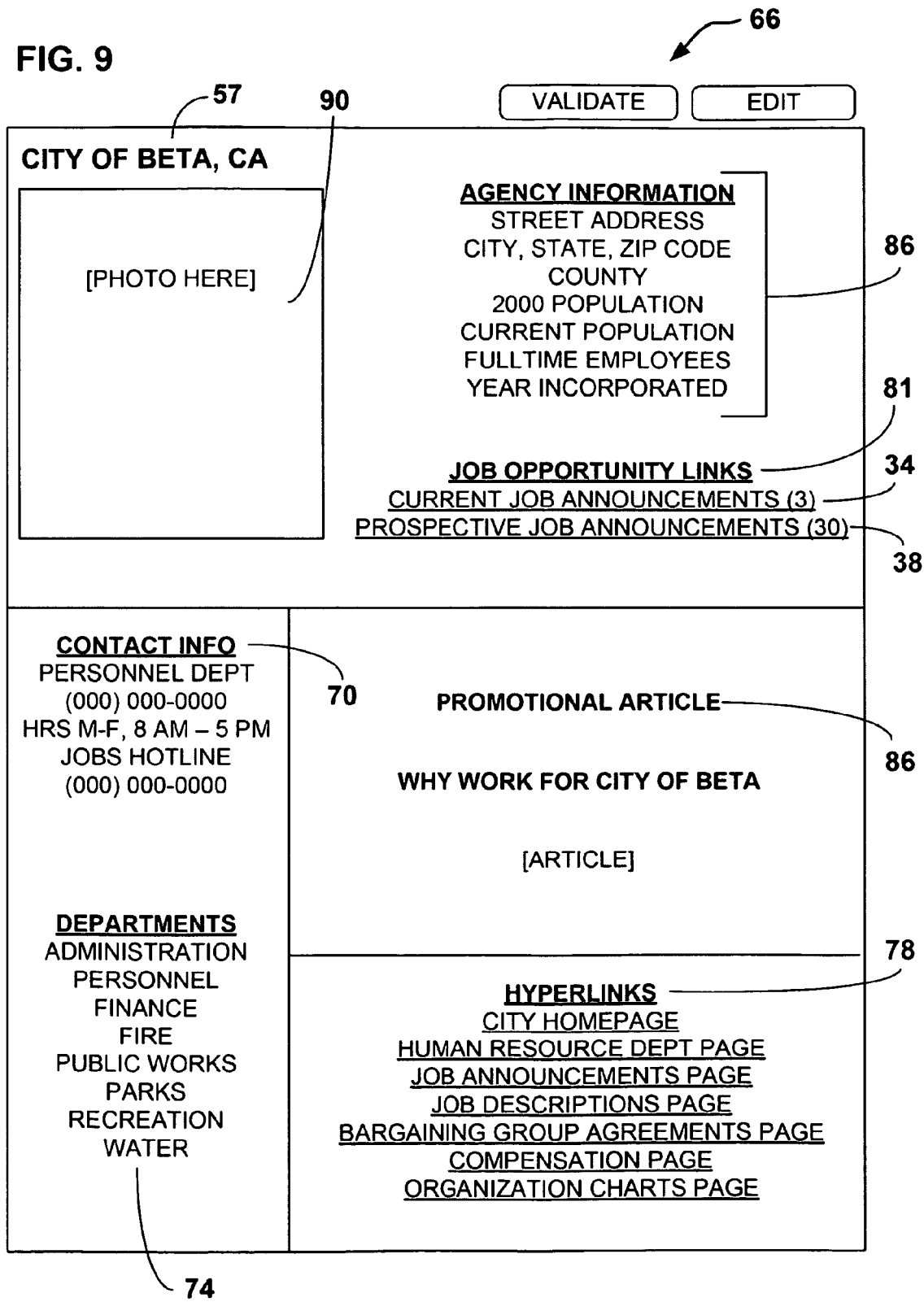
FIG. 9 is a schematic view of a screen illustrating the layout of city profile, inclusive of information entered in the profile creation process, and links to job announcements and prospective job announcements posted on website.

(3) In another variant, as illustrated in FIG. 4, the website 22 blocks unregistered users 62 attempting to register using a same city government name 30 as a registered city government user 30.

(4) In still another variant, as illustrated in FIGS. 5-9, the website 22 requires each of the city governments 30 that have registered for use of the website 22 to create a city profile 66. The city profile 66 includes a city name 30, human resources contact information 70, a listing of city departments 74, and links 81 to the job announcements 34 and the prospective job announcements 38.

(5) In yet another variant, the city profile 66 further includes demographic information 82, promotional materials 86 and photos 90.

(6) In a further variant, the city profile 66 further includes either hyperlinks 78 to any of the city governments home page 94, human resources web page 98, job announcements web page 102, job description web page 106, compensation table web page 110, bargaining group agreement web page 114 and city government organization chart web page 118.

(7) In another variant, the hyperlinks 78 entered by each city government 30 may be further edited 77 and set to be shared 79 with either prospective employees 42 and other city governments 30.

Figure 12D:
FIG. 12D is a schematic view of a screen representing the next step in the job posting process in which the city government user uploads files associated with the job announcement, updates hyperlinks relative to the city profile, sets duration of job posting on website, application deadline, and sets job posting to accept or not accept state-specific job applications.
Figure 13E:
FIG. 13E is a schematic view of a fifth screen in the process to create an electronic resume which illustrates how the prospective employee enters supplemental information on a user's qualifications for city government jobs.
Figure 13F:
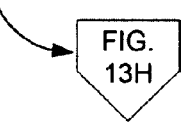
FIG. 13F is a schematic view of a next screen in the process to create an electronic resume following FIG. 13E which illustrates that the prospective employee has selected multiple states as geographic areas of interest for an electronic resume.
Figure 13G:
FIG. 13G is a schematic view of a next screen in the process to create an electronic resume following FIG. 13E which illustrates that the prospective employee has selected a single state and counties within the selected state as geographic areas of interest for the electronic resume.
Figure 13H:
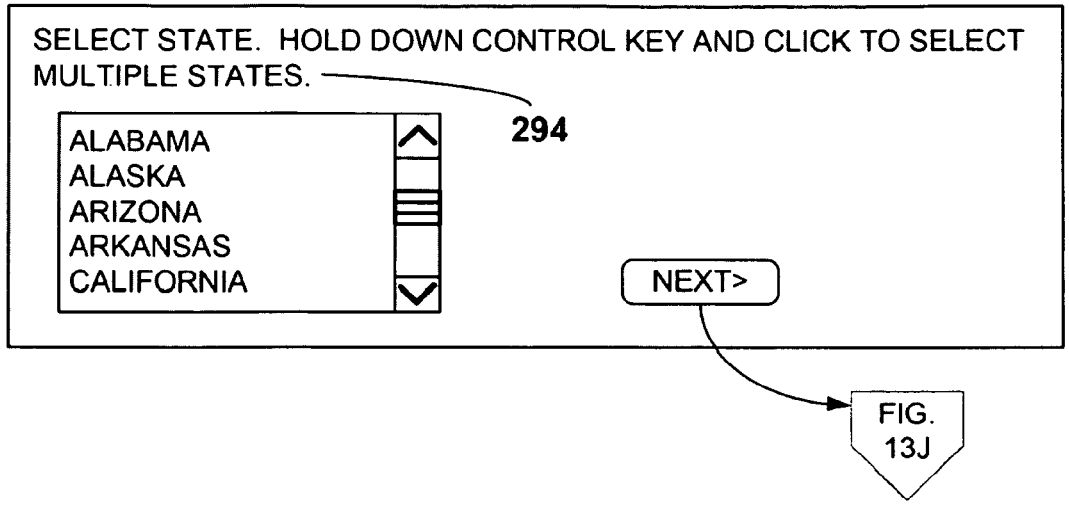
FIG. 13H is a schematic view of a next screen in the process to create an electronic resume, following FIG. 13F, which illustrates how the prospective employee selects any number of states as locations of interest for the electronic resume.
Figure 13I:
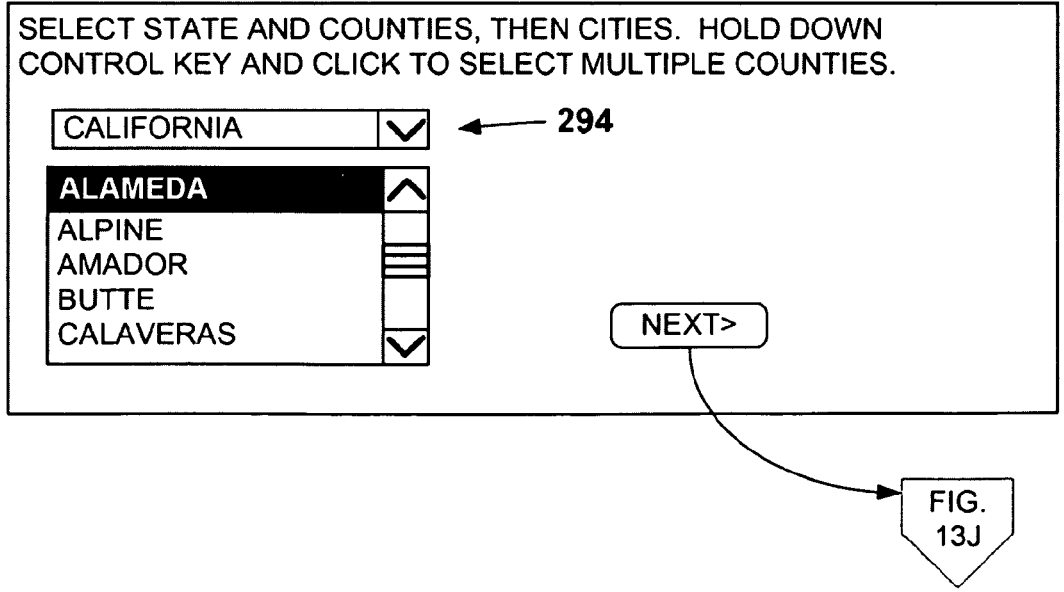
FIG. 13I is a schematic view of a next screen in the process to create an electronic resume, following FIG. 13G, which illustrates how the prospective employee selects any number of counties within state selected in FIG. 13G.
Figure 14A:
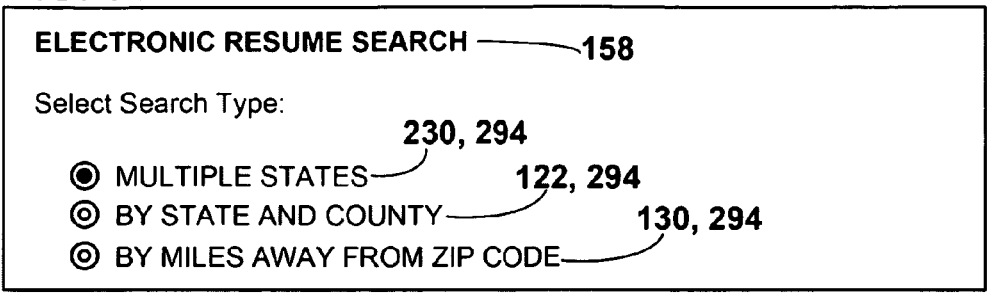
FIG. 14A is a schematic view of a first screen in the process to search for electronic resumes which illustrates how the city government users start the search process by selecting a geographic search option, either over multiple states, counties within a selected state, or within a miles radius of Zip code.
Figure 14B:
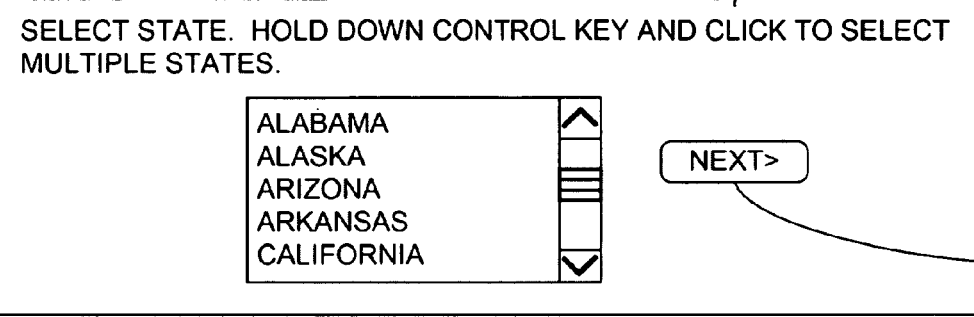
FIG. 14B is a schematic view of a next screen in the process following FIG. 14A which illustrates how the city government user selects states by name of where to search for prospective employee electronic resumes.
Figure 14C:
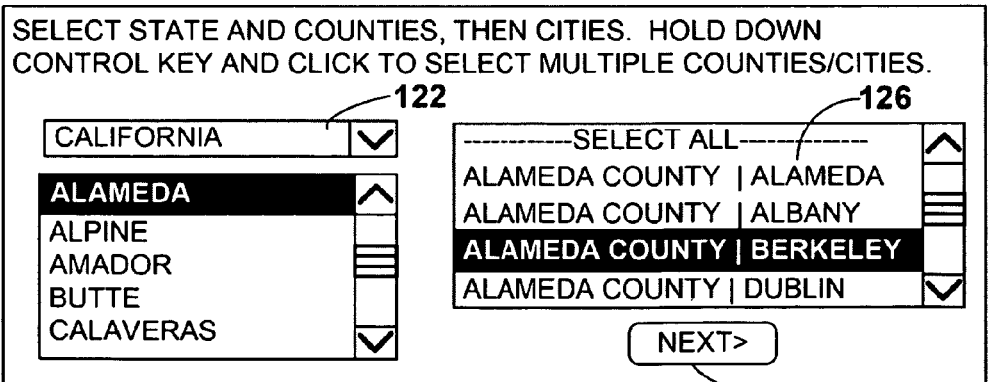
FIG. 14C is a schematic view of a next screen in the process following FIG. 14A which illustrates how the city government user selects a state and then counties within selected state of where to search for prospective employee electronic resumes.
Figure 14D:
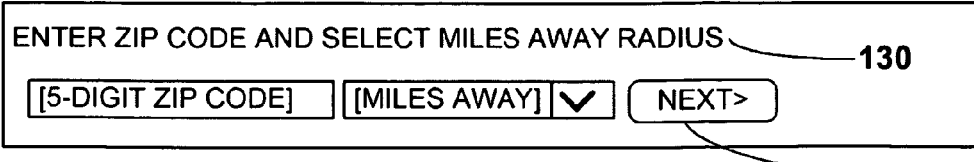
FIG. 14D is a schematic view of a next screen in the process following FIG. 14A which illustrates how the city government user enters a 5-digit Zip code and selects a miles radius of where to search for prospective employee electronic resumes.
Figure 16S:
FIG. 16S is a schematic view of a third screen in the process to prepare the job application which illustrates how the prospective employee enters work history into the application.

(8) In yet a further variant of the invention, the city government standard job categories 162 and city government standard job types 166 as illustrated in FIG. 10, are used to post job announcements 34 as illustrated in FIG. 12B, prospective job announcements 38 as illustrated in FIG. 11A, electronic resumes 46 as illustrated in FIGS. 11E, 13A-B and L, and conduct searches for job announcements 150 as illustrated in FIG. 16E, prospective job announcements 154 as illustrated in FIG. 17E, and electronic resumes 158 as illustrated in FIG. 14E-F.

(9) In another variant of the invention, as illustrated in FIGS. 12A, the posted job announcements 34 and prospective job announcements 38 include city government job titles 170 taken from the position classification system 174 of the city government 30 which posts the announcements 34, 38.

(10) In yet a further variant, as illustrated in FIGS. 7, 11A and 17H, the prospective job announcement 38 further includes a department name 74 used by the city government 30 posting the prospective job announcement 38, city profile information 66 and hyperlinks 78 to the city governments web pages 94, 98, 102, 106, 110, 114 and 118.

(11) In another variant of the invention, as illustrated in FIGS. 7 and 11A, the prospective job announcements 38 are created using an online form 226 by the city government 30.

(12) In still another variant of the invention, as illustrated in FIGS. 11B-E, 12F and 17K, the city government 30 controls status of a prospective job announcement 38 to either setting the prospective job announcement 38 to actively accept interest 218 and electronic resumes 46 from the prospective employees 42 or setting the prospective job announcement 38 to not accept interest 219 and electronic resumes 46 from the prospective employees 42 until such time as the prospective job announcement 38 is converted to an active job announcement 34 (FIG. 12F) at which time the prospective employees 42 who have submitted interest 221 (FIG. 11D) and their electronic resumes 46 are notified 214 of the newly posted job announcement 34 (FIG. 17K).

(13) In still a further variant of the invention, as illustrated in FIGS. 12A-D, the job announcements 34 are either new job announcements 170 not previously posted as prospective job announcements 38 or job announcements 34 previously posted as prospective job announcements 38.

(14) In still another variant, the posted job announcement 34 further includes job title 170, compensation information 178, job category 162, job type 166, duration of job posting 182, and application deadline 186.

(15) In yet another variant, the posted job announcement 34 further includes a description of job duties 190, job requirements 194, application process 198, downloadable documents 202, city government hyperlinks 206, city profile information 66, links 81 and hyperlinks 78 to various web pages of city government 30 posting the job announcement 34.

(16) In yet another variant, as illustrated in FIGS. 12D-H, the city government jobs posting system 10 further includes a facility 216 to receive electronic job applications 222 (FIG. 12H) in response to posted job announcements 34.

(17) In a further variant, the city government 30 activates or deactivates 217 the facility 216 to receive electronic job applications 222 for each job announcement 34 being posted.

(18) In another variant of the invention, the city government jobs posting system 10 further includes a library of state-specific job application forms 230 which city selects when posting job announcement (34).

(19) In another variant of the invention, the city government jobs posting system 10 and job application facility 216 further allows the city government 30 to tailor the selected state-specific job application form 230 by adding supplemental questions 219.

(20) In still another variant, the job application facility 216 further allows the city government 30 to tailor the selected state-specific job application form 230 to permit documents to be uploaded 221 by prospective employees 42 when preparing and submitting job applications 222.

(21) In still a further variant, as illustrated in FIG. 12G, the received electronic job applications 222 are appended to the job title 170 of the posted job announcement 34.

(22) In yet a further variant, as illustrated in FIG. 12G, the received electronic job applications 222 are listed and accessible in a submitted job applications table 246.

(23) In yet a further variant, the city government jobs posting system 10 further includes a facility 216 to receive electronic resumes 46 (FIGS. 12G and H) when prospective employees 42 submit 231 (FIG. 16U) electronic job applications 222 and 230 in response to a posted job announcement 34.

(24) In another variant of the invention, the submitted job applications table 246 permits the city government 30 to view and save 223 the prospective employees 42 electronic resume 46 to a saved electronic resumes table 302 (FIG. 14H).

(25) In still another variant, the city government 30 views the received electronic job applications 222 from a table of posted job announcements 187 and 246 (FIGS. 12F and G).

(26) In yet another variant, as illustrated in FIGS. 14H, 15A-E, the city government 30 may initiate a message 310 to a prospective employee 42 after the city 30 saves the electronic resume 46 of prospective employee 42 that has submitted the electronic job application 222.

(27) In another variant, as illustrated in FIGS. 15D-J, the prospective employee 42 is able to send reply messages 314 to city government 30.

(28) In still another variant, as illustrated in FIGS. 11D, 12F, 12I and 17K, when a city government 30 converts the prospective job announcement 38 to an active job announcement 187 using job posting process 210 the system 10 causes communication 214 to each prospective employee 42 who communicated electronic interest 221 in response to the posted prospective job announcement 38 that the prospective job announcement 38 has become an active job announcement 34, 187.

(29) In still a further variant, as illustrated in FIGS. 11E and 13A-L, the electronic resume 46 further includes any of career objectives of the prospective employee 270, desired starting pay 274, vocational areas of interest 278, a key qualifications section summarizing the prospective employees qualifications to work for city governments 282, work history 286, supplemental information 290 and geographic locations of interest 294 to prospective employee 42.

(30) In another variant of the invention, as illustrated in FIG. 13J, when a prospective employee 42 has entered an electronic resume 46, the system 10 permits the prospective employee 42 to block at least one city government 30 by a city name 30 from searching for and viewing of the prospective employees 42 electronic resume 46.

(31) In yet a further variant, as illustrated in FIGS. 14A-H, when at least one prospective employee 42 has entered an electronic resume 46, the system 10 permits the registered city government 30 to search for and save the electronic resume 46 on the website 22 for future reference and reuse.

(32) In a further variant, the city government search for electronic resumes 158 posted by the prospective employees 42 further includes search criteria addressing job category 162, job type 166, years experience 318, education level 322, licenses/certificates 326 and desired starting pay 274. The searches are conducted across multiple states 230, within designated states, counties 122, individual city names 126, and within a designated distance from a center of a Zip code 130.

(33) In still a further variant, as illustrated in FIGS. 11E and 14A-F, the city government search for electronic resumes 46 posted by the prospective employees 42 further includes criteria including any of a desired starting pay 274, vocational areas of interest 278, a key qualifications section summarizing the prospective employees qualifications to work for city governments 282, and geographic locations of interest 294 to prospective employee 42.

(34) In yet a further variant, as illustrated in FIGS. 14GH, 15A-C, and 15F-G, when the city government 30 has saved the electronic resumes 46 posted on the system 10 by the prospective employees 42, the system 10 permits the city government 30 to send communications 310 to the prospective employees 42 whose electronic resumes 46 the city government 30 has saved.

(35) In another variant, as illustrated in FIGS. 15F-J and 15D-E, when a prospective employee 42 has received a communication 310 from the city government 30, the system 10 permits the prospective employee 42 to communicate to the city government 30 with reply messages 314.

(36) In yet another variant, as illustrated in FIGS. 16A-L, 16N, 17A-I, 18A-J, 19A-I, the software 26 allows the prospective employee 42 to search for and save the posted job announcements 34, prospective job announcements 38, city government profiles 66, city government links 81 and hyperlinks 78 on the website 22.

(37) In yet another variant, the software allows the prospective employee 42 to search for and save the posted job announcements 34 (FIGS. 16A-L, 16N) and prospective job announcements 38 (FIGS. 17A-I) on the website 22.

(38) In a further variant, as illustrated in FIGS. 17A-H, prospective employee 42 searches for the posted prospective job announcements 154 include any of searches within designated states and counties 122, searches by individual city name 126, searches within a designated distance from a center of a Zip code 130, and searches including criteria of job categories 162 and job types 166.

(39) In still a further variant, results of the searches 262 cause a table of prospective job announcements 266 to be created for the prospective employee 42, and said table 266 allows the prospective employee 42 to track status 264 of all prospective job announcements 38 in the table 266 when the prospective employee 42 either saves 217 the prospective job announcement or submits interest 221 and his electronic resume 46 in response to the prospective job announcement 38.

(40) In still another variant, as illustrated in FIGS. 11D-E and 17H, when at least one electronic resume 46 has been entered into the system 10 by the prospective employee 42, the system 10 permits the prospective employee 42 to communicate interest 221 in the prospective job announcement 38 posted by the city government 30.

(41) In yet another variant, as illustrated in FIGS. 11D-E and 17H, when a prospective employee 42 communicates interest 221 in a prospective job announcement 38, the system 10 transmits the prospective employees 42 electronic resume 46 to the city government 30 which posted the prospective job announcement 38.

(42) In a further variant, the software 26 compiles the submitted electronic resumes 46 into a table 298. The table 298 is filtered by job title 170 and the resumes 46 are available to the city government 30 from the table 298 (FIG. 11D).

(43) In still a further variant, as illustrated in FIGS. 17H, 11D, 14H and 15A-J, when a city government 30 has received a submittal of interest 221 from a prospective employee 42 in the prospective job announcement 38, the system 10 permits the city government 30 to save 223 the prospective employees 42 electronic resume 46 into a separate table 302 (FIG. 14H) of saved electronic resumes 46 in separate user-named file folders 306 for future reference and reuse and to send 310 and receive 314 messages to and from said prospective employees 42.

(44) In still another variant, as illustrated in FIGS. 16A-J, prospective employee searches for the posted job announcements 150 include any of searches across multiple states 230, searches within designated states, counties 122, searches by individual city name 126, and searches within a designated distance from a center of a Zip code 130, and searches including criteria of job categories of interest 162, job types 166, key words 234 and compensation information 178.

(45) In yet another variant, as illustrated in FIGS. 16A-L, the prospective employee 42 may create and save multiple job searches 150 for posted job announcements 34.

(46) In a further variant, as illustrated in FIGS. 16M, and 16O-P, the prospective employee 42 designates one of the saved job searches 150 to execute and display search results 238 upon the prospective employee 42 logging into the website 22.

(47) In still a further variant, the prospective employee 42 designates the website 22 to send search results 238 to a specified e-mail address 242.

(48) In yet a further variant, as illustrated in FIGS. 16K-L, any saved criteria based job search 150 may be re-executed or refreshed 151 and displayed 153 in a table 238 which permits prospective employee to save 157, email 159 and print 161 job announcement 34 as determined by the prospective employee 42 after login.

(49) In another variant, as illustrated in FIGS. 16H-J, 16L, 16N and 16O, results of the search 238 display job announcements 34 in list 246, summary 250 and detail 254 views.

(50) In yet another variant, as illustrated in FIGS. 16I-J, links 247 are available on summary 250 and detail 254 views of posted job announcement 34 which displays an electronic job application form 230 to prospective employee 42 for job announcement 34.

(51) In a further variant, as illustrated in FIGS. 16Q-U, the electronic job application form 230 is filled out online by prospective employees 42 and submitted 231 in response to the posted job announcements 34.

(52) In yet another variant, as illustrated in FIGS. 16K, 16L and 16N, job announcements 34 that result from saved job searches 150 are saved 157 to a saved jobs table 258 for either of further review and follow-up action.

(53) In a further variant, as illustrated in FIGS. 18A-J, the software allows either the city government 30 or the prospective employee 42 to search for and save any of the links and hyperlinks 78.

(54) In still a further variant, the searches for the links and hyperlinks 330 include any of searches within designated states and counties 122, searches by individual city name 126, and within a specified distance from a designated Zip code area 130, and searches by variety of hyperlink or link 334.

(55) In yet a further variant, results of searching any of the hyperlinks and links 338 are displayed in a table 342 sorted by search parameters for use, saving and later reuse by either of the city government 30 and the prospective employee 42.

(56) In a variant of the invention, a first registered city government user 30 finds and saves any of the hyperlinks and links 78 posted by another registered city government user 30, the first registered city government user 30 sends communications 346 to the other city government user 30 and the other city government user 30 sends reply communications 346.

(57) In yet a further variant, as illustrated in FIGS. 19A-I, the software 26 allows the prospective employee 42 to search 67 for and save 131 the city profiles 66 based upon criteria described in the profiles 66.

(58) In still another variant, the prospective employee 42 searches for the city profiles 66 within designated states, counties 122, individual city names 126, and within a designated distance from a center of a Zip code 130.

(59) In another variant of the invention, results 133 of searching the city profiles 66 are saved to a table 134 for later reuse by the prospective employee 42.

(60) In a final variant, when city profiles 66 are saved to a table 134, the system 10 parses city profile information 66 into additional separate tables, one for prospective job announcements 138, another for job announcements 142, and one for links and hyperlinks 146, all of which are filtered by selected city name 30 of the saved city profile 66, and saved links 81 and hyperlinks 78 are further filtered by selected link type 78.

The multiple employer city government jobs posting system 10 has been described with reference to particular embodiments. Other modifications and enhancements can be made without departing from the spirit and scope of the claims included in this application.

INVENTIVE CONCEPT(S) and NEW AND USEFUL IMPROVEMENTS OFFERED BY INVENTION

In order to address the problems and challenges of city government human resources departments and city government career job seekers as previously described in this application beginning on line 11 of page 1 through line 16 on page 5, this application begins with the inventive concept of a "prospective city government job" and the methods of posting and managing prospective city government jobs entered by multiple city government employers; the inventive concepts further include the methods of searching for said prospective city government jobs by a plurality of job seekers or prospective employees, and methods of submitting and managing interest in prospective city government jobs.

As defined by this specification, and in the claims below, a prospective city government job is not a job announcement for vacant position, but a job title that the employer will eventually convert into a future job announcement for which job applications will be taken to fill a vacant position. Since the website stores interest in each prospective city government job before prospective job is converted into an actual job announcement for a vacant position, said website accumulates said interest over time. The inventive concepts further include the method of converting said prospective city government job into a job announcement to fill a vacant position. The conversion of the prospective city government job into a job announcement makes use of the submitted job seeker interest to effect electronic communication to each job seeker that submitted interest in particular prospective city government job, notifying the prospective employee that the prospective city government job has been converted into a job announcement for which the city government is now accepting applications.

For reasons cited in this application beginning on line 11 of page 1 through line 13 of page 2, and beginning on line 15 of page 4 through line 16 on page 5, city government career job seekers currently have difficulty finding city government jobs, especially specialty jobs in line with their career tracks. The "prospective city government job" is introduced by the present invention to address this problem. Whereas each city government will only have a handful of vacant positions at any one time for which the city government will solicit job applications, there are potentially hundreds of job titles in each city government's position classification system. Said website makes these job titles from the position classification system accessible to prospective employees and significantly increases the number of opportunities which job seekers can search for and express interest in. As noted in lines 19 through 22 on page 4 of this application, this is of paramount concern to city government career job seekers because the presence of the increased number of job opportunities made accessible by said website provides a diverse array of specialty positions that city government career job seekers desire in order to advance within a particular career track and ultimately succeed in securing placement into higher level positions which are so critical to personal growth and job satisfaction.

Said website provides access and knowledge about these "prospective city government job" opportunities to job seekers through prospective city government job searches. These prospective city government job searches utilize standardized city government job categories and job types, and return city government job titles to prospective employees from multiple city governments in selected geographic areas. The multiple employer prospective jobs posting system 10 prompts prospective employees to save or submit interest in particular job titles at specific city governments, and await the conversion of said prospective city government jobs into job announcements. The prospective city government jobs search, therefore, provides prospective employees with systematic and faster access to a greater number of job opportunities as noted previously, and, ultimately, to job announcements of high interest to prospective employees; but most importantly, the prospective city government jobs search allows job seekers to make more strategic selection of jobs to express interest considering his or her career track.

Submitting interest in a particular prospective city government job appends the job seeker's information, i.e., name or username, key qualifications, and resume, to the job title and makes such information available to the employer that posted the prospective city government job. The submitted interest is viewable by the registered city government that posted the prospective city government job and so provides assurance or knowledge to the city government that a qualified applicant pool is ready to respond to the conversion of the prospective city government job into an active job announcement. This addresses the problems described in lines 3 through 10 on page 5 of this application regarding city governments' need for assurance, i.e., that converting prospective job into an actual city government job announcement will be distributed to a relevant, interested and qualified applicant pool. The knowledge provided by said website about the submitted and accumulated interest in each prospective city government job enables human resource professionals to communicate the quantity and quality of potential applicants to individual city departments with vacant positions as described in lines 8 through 10 on page 5 of this application. Website thus enables human resources professionals to choose the best time to post or convert the prospective city government job into an active city government job announcement. The website function of providing city governments with knowledge about when to convert a prospective city government job into a city government job announcement increases the likelihood that the city government will receive applications from highly qualified and interested applicants. This certainty about the qualified applicant pool also reduces placement time because it reduces the likelihood that the recruitment will be unsuccessful in attracting qualified and interested applicants.

Since job seekers find prospective city government jobs using searches that make use of criteria that includes geographic location, city government job categories and job types, and then submit interest in particular job titles, prospective employees may use the present invention to receive notifications of job announcements for job titles of particular interest to the prospective employee, and at particular city government employers of interest to prospective employee. Delivery of said city government job announcements in this manner constitutes more precise actionable information than compared to, for example, emails of job announcements from multi-industry websites that deliver job announcements matching broad search criteria or job seeker qualifications, because these websites are not widely used by city governments to post job announcements as noted on lines 1 through 5 on page 2 of this application. Website of present invention's delivery of said email notifications about particular job titles of interest to prospective employee therefore provides the useful benefit of saving prospective employee time in having to sift through and review job listings from other websites which include job announcements that are not likely of interest to the prospective city government job seeker. Email job announcements provided by the present invention allow the job seeker to focus on jobs that "represent a progression in a job seeker's city government career track" as described in lines 21 and 22 on page 4 of this application.

The nature of prospective city government jobs being future job postings permits both employers and job seekers to be more proactive with respect to planning job recruitments and career development; employers can amass lists of qualified applicants before releasing or posting job announcements, and job seekers can proactively submit interest in jobs that make the most sense to them considering a broad range of motives well in advance of jobs being advertised as vacant positions through an active job announcement. These proactive exchanges of information provide faster access to job opportunities, actually before they become job openings, and faster access to relevant applicant pools, before job openings are communicated to formally solicit job applications. The mutual benefits of these information exchanges provide a strong motive for city government career job seekers and city government employers alike to use said website, and such use makes the present invention commercially viable.

Since the website serves a single industry, namely city governments, city government career job seekers are the primary prospective employees registered to use said website. The website function of accumulating interest in particular job titles, combined with the website's function of communicating job announcements to city government career job seekers, makes the job postings much more effective in terms of communicating the job announcement to the right audience most likely the best qualified and inclined to apply for the job. This is far superior to posting city government jobs on high-profile multi-industry job posting websites, industry trade journals, or even individual city government websites, as described in the BACKGROUND section of this application.

The above described benefits are the central new and useful improvements offered by the innovations inherent in the listing of claims related to this invention. Dependent claims also recite methods for making prospective city government jobs converted into job announcements available to job seekers through job announcement searches on website of invention. Dependent claims further include posting job announcements that are not prospective city government jobs. but include steps to merge displays of these types of job announcements with job announcements that convert prospective city government jobs into job announcements.

Dependent claims further recite methods for making hyperlinks accessible to prospective employees through separate hyperlink searches and also through city government employer profile ("city profile") searches. The city profile searches culminate in displays of parsed data., when a city profile is saved, providing three options prompting prospective employees to quickly check for job opportunities at each saved city government by: (1) displaying lists of, and providing prompts to submit interest in, prospective city government jobs; (2) displaying lists of, and prompts to view, city government job announcements on website of said invention, and (3) displaying lists of hyperlinks to, and displaying city government Job Announcement web pages. These features result in more thorough checks for available job opportunities at each city government of interest to job seeker. The hyperlinks search feature saves the job seeker time in finding city government job announcement web pages. This feature also addresses the problems described in lines 5 through 13 on page 2, and lines 1 through 3 on page 5 of this application.

The methods and steps described in the claims transform the inventive concept into various and particular useful tools making the posting of city government jobs and the searches for city government jobs more effective and beneficial to the users of this invention. The combination of claims and claim elements together with the various new and useful improvements offered by this invention constitute a basis for patent eligibility. Moreover, since the applied for patent is limited to a single industry, it does not pre-empt use of such methods in other industries or "all fields". It is, therefore, argued herein, that the present invention is not exclusionary, and thus, by definition, is not an abstract idea.

What is claimed and desired to be secured by patent is as follows:

1. A method for posting prospective city government jobs and job announcements through a website, comprising the steps of:
   (a) registering multiple city governments in at least one state, for use of said website;
      a city government being defined as a governing body for a city;
   (b) automatically prompting each city government employer after registration to enter information into said website through a step process to create a valid city government employer profile or "city profile";
      said city profile is partly comprised of city name, address, human resources contact information, listing of city departments, demographic information, article about the city government, and hyperlinks to various web pages of registered city government;
   (c) said website validates entry of said city profile information by ensuring no required information is left blank and saves said entered city profile information and prompts city government to enter prospective city government job titles;
      said prospective city government jobs being job titles entered into said website by a registered city government from the same city government's position classification system that are not yet vacant positions but are job titles made accessible to prospective employees for purposes of soliciting interest in a future job announcement for a position with the same job title that said city government will eventually advertise for the purpose of soliciting job applications;

said prospective city government jobs include attributes of department of city where position is budgeted, job category, and job type;

said website logic requires that registered city government enter at least one prospective city government job title into database to complete city profile;

(d) said website saves entered prospective city government jobs in a database linked to said website;

(e) registering prospective employees for use of said website;

(f) preparing prospective employees' resumes and storing said resumes in a database linked to said website;

(g) automatically prompting prospective employees to conduct searches for prospective city government jobs;

(h) executing queries or searches for prospective city government jobs stored in said website database making use of search criteria including geographic locations, job categories, and job types;

(i) returning search results web page to prospective employees consisting of a table listing of prospective city government jobs matching search criteria;

(j) said search results web page for prospective city government jobs prompts prospective employees to either save prospective city government jobs or submit interest to city governments in prospective city government jobs;

(k) said website submits prospective employee interest in prospective city government job storing such interest in database table;

(l) said website displays said prospective employee interest in said prospective city government job in table format to the registered city government that posted said city government prospective job;

said display of prospective employee interest includes prospective employee's name or username, city residence, date when interest was submitted, years of experience, education level, and prompt to open and view resume;

(m) said website prompts city government user to convert a prospective city government job into a city government job announcement through a step process;

said city government job announcement being a job title which corresponds to a prospective city government job previously entered into said website by said city government and which is converted to a city government job announcement for which there is a vacant position that said registered city government is accepting job applications;

said website job posting step process comprising a series of prompts requiring city government to enter, select or upload information related to said city government job announcement;

(n) said website auto populates said entered prospective city government job titles into a drop down box in jobs posting step process and prompts registered city government user to select a job title;

said jobs posting step process saves prospective city government job title for new city government job announcement and proceeds to next step in the jobs posting process;

said jobs posting step process locks the job category and job type of the new city government job announcement to the setting of prospective city government job and proceeds to the next step in the jobs posting process prompting registered city government to enter descriptive information including description of job duties, qualifications, application process and compensation;

said jobs posting step process saves descriptive information about the job announcement and formats such information into a job announcement that can be easily viewed by job seekers;

(o) said website, then formulates and electronically distributes said city government job announcement;

said website compiles the name and username of each prospective employee that submitted interest in said prospective city government job, and when said city government converts said prospective city government job to said city government job announcement for which said prospective employee may apply, said website automatically provides communication to each prospective employee who submitted electronic interest in the prospective city government job that the prospective city government job is now an active city government job announcement for which the prospective employee may submit an application; said notification is also provided by said system to prospective employee upon login by the prospective employee to said website;

said website displays new job announcement upon login to registered prospective employee that submitted said interest in prospective city government job with same title; said display is rendered in a table which includes job title, salary range, city name that posted job, state, and application deadline, with prompts to display form view of job announcement, save, or submit job application for said city government job announcement.

2. The method of claim 1, further comprising the following steps to register city government users of said website:

(a) said website includes database of preloaded city names, including street address, zip code, state and county where each city is located; said website database further includes a randomly generated alphanumeric passcode assigned to each city;

(b) said website prompts city government user interested in registering, to search for city name by typing in city name in a form field, and selecting state from drop down box where city is located;

(c) said website then queries database and returns to city government user matching search results, i.e., city name, county name, state name;

(d) said website then prompts city government user to select city name matching search results and enter first and last name, job title, department, telephone no., username and password;

(e) said website saves entered information to a database table and proceeds to next step prompting city government user to enter city hall street address, city hall 5-digit zip code, city web address, and time zone;

(f) said website saves entered information into a database and makes such information accessible to said website administrative users; such information is displayed in an applications pending table; said table prompts administrative users to approve of registration for city government user;

(g) said website makes city government module accessible to newly approved city government user upon login with username and password previously entered by city government applicant;

(h) said website approval permits city government to post job announcements up to a number set by administrative users for free; after job posting limit is reached, city must pay to post additional job announcements;

(i) said website blocks future applicants from registering for use of said website under the same city name within same state of approved prior applicant.

3. The method of claim 2, further comprising the following optional steps:

(a) said website registration process prompts city government applicant to enter passcode into form during registration process;

(b) said website automatically approves of city government applicant's use of said website if passcode entered by city government applicant matches passcode in database;

(c) said website makes city government module accessible to newly approved city government user upon login with username and password previously entered by city government applicant.

4. The method of claim 1, further comprising the step of blocking registered city government from posting said city government job announcement if the city government does not have a valid city profile available to prospective employees.

5. The method of claim 1, regarding the creation of city profiles, further comprising the following steps:

(a) prompting registered city government user to enter following information in a step process to create a city profile: photo of city, whether city was incorporated or chartered, year city was founded, year 2000 population, current year population, number of square miles, number of fulltime employees;

(b) said website saves entered information and proceeds to next step of create profiles process, prompting city government user to enter the uniform resource locator or URL to the registered city government's homepage, human resources department's web page, job announcements web page, job descriptions web page, compensation web page, bargaining group agreement web page, and organization charts web page;

(c) said website saves entered information and masks each URL with a descriptive label, e.g., the job announcements URL is labeled Job Announcements, and displays said links on city profile;

(d) said website validates data entered to create city profile and formats each city profile into a uniform display to prospective employees;
said city profile includes hyperlinks to prospective city government jobs and city government job announcements posted by the city government on said website;

(e) said website makes said city profile accessible to prospective employees through prompts on form views of prospective city government jobs; city government job announcements; and through city profile searches;

(f) said website makes hyperlinks entered to create said city profile accessible to other city governments through city links searches.

6. The method of claim 1, further comprising the following steps:

(a) said website prompts registered city governments to add job titles to website database from position classification system of city government, and select associated job category, job type, and department name for each job title entered before saving said prospective job;

(b) website saves prospective city government job to website database along with associated attributes, i.e., job category, job type and department;

(c) said website displays all entered and saved prospective city government jobs to registered city government that entered such jobs in a list including associated attributes;

(d) said website by default makes all newly entered and saved prospective city government jobs active or accessible to prospective employees through prospective city government job searches as described in claim 1;

(e) said website provides optional prompts for registered city governments to edit and delete prospective city government jobs, and when changes of job title, job category, job type, or department designations are made, said website saves these changes to database;
if election is made to delete the prospective city government job, said website deletes the prospective job from database;
said website removes deleted prospective city government jobs from displaying to prospective employees that submitted interest in these jobs as described in claim 1;

(f) said website provides optional prompt to registered city government to stop taking interest in prospective city government jobs, and upon selection by registered city government, said website blocks prospective employee access to said prospective city government job and moves prospective city government job to a separate web page where only Stopped prospective city government jobs are displayed to registered city government;
said website retains submitted interest accumulated in prospective city government job up until the time and date when the job was Stopped;
said website permits Stopped prospective city government jobs to be converted to job announcements as described in claim 1.

7. The method of claim 1, further comprising the step of registering prospective employees through a paid subscription.

8. The method of claim 1, further comprising the step of requiring each prospective employee to have a valid resume accessible to city governments in order to submit interest in prospective city government jobs.

9. The method of claim 8, further comprising the following steps:

(a) said website prompts registered prospective employee to create a resume through a step process on said website;

(b) said website step process to create a resume prompts prospective employee to enter resume title, objective, desired compensation, job types of interest, job categories of interest, current work status with city government, months or years of city government employment, level of education, professional licenses or certificates, employment history, and geographic areas of interest;

(c) said website saves said prospective employee resume data into database linked to said website;

(d) said website makes said resume accessible to city governments through submittals of interest in prospective city government jobs as described in claim 1;

(e) said website displays resumes in standardized formats.

10. The method of claim 9, further comprising the step of: prompting prospective employee to block up to five city governments from accessing and viewing prospective employee's resume.

11. The method of claim 1, regarding searching for prospective city government jobs, saving prospective city government jobs and submitting interest in prospective city government jobs, further comprising the following steps:
  (a) said website prompts registered prospective employee to select one of three options on where to search for prospective city government jobs: (1) State and County (ies); (2) Miles Away from 5-digit zip code; or (3) by Looking up a particular city by name;
  (b) said website saves geographic search criteria selected by prospective employee and prompts selection of job categories and job types characterizing prospective city government jobs in next step of search process;
  (c) said website saves prospective employee selection of job categories and job types, queries database of prospective city government jobs and returns list of prospective city government jobs matching search criteria to registered prospective employee;
  (d) said website displays prospective city government jobs posted by multiple city governments in table view to prospective employee prompting prospective employee to either save or submit interest in prospective city government jobs;
    said website table view of prospective city government jobs further includes prompts to display each prospective city government job in a form view;
    said form view of prospective city government job displays job title, department where job is budgeted, job category, job type, date posted, city contact information, hyperlink to city profile, and prompts to save or submit interest in prospective city government job;
  (e) said website saves prospective city government job matching search criteria to a table of saved prospective city government jobs and makes said table accessible to prospective employee;
    said table of saved prospective city government jobs displays the job title, department name where job is budgeted, name of city that posted job, state where city is located, date job was saved, and prompt to submit interest in prospective city government job;
  (f) said website submits prospective employee interest to registered city government that posted prospective city government job storing such interest in database table for one year;
  (g) said website displays said prospective employee interest in said prospective city government job to city government that posted said prospective job in table as described in claim 1;
  (h) said website displays submitted interest in prospective city government job to prospective employee in a table;
    said table of submitted interest includes prospective city government job title, department where job is budget, name of city that posted prospective job, state where city is located, expiration date of interest, and prompts to delete interest or move submitted interest to a saved prospective city government jobs table;
  (i) said website automatically removes submitted interest in prospective city government job after one year, and displays said removed job title in an Expired panel or web page to prospective employee;
  (j) said Expired panel prompts prospective employee to save said prospective city government job or re-submit interest in prospective city government job.

12. The method of claim 1, 6, 8, or 11, addresses the serious problem of city government job seekers not being able to find job opportunities in line with their career objectives by displaying, through prospective city government job searches, a significantly number of job opportunities from multiple employers through one website; whereas a particular city government may only have a small number of currently available vacant job openings for which it may post as a job announcement on their own city website, said website of invention makes potentially hundreds of prospective city government jobs available from the same city government employer to prospective employees as well as prospective city government jobs from other city governments; the new and useful benefits of said website to job seekers include the following:
  (a) display of large numbers of prospective city government job opportunities from multiple city government employers through said website's prospective city government jobs search provides the new and useful benefit of saving the city government career job seeker significant time in searching for job opportunities compared to searching for job announcements on individual city websites large multiple industry websites, or viewing emails of job announcements from multiple industry websites which include jobs unrelated to the city government job seeker's career interest;
  (b) said website display of significantly more jobs at each city government provides greater knowledge to prospective employees about positions in each city government's classification system so that city government career job seekers can more easily find and identify job titles in their particular career track, submit interest in such job titles, which ultimately improves the city government career job seeker's chances of securing placement into higher level and better quality positions in line with their career track when such jobs are converted into a city government job announcement; such method increases the likelihood that job seeker will be placed into a personally satisfying and rewarding job;
  (c) said website provides city government career job seekers knowledge about prospective city government job opportunities at multiple city governments and displays the qualifications of prospective city government employees to multiple city government employers using a uniform method on one said website.

13. The method of claim 1, 6, 8, 9, or 11, wherein said website displays table to city government comprising list of prospective employees that submitted interest in each prospective city government job, wherein said website stores and displays said interest over time to the city government that posted said prospective city government job, provides two primary new and useful benefits to city government employers:
  (i) knowledge about the quantity and quality of prospective employees that submitted said interest in each prospective city government job since the prospective city government job was posted and made active;
    said knowledge provides the new and useful benefit to registered city government of "knowing when a large number of qualified prospective employees are interested and ready to receive a job announcement" which corresponds to the prospective city government job title;

said knowledge can be used by the city government to select the "best time" to convert said prospective city government job into said city government job announcement in order to maximize distribution of said job announcement to a well-qualified group of likely applicants;

(ii) said website, during instance of converting a prospective city government job into a job announcement, and distributing said job announcement to a well-qualified and "interested" group of prospective employees, "reduces placement time" to fill vacant positions because:

(a) said website proactively stores submitted interest in the prospective city government job and distributes said job announcement to prospective employees that submitted interest in said job once it is converted into a city government job announcement, and so this proactive method of saving interest over time before distributing job announcement does not rely on prospective employees finding the job announcement after it is posted as a job announcement for which the employer is accepting applications; and (b) said submitted interest by job seeker in a particular job title, and said website's communication of said city government job announcement with same job title to prospective employees constitutes delivery of precise, actionable information of "high interest" to prospective employee, increasing the likelihood that the job seeker will submit an application for the city government job announcement.

14. The method of Claim 13, further comprising the following steps and benefits:

(a) providing email notification of the job announcement to the prospective employee;

(b) said notification being about a job opportunity for a job title of particular interest to prospective employee, and at a particular city government employer of interest to prospective employee;

(c) said prospective employee receipt of emails of job announcements from multiple prospective employers in response to interest submitted in multiple prospective city government jobs provides the new and useful benefit to the prospective employee of getting job announcements about particular job titles of high interest to job seeker, ones that may represent a progression in jobs seeker's career track, from multiple employers in a single industry in which the prospective employee is seeking career advancement;

(d) display of said city government job announcement prompts prospective employee to submit job application for job title corresponding to submitted interest in prospective city government job;

(e) said website, submits job application from prospective employee to said city government that posted city government job announcement with job title corresponding to said prospective city government job.

15. A method of communicating with prospective employees that have submitted interest in prospective city government jobs as described in claim 1, comprising the following steps:

(a) said website displays submitted interest in each prospective city government job to registered city that posted such job through table list which filters prospective employees by job title;

(b) said website table view of submitted interest provides prompts to city governments to view and save resumes;

(c) said website saves resumes to a separate "Saved Resumes" web page and makes such web page accessible to the city government that posted the prospective city government job;

(d) said website Saved Resumes web page provides optional prompts to city governments to send messages to prospective employees about their resume, and to receive messages from prospective employees;

(e) said website sends message entered by city governments to selected prospective employee that submit interest and resume and displays such message to prospective employee on web page prompting prospective employee to send reply message;

(f) said website sends reply messages to city governments from prospective employee.

16. The method of claim 1, further comprising the step of making the posted city government job announcement accessible to registered prospective employees through said website job announcement searches.

17. The method of posting job announcements as described in claim 1, further comprising the step of prompting the city government to select a date range of when the city government job announcement is to be accessible to prospective employees through job announcement searches.

18. The method of posting job announcements as described in claim 1, further comprising the step of displaying said city government job announcement in a job announcement search results table to prospective employees;

said job announcements search results table includes information such as job title, salary range, city name that posted job, state, and application deadline, with prompts to display job announcement in form view, save, email, print or apply for such job.

19. The method of posting job announcements as described in claim 1 further comprising the following steps of:

(a) said website saves said city government job announcement and displays said city government job announcement to city government that posted said job announcement in a "Scheduled" panel or web page when the job posting date range is set for a future date and time;

(b) said website does not make said "Scheduled" job announcement accessible to prospective employees or cause communication to prospective employees until the date and time said job announcement is set to be actively accessible to prospective employees;

(c) said website moves the display of said "Scheduled" job announcement from "Scheduled" panel to an "Active" panel or web page on the date and time set for the job announcement to be actively accessible to prospective employees;

(d) said website displays said city government job announcement to city government that posted said job announcement in a "Active" panel or web page when the job posting date range is set for or reaches the date and time when city government job announcement is to be accessible to prospective employees;

said Active panel displays count of prospective employees that viewed the job announcement, saved the job announcement and submitted application in response to job announcement;

(e) said website causes communication to prospective employee that submitted interest in said prospective city government job once the prospective city government job becomes an actively accessible city government job announcement based on the date range set as described in claim 17;

(f) said website continues to display said job announcement on the Active panel until date and time when job announcement is no longer active;

(g) said website moves the job announcement to an "Ended" panel or web page and displays the job announcement to the city government that posted said job announcement when job announcement is no longer active based on date range set for job announcement;

(h) said website Ended panel continues to display the job announcement for 30 days and prompts city government user to re-post the job announcement, delete the job announcement, or save the job announcement to an "Archived" panel or web page;

(i) said website saves Ended job announcement to the Archived panel and displays said archived job announcement to the city government that posted said job announcement;

(j) said website automatically deletes Ended job announcement if job announcement is not archived by said website;

(k) said website Archived panel continues to display the job announcement and prompts city government user to re-post the job announcement or delete the job announcement;

(1) said website re-posts job announcement through job posting step process as described in claim 1, however, displays previously entered information prompting city government to edit and save such information in re-posting said job announcement.

20. A method of posting a city government job announcement that is not a prospective city government job and merging said city government job announcement to display along with job announcements posted as described in claims 1; said method comprising the following steps:

(a) said website prompts registered city government with a valid city profile to create a job announcement using jobs posting step process;

(b) said website prompts city government user to type a job title into a form field in initial step of said jobs posting step process;

(c) said website saves entered job title and proceeds to next step of jobs posting process which prompts registered city government user to select job category and job type for the job announcement;

(d) said website saves job category and job type to associate these attributes to the job announcement being created and proceeds to next step in jobs posting process which prompts registered city government user to enter additional descriptive information, including description of job duties, qualifications, applications process and compensation;

(e) said jobs posting step process then stores descriptive information about the job announcement entered by registered city government user, and proceeds to next step in jobs posting process prompting city government user to enter date range of when city government job announcement is to be available to prospective employees through job searches conducted on said website;

(f) said website then stores all information entered for job announcement and formats such information into a job announcement that can be easily viewed by job seekers;

(g) said website makes job announcement accessible to registered prospective employees through job searches and merges said posted job announcement to display in search results table along with job announcements created using method described in claim 1.

21. The method as described in claim 20, comprising the further steps of:

(a) said website saves said city government job announcement and displays said city government job announcement to city government that posted said job announcement in a "Scheduled" panel or web page when the job posting date range is set for a future date and time;

(b) said website does not make said "Scheduled" job announcement accessible to prospective employees until the date and time said job announcement is set to be actively accessible to prospective employees;

(c) said website moves said "Scheduled" job announcement from the "Schedule" panel to an "Active" panel or web page on the date and time set for the job announcement to be actively accessible to prospective employees; said Active panel displays said job announcement to the city government that post said job announcement;

said Active panel displays count of prospective employees that viewed the job announcement, saved the job announcement and submitted application in response to job announcement;

(d) said website continues to display said job announcement on the Active panel until date and time when job announcement is no longer active based on date range for said job announcement;

(e) said website moves the job announcement to an "Ended" panel or web page and displays the job announcement to the city government that posted said job announcement when job announcement is no longer active based on date range for job announcement;

(f) said website Ended panel continues to display the job announcement for 30 days and prompts city government user to re-post the job announcement, delete the job announcement, or save the job announcement to an "Archived" panel or web page;

(g) said website saves Ended job announcement to the Archived panel and displays said archived job announcement to the city government that posted said job announcement;

(h) said website automatically deletes Ended job announcement if job announcement is not archived by said website;

(i) said website Archived panel continues to display the job announcement and prompts city government user to re-post the job announcement, or delete the job announcement;

(j) said website re-posts job announcement through job posting step process as described in claim 20, however, displays previously entered information prompting city government to edit and save such information in re-posting said job announcement;

(k) said website displays the job announcements created in claim 20, along with the job announcements created in claim 1, on each of the following web pages: said "Scheduled" web page, said "Active" web page, said "Ended" web page, and said "Archived" web page.

22. A method of searching for job announcements posted in claims 1 or 20, comprising the following steps:

(a) said website prompts registered prospective employee to select from one of three options on where to search for city government job announcements: (1) Multiple States; (2) State and Counties; (3) Miles Away from 5-digit zip code;

(b) said website saves geographic area selected by prospective employee and prompts selection of job categories and job types characterizing city government job announcements;

(c) said website saves prospective employee selection of job categories and job types and proceeds to next step prompting prospective employee to enter compensation range, keys words of job titles of interest, and name job announcements search;

(d) said website prompts prospective employee to have named jobs announcement search execute upon login to said website;

(e) said website saves search criteria, name of jobs search, and setting to have search execute upon login and queries database searching for city government job announcements posted, as described, claims 1 or 20;

(f) said website returns query results to prospective employee displaying job announcements in a search results table providing list of job titles for open positions that match search criteria;

(g) said website job search results web page provides prompts to prospective employee to view job announcement in form views, save job announcement, email, print or apply for job;

(h) website executes upon login by prospective employee the same named and saved job announcements search displaying search results in table to prospective employee;

(i) said website sends email of job listings matching saved search criteria to email address entered by prospective employee.

23. The method of claims of 1 or 20, wherein jobs search furthering comprises the step of displaying a summary form view and a detailed form view of city government job announcement to prospective employee;

said summary form view of job announcement displays job title, date when job was posted, end date of job posting, salary range, job category, job type, and application deadline; said summary view also includes city name, contact information, link to city profile and hyperlinks to city web pages; said summary view also include prompts to print, email, save job announcement, apply for job, and to display detailed view of job announcement;

said detailed form view of job announcement displays all summary information plus descriptive information about the job as entered by the city government, e.g. description of job duties, qualifications, application process.

24. The method of claims 1 or 20, further comprising the step of displaying employment application form to prospective employee and providing prompts to enter information into job application.

25. The method of claims 1 or 20, further comprising the step of saving job application to database table corresponding to the job title and job announcement posted by the city government employer.

26. The method of claims 1 or 20, further comprising the step of making said job application accessible to city government by displaying said job application in table of job applications corresponding to posted job announcement with same job title.

27. The method of claims 1 or 5, further comprising the following steps:

(a) said website prompts prospective employees to search for city profiles;

(b) said website prompts prospective employee to select from one of three options on where to search for city profiles: (1) State and Counties; (2) Miles Away from 5-digit zip code; and (3) by Looking up a particular city by name;

(c) said website saves geographic area search criteria and executes query of database for city profiles matching search criteria;

(d) said website displays city profiles search results table which includes list of city governments matching search criteria to prospective employee;

said city profile search results table lists city name, county, state, population, number of prospective city government jobs posted by said city, and number of city government job announcements posted by said city;

(e) said city profile search results table prompts prospective employee to view city profile, view list of prospective city government jobs, view list of city government job announcements active on said website, and to save city profile;

(f) said website displays city profile to prospective employee, displaying all information entered into said city profile as described in claims 1 or 5, plus link to table listing prospective city government jobs and link to table listing city government job announcements posted by city government;

said prospective city government jobs hyperlink and city government job announcement hyperlinks are displayed on profile with count of active jobs associated with each link type;

(g) said display of each city profile provides three options for prospective employees to search for job opportunities at city government which posted said city profile: (1) hyperlink to city government Job Announcements' web page prompts prospective employee to search for jobs on the city government's own website; (2) hyperlink to prospective city government jobs on website of invention prompts prospective employee to view such jobs on said website and either save or submit interest in such future job opportunities; and (3) hyperlink to city government job announcements posted by city on website of invention prompts prospective employee to view such job announcements and to either save job announcements or apply for such job openings;

Said hyperlink to city government Job Announcements web page opens said web page in separate browser window;

said display of prospective city government jobs list includes job title, department, name of city that posted said job, state where city is located, and prompts to view prospective city government job in form view, save job, or submit interest in said prospective city government job as described in claim 1;

said display of city government job announcements list includes job title, salary range, name of city that posted said job, state where city is located, and prompts to view city government job announcements in form view, save job, or submit job application.

28. The method of claim 27, further comprising the step of saving each city profile to a "Saved Profiles" web page for future reference and reuse by the prospective employee;

said Saved Profiles web page includes four tabs labeled, from left to right: "Saved Profiles", "Prospective Jobs", "Job Announcements" and "City Links";

said Saved Profile tab includes a table listing each saved city by name, county and state where city is located, population, number of prospective city government jobs posted by said city, and number of city government job announcements posted by said city.

29. The method of claim 28, further comprising the following steps when said website saves city profiles to said Saved Profiles web page and said Saved Profiles tab:
   (a) said website parses data from each saved city profile into separate tables, each displaying said parsed data under the following tabs on said Saved Profiles web page:
       said website displays prospective city government jobs associated with each saved city profile to table under the "Prospective Jobs" tab;
       said website displays city government job announcements associated with each saved city profile to table under the "Job Announcements" tab;
       said website displays city government hyperlinks associated with each saved city profile as described in claim 5 to table under the "City Links" tab;
   (b) the "Prospective Jobs" tab displays job title, department, city name, stale, and prompts prospective employee to save, submit interest in job, or view prospective city government job in form view as described in claim 11; this tab also prompts prospective employees to filter prospective city government jobs by city name;
   (c) the "Job Announcement" tab displays job title, salary range, city name, state, and prompts prospective employee to save, apply or view job announcement in form view as described in claim 19; this tab also prompts prospective employee to filter city government job announcements by city name;
   (d) the "City Links" tab displays standard names of hyperlinks as described in claim 5 along with the name of city that posted and shared said hyperlinks with prospective employees; the state name is also displayed; this table also prompts prospective employee to filter hyperlinks by link type, e.g., only Job Announcements web pages.

30. The method of claim 29 further comprising the step of providing three options for prospective employees to search for job opportunities at multiple city governments through one web page, the Saved Profiles web page: (1) the Prospective Jobs tab providing prompts to prospective employee to view prospective job announcements from multiple city governments; (2) the Job Announcements tab providing prompts to the prospective employee to view city government job announcements from multiple cities on said website; and (3) the City Links tab providing prospective employee with prompts to access job announcements posted by multiple cities on their own websites.

31. The method of claim 5, further comprising the following steps:
   (a) said website includes a step process that prompts prospective employees to search for city government hyperlinks entered to create city profile;
   (b) said website prompts registered prospective employees to select one of three options on where to search for city government hyperlinks: (1) State and Counties; (2) Miles Away from 5-digit zip code; and (3) Look up city name;
   (c) said website saves geographic area selected by prospective employee and prompts selection of city government hyperlink types, including the following prompts as options: Bargaining Group Agreements; Compensation Tables; Home Page; Human Resources, Job Announcements; Job Descriptions; Organization Charts;
   (d) said website saves prospective employee selected hyperlink types and performs query of city government profile hyperlinks and returns list of hyperlinks matching search criteria to prospective employee;
   (e) said website displays list of city hyperlinks in city links search results table;
       said city links search results table includes city name, state where city is located, county where city is located, and city hyperlink with mask, e.g., Job Announcements; said city links search results web page also includes prompt to save individual hyperlinks to a saved hyperlinks web page on said website;
   (f) said website opens web page to URL rendering web page of city link in separate window to prospective employee;
   (g) said website saves each city hyperlink selected by prospective employee to a saved hyperlinks web page accessible to prospective employee;
       said saved hyperlinks web page includes the city name, state name, hyperlink, and prompt to delete hyperlink;
       said website opens web page from saved hyperlinks web page for reuse of said saved hyperlinks;
       said website deletes saved hyperlinks.

32. The method of claim 5, further comprising prompts to share city links with registered city employees or other registered city governments through city links searches.

33. The method of claim 5, further comprising the following steps:
   (a) said website includes a step process that permits city governments to search for city government hyperlinks entered to create city profile;
   (b) said website prompts registered city government to select one of three options on where to search for city government hyperlinks: (1) State and Counties; (2) Miles Away from 5-digit zip code; and (3) Look up city name;
   (c) said website saves geographic area selected by city government user and prompts selection of city government hyperlink types, including the following prompts as options: Bargaining Group Agreements; Compensation Tables; Home Page; Human Resources, Job Announcements; Job Descriptions; Organization Charts;
   (d) said website saves selected hyperlink types and performs query of city government profile hyperlinks and returns list of hyperlinks matching search criteria to prospective employee;
   (e) said website displays list of city hyperlinks in city links search results table;
       said city links search results table includes city name, state where city is located, county where city is located, and city hyperlink with mask, e.g., Job Descriptions; said city links search results web page also includes prompt to save individual hyperlinks to a saved hyperlinks web page on said website;
   (f) said website opens web page to URL rendering web page of city link in separate window to city government user;
   (g) said website saves each city hyperlink selected by city government to a saved hyperlinks web page accessible to the city government that saved such link;

said saved hyperlinks web page includes the city name, state name, hyperlink, and prompt to delete hyperlink;

said website opens web page from saved hyperlinks web page for reuse of said saved hyperlinks;

said website deletes saved hyperlinks;

(f) said website saved hyperlinks web page provides optional prompts to city governments to send messages to other city government employers about their city hyperlinks, and to receive messages from these city governments;

(g) said website sends message entered by city governments to other city governments and displays such message to other city government on web page prompting other city government to send reply message;

(h) said website sends reply messages back to city government that sent original message.

34. The method of claim 9, further comprising the step of making the created resume accessible to city governments through resume searches.

35. A method of claim 9, comprising the following steps:
(a) said website prompts registered city government to search for resumes posted by prospective employees through a step process;
(b) said website prompts registered city government to select from one of three options on where to search for prospective employee resumes: (1) Multiple States; (2) State and Counties; and (3) Miles Away from 5-digit zip code;
(c) said website saves geographic areas of where to search for resumes, and prompts city government to select job categories and job types of interest to prospective employee;
(d) said website saves selected job categories and types of interest to prospective employees, and proceeds to next step prompting city government to select educational level desired, years of experience working for cities, professional licenses or certificates, and salary expectation of prospective employees;
(e) website saves entered resume search criteria and executes search performing query of database for resumes that match search criteria;
(f) website displays search results in table listing resumes matching search results;

said search results table includes city and state where prospective employee resides, job categories of interest to prospective employee, years of experience, education and any licenses or certificates, and prompts to save resume and view resume;

said website displays detailed form view of resume to city government user, presenting username or name of prospective employee, objective of prospective employee, education, years working for city governments, and employment history;

said website saves resume to web page accessible city government user;

said saved resumes web page prompts city government to send messages to prospective employee as described in claim 15.

* * * * *